US008992203B2

(12) United States Patent
Fitzgerald et al.

(10) Patent No.: US 8,992,203 B2
(45) Date of Patent: Mar. 31, 2015

(54) FORMLINER AND METHOD OF USE

(71) Applicant: Prime Forming & Construction Supplies, Inc., Santa Ana, CA (US)

(72) Inventors: Edward Daniel Fitzgerald, Laguna Beach, CA (US); Brian Eugene Sheehan, Mission Viejo, CA (US)

(73) Assignee: Prime Forming & Construction Supplies, Inc., Santa Ana, CA (US)

(*) Notice: Subject to any disclaimer, the term of this patent is extended or adjusted under 35 U.S.C. 154(b) by 0 days.

(21) Appl. No.: 14/137,733

(22) Filed: Dec. 20, 2013

(65) Prior Publication Data

US 2014/0231616 A1 Aug. 21, 2014

Related U.S. Application Data

(63) Continuation of application No. 12/850,510, filed on Aug. 4, 2010, now Pat. No. 8,623,257, which is a continuation-in-part of application No. 12/406,896, filed on Mar. 18, 2009, now Pat. No. 8,074,957, which is a continuation-in-part of application No. 12/238,294, filed on Sep. 25, 2008, now Pat. No. 7,963,499.

(51) Int. Cl.

| | |
|---|---|
| ***B29C 39/00*** | (2006.01) |
| ***E04G 11/00*** | (2006.01) |
| ***B28B 7/00*** | (2006.01) |

(Continued)

(52) U.S. Cl.

CPC .............. *E04G 11/00* (2013.01); *B28B 7/0073* (2013.01); *E04F 21/04* (2013.01); *E04G 9/10* (2013.01)

USPC .......................................... 425/182; 249/192

(58) Field of Classification Search

USPC ......... 249/187.1, 188, 189, 192, 15; 264/299; 52/749.1, 749.11, 749.13, 749.15; 425/182

See application file for complete search history.

(56) References Cited

U.S. PATENT DOCUMENTS

| | | | |
|---|---|---|---|
| 1,564,578 | A | 12/1925 | Kennedy |
| 2,616,145 | A | 11/1952 | Dufford |

(Continued)

FOREIGN PATENT DOCUMENTS

| | | |
|---|---|---|
| WO | WO 2010/036971 | 4/2010 |

OTHER PUBLICATIONS

Innovative Brick Systems LLC, “Technical Design and Installation Guide for the MBrick Versa Liner”, Sep. 2004, www.innovativebrick.com, Rev. 3.

(Continued)

*Primary Examiner* — Galen Hauth

(74) *Attorney, Agent, or Firm* — Knobbe, Martens, Olson & Bear, LLP

(57) ABSTRACT

A formliner, sheet, system, and methods of use and manufacture are provided in order to provide a product that can minimize and/or eliminate visible seaming between interconnected formliners during fabrication of a pattern on a curable material. In some embodiments, the formliner can comprise raised sections that define interrelated inner and outer dimensions. Thus, a plurality of formliners can be interconnected by overlaying raised sections thereof. Further, the formliner can comprise one or more detents and one or more protrusions to enable engagement between interconnected formliners without requiring adhesives. In this manner, formliners can be interconnected in a nested manner such that visible seaming between the interconnected formliners is reduced and/or eliminated.

21 Claims, 39 Drawing Sheets

(51) Int. Cl.

| | |
|---|---|
| ***E04F 21/04*** | (2006.01) |
| ***E04G 9/10*** | (2006.01) |

(56) References Cited

U.S. PATENT DOCUMENTS

| | | | |
|---|---|---|---|
| 2,627,744 A | | 2/1953 | Lopina |
| 3,096,195 A | | 7/1963 | Seman et al. |
| 3,664,630 A | | 5/1972 | Maynen et al. |
| 3,678,887 A | | 7/1972 | Smith |
| 3,692,458 A | | 9/1972 | Kirsch |
| 4,026,083 A | | 5/1977 | Hoyt et al. |
| 4,695,033 A | | 9/1987 | Imaeda et al. |
| 4,773,790 A | | 9/1988 | Hagenah |
| 4,858,410 A | | 8/1989 | Goldman |
| 4,888,928 A | | 12/1989 | Rea et al. |
| 4,932,182 A | | 6/1990 | Thomasson |
| 5,002,817 A | | 3/1991 | Jones |
| 5,487,526 A | | 1/1996 | Hupp |
| 5,632,922 A | | 5/1997 | Nasvik et al. |
| 5,887,846 A | | 3/1999 | Hupp |
| 6,041,567 A | | 3/2000 | Passeno |
| 6,516,578 B1 | | 2/2003 | Hunsaker |
| D479,614 S | * | 9/2003 | Scott et al. .................. D25/199 |
| 6,631,598 B2 | | 10/2003 | Raineri |
| 6,857,248 B2 | | 2/2005 | Ouellet et al. |
| 7,527,236 B2 | | 5/2009 | Nasvik |
| 7,871,054 B2 | | 1/2011 | Walters |
| 7,963,499 B2 | | 6/2011 | Fitzgerald et al. |
| 8,074,957 B2 | | 12/2011 | Fitzgerald et al. |
| 8,181,930 B2 | | 5/2012 | Fasching |
| 8,623,257 B2 | | 1/2014 | Fitzgerald et al. |
| 2005/0064128 A1 | | 3/2005 | Lane et al. |
| 2006/0180731 A1 | | 8/2006 | Scott et al. |
| 2007/0217865 A1 | | 9/2007 | Castonguay et al. |

OTHER PUBLICATIONS

International Preliminary Report on Patentability and Written Opinion of the International Searching Authority received in corresponding PCT Application No. PCT/US2009/058489, mailed Mar. 29, 2011, 7 pages.

International Search Report and Written Opinion received in corresponding PCT Application No. PCT/US2009/058489, mailed Feb. 10, 2010, 14 pages.

* cited by examiner

FORMLINER AND METHOD OF USE

CROSS-REFERENCE TO RELATED APPLICATIONS

The present application is a continuation of U.S. application Ser. No. 12/850,510, filed Aug. 4, 2010, now U.S. Pat. No. 8,623,257, which is a continuation-in-part of U.S. patent application Ser. No. 12/406,896, filed Mar. 18, 2009, now U.S. Pat. No. 8,074,957, which is a continuation-in-part of U.S. patent application Ser. No. 12/238,294, filed Sep. 25, 2008, now U.S. Pat. No. 7,963,499, the entirety of the contents of each of which is incorporated herein by reference.

BACKGROUND

1. Field of the Inventions

The present inventions relate generally to concrete formliners and methods of using the same. More specifically, the present inventions relate to an improved formliner with snap fitting components that eliminates the need for using adhesives for interconnecting a plurality of formliners in a pattern. Further, the formliner is configured to reduce and/or eliminate visible seams in order to create a more natural appearance in a finished product.

2. Description of the Related Art

Decorative masonry and concrete construction have become increasingly popular in recent years. The façades of homes and other buildings that had previously been constructed in very simple and plain concrete are now being replaced with either decorative stone and brick or decorative concrete construction.

As a result of the increased demand for stone and brick work, various improvements have been made in stone and brick masonry and concrete construction. These improvements have lowered the cost for such construction by decreasing the time or skill requirements previously needed to perform such work.

For example, in stone and brick masonry, facings and floors have traditionally constructed by skilled artisans from individual units. However, recent advances have been made in the masonry art which allow artisans to more quickly and accurately perform stone or brick work. In particular, various panels, forms, and mounting systems have been developed that allow individual units to be placed in precise geometric patterns, thus eliminating much of the painstaking effort usually expended by the artisan. This now allows generally unskilled artisans, such as the do-it-yourselfer, to create a high-quality product.

Perhaps more importantly for projects with a tighter budget, advances in concrete construction now allow artisans to create a faux stone or brick appearance in concrete with a formliner. As a result, one may achieve the appearance of stone or brick without the associated cost.

A concrete formliner generally comprises an interior surface onto which concrete is poured. The interior surface of the formliner typically includes a desired pattern or shape that will be transferred to the concrete to form a cured concrete casting. In many cases, the formliner is lined up with additional formliners to create a pattern over a wide area. The concrete casting can be created in a horizontal (such as for tilt up construction) or vertical casting process, and can be precast, or cast-at-site construction.

After the concrete has cured, the formliners are removed from the exposed surface of the concrete, thus revealing the desired pattern or shape. Such patterns or shapes can include faux stone or brick, wave patterns, emblems, etc.

SUMMARY

As noted above, in recent years, significant advances have been made in the art of concrete laying. Various techniques and equipment have been developed that allow for the creation of decorative patterns in the concrete, especially a faux stone or brick appearance. The results of such techniques and equipment provide the appearance of stone or brick without the cost.

However, according to at least one of the embodiments disclosed herein is the realization that in using multiple formliners, seams are created between the formliners where the formliners meet. For example, in order to create a large pattern or casting with prior art formliners, the formliners are merely placed together using butt joints, thus creating significant visible seams between the formliners. As a result, the appearance of the exposed surface of the concrete is compromised. An unsightly seam is very easy to notice and takes a substantial amount of time and effort to remove from cured concrete. Further, in large-scale projects, it is simply too cost prohibitive to re-work the cured concrete in order to remove the seams. As such, the seams are simply left in place resulting in an inferior concrete product.

Thus, the present inventions provide for formliners and methods of use. For example, the formliner can have one or more cells and one or more raised sections or ribs, wherein the formliner is shaped and configured to be interconnected with other such formliners to create a pattern or array of formliners which nest with each other such that an applied material provides a natural appearance and does not show seaming between the formliners that were interconnected to create the pattern. As discussed herein, there are various features that can be incorporated into this broad conception of the formliner in order to provide various combinations and embodiments of the formliner. In the present description, the disclosed features can be optionally incorporated into the above-noted formliner and its method of use in any combination. Additionally, Applicants describe these features and methods in copending patent applications, International Patent Application No. PCT/US2009/058489, filed Sep. 25, 2009, U.S. patent application Ser. No. 12/406,896, filed Mar. 18, 2009, and U.S. patent application Ser. No. 12/238,294, filed Sep. 25, 2008, the entireties of which are incorporated herein by reference.

In accordance with yet another embodiment, a method is provided for transferring a decorative pattern to an exposed surface of a curable material. The method comprise providing a plurality of formliners, each formliner comprising one or more shaped regions being bounded by ridges, each formliner defining overlapped ridges and overlapping ridges. The method can comprise engaging a first formliner with a second formliner by overlaying overlapping ridges of the first formliner onto overlapped ridges of the second formliner. For example, the method can comprise abutting an opening formed in the overlapping ridge of the first formliner with a transition zone formed in the second formliner, the transition zone being formed between the overlapped ridge and a non-overlap ridge of the second formliner. The method can also comprise placing the curable material against the first and second formliners, for example, to transmit a decorative pattern formed by the shaped regions of the first and second formliners to the curable material.

In some embodiments, each formliner can comprise non-overlap ridges and at least one opening formed in the overlapping ridges. Thus, the method can further comprise overlaying the overlapping ridges of the first formliner onto the overlapped ridges of the second formliner with a non-overlap ridge of the second formliner extending from an opening of the overlapping ridges of the first formliner. The non-overlap ridge of the second formliner can be interconnected with and extend from the overlapped ridge of the second formliner.

In some embodiments, the non-overlap ridge of the second formliner can be separated from the overlapped ridge of the second formliner by a transition zone formed in the second formliner, and the method further comprises abutting the opening of the first formliner with the transition zone of the second formliner. In some embodiments, the overlapping ridge and the non-overlap ridge can have generally the same exterior cross-sectional profile. The opening can be formed as an open end of the overlapping ridge of the first formliner.

The overlapping ridges of the first formliner can define an interior cross-sectional profile that is greater than an exterior cross-sectional profile of the overlapped ridges of the second formliner. In such embodiments, the method can comprise engaging a third formliner with the first formliner and the second formliner. The third formliner can comprise overlapping ridges and overlapped ridges. One of the first, second, and third formliners can comprise a sub-overlapped ridge section that defines an exterior cross-sectional profile that is less than an interior cross-sectional profile of the overlapped ridges.

For example, the sub-overlapped ridge section can be formed along a corner of a periphery of the third formliner. The method can comprise overlaying an overlapped ridge onto the sub-overlapped ridge section. Thus, in some embodiments, the third formliner can comprise the sub-overlapped ridge section formed along a corner of a periphery of the third formliner, and the first formliner and the second formliner can overlap the third formliner at the sub-overlapped ridge section of the third formliner.

In some embodiments of the method, the first formliner and the second formliner can each comprise at least one row with a projecting cell bordered in at least one adjacent row with a non-projecting cell, and the method can comprise engaging the first formliner and the second formliner with a projecting cell in a first row of the first formliner being positioned adjacent to a non-projecting cell in a first row of the second formliner and a projecting cell in a second row of the second formliner being positioned adjacent to a non-projecting cell in a second row of the first formliner.

Further, in some embodiments, edges the overlapping ridges of the first formliner can extend downwardly toward a bottom portion of respective shaped regions located adjacent to overlapped ridges of the second formliner. The method can comprise placing the curable material against the overlapping ridges of the first formliner such that the edges of the overlapping ridges of the first formliner are urged adjacent to the bottom portion of respective shaped regions to minimize and/or eliminate a seam formed between the edges and the bottom portion of the respective shaped regions.

The method can also comprise: interconnecting a first formliner with a second formliner by overlaying a first section of a rib of the first formliner onto a second section of a rib of the second formliner such that the second section of the rib of the second formliner is nested within a recess of the first section of the rib of the first formliner; and positioning an exterior surface of the first section of the rib of the first formliner flush with an exterior surface of a first section of the rib of the second formliner upon nesting of the second section of the second formliner within the first section of the first formliner.

In such embodiments, the method can further comprise interconnecting a third formliner with the first and second formliners by overlaying the first section of the rib of the first formliner and the second section of the rib of the second formliner onto a third section of a rib of the third formliner. Further, the method can comprise positioning an exterior surface of a first section of the rib of the third formliner flush with the exterior surface of the first section of the rib of one of the first and second formliners upon nesting of the third section of the rib of the third formliner within the first section of the rib of the first formliner and the second section of the rib of the second formliner.

Additionally, the method can further comprise mating an opening in the first section of the first formliner against a transition zone of the second formliner such that visible seams in the decorative pattern are minimized when the first formliner and the second formliner are interconnected in use. The transition zone can be formed between the first and second sections of the rib of the second formliner. Further, the opening can be formed as an open end of the first section of the first formliner.

In some embodiments, the method can comprise engaging a first formliner with a second formliner by overlaying overlapping ridges of the first formliner on to overlapped ridges of the second formliner and causing engagement between a protrusion of one of the overlapping ridges with a detent of one of the overlapped ridges.

One of the unique aspects of such a method is that it can be implemented such that no adhesive is used to engage the first formliner with the second formliner. In some implementations, the step of causing engagement between a protrusion of one of the overlapping ridges with a detent of one of the overlapped ridges can be completed prior to placing the curable material against the first and second formliners. Further, the step of causing engagement between a protrusion of one of the overlapping ridges with a detent of one of the overlapped ridges can comprise engaging a pair of protrusions of an overlapping ridge with a pair of detents of the overlapped ridge. In this regard, the pair of protrusions can be disposed on opposing sides of the overlapping ridge and the pair of detents can be disposed on opposing sides of the overlapped ridge.

Moreover, the method can also comprise the step of engaging a third formliner with the first formliner and the second formliner. The third formliner can comprise overlapping ridges and overlapped ridges, and one of the first, second, and third formliner comprising a sub-overlapped ridge section. The sub-overlapped ridge section can define an exterior geometry that can be less than an interior geometry of the overlapped ridges. In this regard, the method can further comprise overlaying an overlapped ridge onto the sub-overlapped ridge section. Additionally, the sub-overlapped ridge section can be formed along a corner of a periphery of the first formliner, and the method can comprise overlaying the second formliner and the third formliner onto the first formliner at the sub-overlapped ridge section of the first formliner.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures.

DETAILED DESCRIPTION

Figure 1:
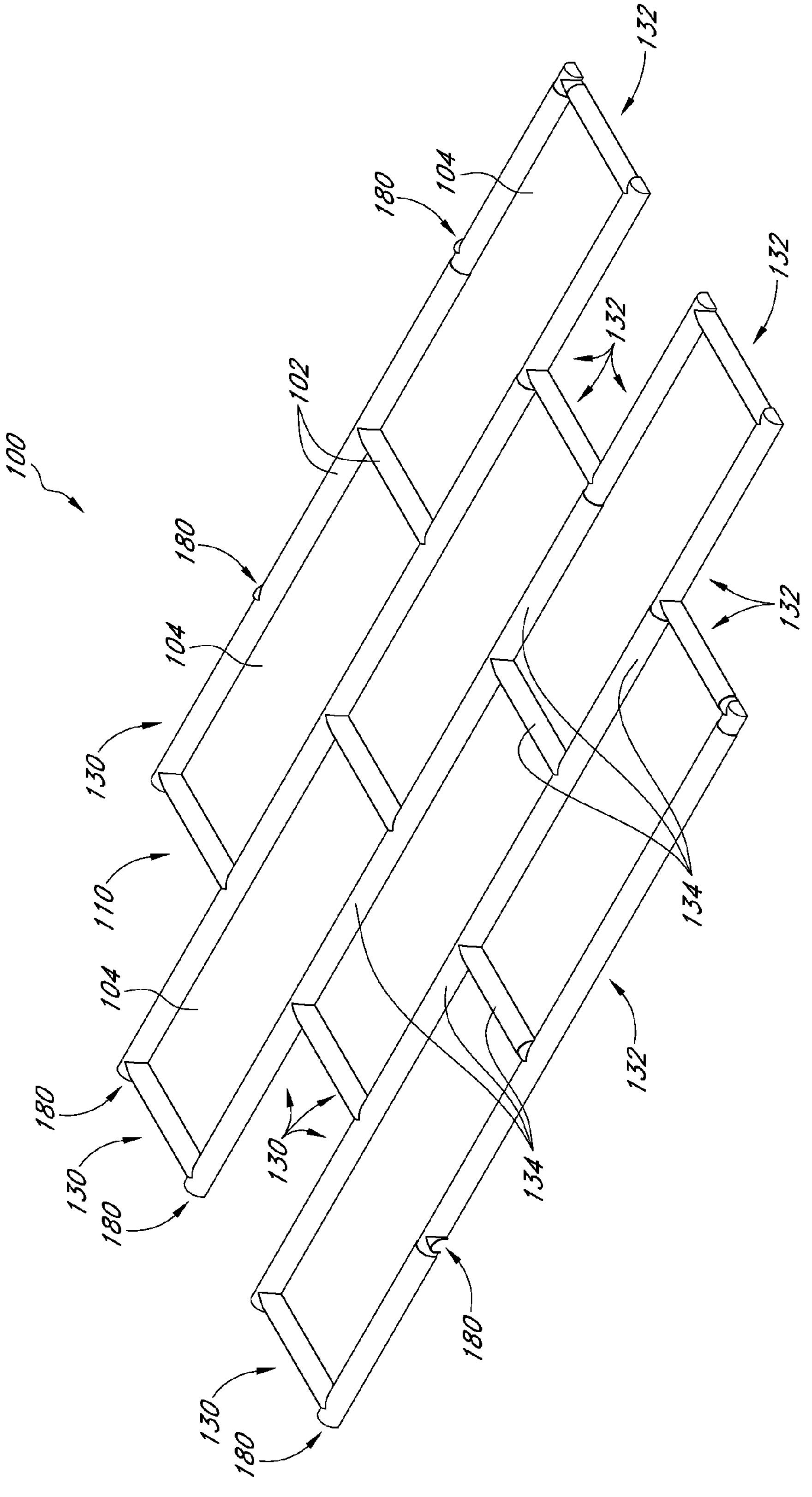
FIG. 1 is a perspective view of a formliner, according to an embodiment of the present inventions.

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein.

As generally discussed above, embodiments of the present inventions are advantageously configured in order to enhance the aesthetic finish of a concrete structure. In particular, embodiments disclosed herein can be used to create a natural, seamless appearance of brick, stone, and other types of materials in a concrete structure.

In contrast to prior art formliners that produce an inferior quality product, the structures of embodiments of the formliner disclosed herein, which can also be referred to as a panel or sheet, allow the formliner to create decorative patterns that are visually superior to results provided through the prior art. These significant advantages are due at least in part to the nesting arrangement of the variable size channels of embodiments of the formliner disclosed herein. In particular, the formliner can comprise one or more large interconnection sections and one or more small interconnection sections such that a plurality of formliners can be interconnected at their respective large and small interconnection sections. When interconnected, the plurality of formliners can define one or more generally continuous dimensions or shapes of raise portions thereof. For example, the large and small interconnection sections can configured as nesting semi-cylinders that form a rib structure. Additional advantages and features of embodiments of the formliner are discussed further below.

In some embodiments, it is contemplated that the formliner can be attached to another formliner and/or a form work by means of an adhesive. The adhesive can be disposed on a rear surface or back of the formliner and/or onto a front surface of the formliner. For example, the adhesive can be disposed on the front surface along a rib or ridge that will be overlaid by a portion of another formliner.

In some embodiments, the adhesive can be applied to the formliner at the site. For example, the adhesive can be applied or sprayed onto the formliner. However, in other embodiments, the formliner can comprise an adhesive that can be activated or exposed in order to enable adhesive attachment of the formliner to another formliner or to a form work. In such embodiments, the adhesive can be pre-applied to the formliner and can be exposed by removing a cover strip or activated by dampening with a liquid such as water or otherwise. As such, by peeling away a cover strip or by providing moisture to the adhesive, the adhesive can be activated to adhesively attach the formliner to another formliner or to a form work. As noted above in this manner, the formliner can be securely attached another formliner in a pattern and/or to a form work to facilitate handling and placement of the formliner.

Embodiments of the formliner and formliner components disclosed herein can be manufactured using any of a variety of processes. For example, it is contemplated that some embodiments can be formed using a sheet and a vacuum forming operation. Other manufacturing processes such as injection molding, stamping, extrusion, etc. can also be used.

With reference now to the figures, FIG. 1 is a perspective view of an embodiment of a formliner, panel, or sheet 100. The formliner 100 can comprise a plurality of ribs, ridges, or channels 102. The ribs 102 can be a raised portion of the formliner 100. The ribs 102 can define an outer perimeter of the formliner 100. Additionally, the ribs 102 can extend inwardly to form one or more cells or recesses 104.

In some embodiments, the cells 104 can comprise a recessed portion of the formliner 100. The recessed portion of the cell 104 can be configured to receive a curable material to which a pattern of the formliner can be conferred or transferred. The cells 104 can be uniformly sized. For example, the cells 104 can be rectangularly shaped. As discussed below, embodiments of the formliner 100 can implement other shapes, depths, and sizes of the cells 104.

As illustrated in the embodiment of FIG. 1, the cells or recesses 104 can be arranged in rows. As will be discussed further below, the cells or recesses 104 of a given row can be offset with respect to cells or recesses of an adjacent or neighboring row. In this regard, a plurality of formliners 100 can be interconnected along ends thereof in such a way as to reduce any visible appearance of a seam between interconnected formliners. The offset configuration of the cells or recesses 104 in some embodiments can aid in concealing or hiding any seaming between formliners.

Additionally, the embodiment illustrated in FIG. 1 illustrates that the cells 104 of adjacent rows can be offset from each other such that at opposing ends of the formliner 100, some of the cells 104 protrude at the end. In this regard, the rows can be formed to include projecting and non-projecting cells 104. The projecting cells can be considered to be complete or whole cells. In other words, the projecting cells are not smaller in size than other cells 104 of the pattern even though the offset configuration of the cells 104 causes the projecting cells to protrude at one side or end of the formliner 100. As will be discussed further below, the projecting cells of the pattern can be interconnected with projecting cells of another formliner.

The embodiment illustrated in FIG. 1 can be used to create a faux brick pattern on a concrete structure. The formliner 100 can define a panel periphery bounding the plurality of cells 104 by a plurality of sides. The formliner 100 defines an upper surface 110. Although not shown in FIG. 1, the formliner 100 also defines a lower surface. In use, the upper surface 110 of the formliner 100 would be positioned such that it can be pressed into fresh concrete. This can be accomplished by placing the upper surface 110 of the formliner 100 against an exposed surface of fresh concrete. Otherwise, this can be accomplished by affixing the lower surface of the formliner 100 to an interior wall of a pattern, casting, or formwork before concrete is poured into the pattern, casting, or formwork. In either case, a material, such as concrete can be placed against the decorative pattern of the formliner 100 defined by the ribs 102 and the cells 104 in order to transfer the decorative pattern to the exposed surface of the material as the material cures.

In many cases, the exposed surface of a given structure, such as a wall, walking area, or the like, consists of a large surface area. In order to cover the entire area, several formliners must be used. As shown in the formliner assembly of FIG. 2, several formliners 120, 122, and 124 can be interconnected in order to transfer a decorative pattern onto a large surface area. The interconnection of these formliners 120, 122, and 124 provides a distinct advantage over prior art to formliners because the seams between the formliners 120, 122, and 124 are insubstantial and/or eliminated compared to prior art formliners.

As discussed above, FIG. 2 illustrates that the formliner 120 can comprise projecting cells 125 in the formliner 122 can comprise one or more projecting cells 126. These projecting cells 125, 126 can be positioned in different rooms of the formliners 120, 122. Thus, the projecting cells 125 can be positioned adjacent to non-projecting cells of the formliner 122 in the projecting cell 126 can be positioned adjacent to a non-projecting cell of the formliner 120. Thus, the cells of the formliner 120 can be offset with respect to each other and with respect to cells above the formliner 122. Moreover, the interconnection of the formliners 120, 122 can be accomplished using offset projecting cells 125, 126.

Figure 2:
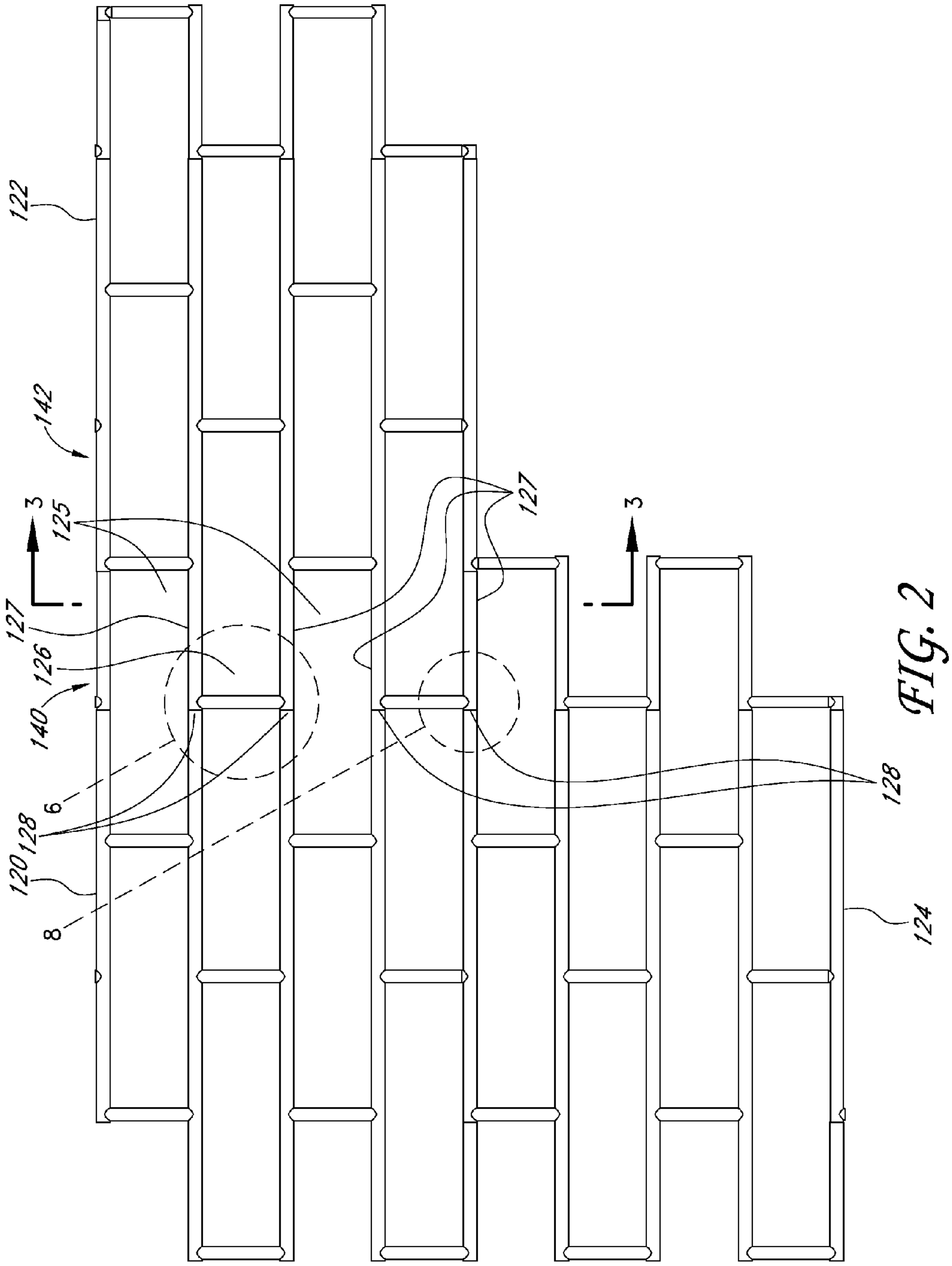
FIG. 2 is a top view of a plurality of formliners that are interconnected to create a formliner assembly, according to an embodiment.

In accordance with some embodiments, the formliner 100 illustrated in FIG. 1 can be configured such that a plurality of formliners 100 can be interconnected at their top and bottom ends and sides. FIG. 2 illustrates this principle. The formliners 120, 122, and 124 are each interconnected and overlap each other. This interconnection allows the formliners to be easily handled and assembled to a given size. Importantly however, the formliner is configured such that portions thereof can overlap and create a generally uniform and seamless rib structure on the upper surface 110 of the formliners 120, 122, and 124. In other words, the shape and depth of the rib structure formed in the exposed surface of the concrete structure can be generally constant and the transition from a given formliner to another given formliner can be generally imperceptible.

Moreover, in some embodiments, edges of each of the respective formliners 120, 122, and 124 can lie along a corner or edge feature of the decorative pattern. As such, when a curable material is placed in against the formliners and takes the shape, in this case of a rectangle having right-angle corners, an edge 127 of the formliner 122 forms a portion of the corner of the molded or formed rectangle and becomes nearly imperceptible. Accordingly, the overlapping edges 127 of the formliner 122 create minimal visible seaming, if at all, between the formliners 120 and 122. This principle is illustrated in greater detail in FIGS. 6-9.

Additionally, transition zones or joints 128 are formed where upper surfaces of ribs the formliners 120, 122, and 124 meet. In this regard, the transition zones or joints 128 can be toleranced in order to define an extremely narrow gap between interconnected formliners. Thus, any seaming at the transition zones or joints 128 can also be greatly reduced in order to reduce and/or eliminate visible seaming.

In this regard, the formliner 100 can be configured such that the plurality of ribs 102 includes one or more overlapping portions 130 and one or more overlapped portions 132. In some embodiments, the plurality of ribs 102 of the formliner 100 can be configured to comprise one or more non-overlap portions 134. The overlapping portions 130 can be configured to include an internal cavity with an internal geometry that accommodates the external geometry of the overlapped portions 132. Thus, the overlapped portions 132 can be received within the internal cavities of the overlapping portions 130. The non-overlap portions 134 can extend between overlapping portions 130 and overlapped portions 132. However, the non-overlap portions 134 will not overlap or be overlapped by portions of another formliner win a plurality of formliners are interconnected. When a plurality of formliners is interconnected, the external surface of the overlapping portions 130 can be flush with the external surface of the non-overlap portions 134.

Figure 3:
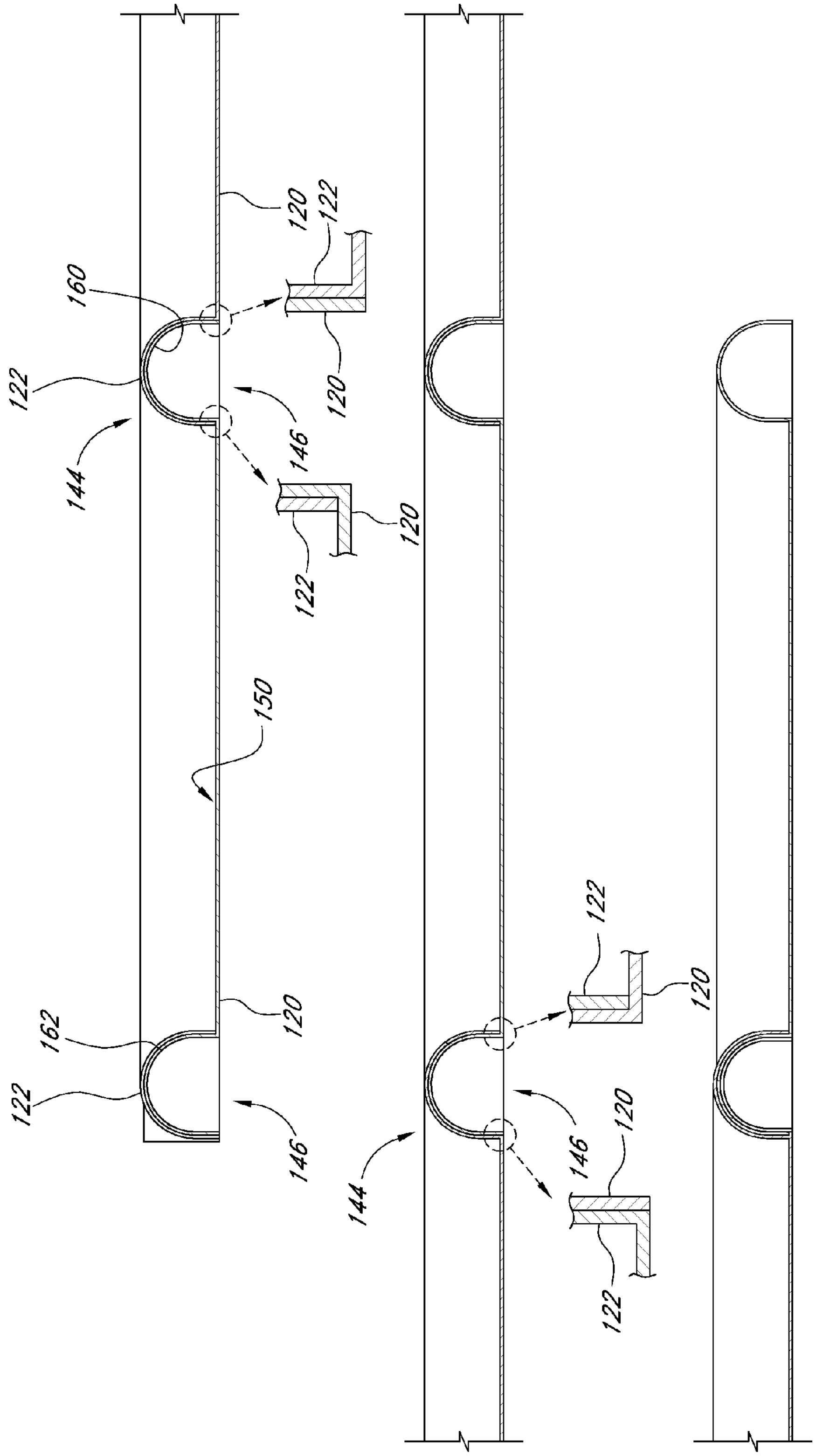
FIG. 3 is a cross-sectional side view taken along section 3-3 of FIG. 2.

An illustration of this principle is shown in FIGS. 3 and 7B and described below. FIG. 3 it is a cross-sectional side view taken along Section 3-3 of FIG. 2. FIG. 2 illustrates that a right side 140 of the formliner 120 overlaps with a left side 142 of the formliner 122.

In FIG. 3, an overlapping portion 144 of the formliner 122 rests on top of an overlapped portion 146 of the formliner 120. The cross-sectional side view also illustrates a cell 150 of the formliner 120. Further, the formliners 120, 122 are configured such that the overlapping portion 144 of the formliner 122 defines an outer surface that matches an outer surface of the ribs 102 of the formliners 120, 122, and 124. In other words, the overlapping portions of a formliner can have an outer dimension that is equal to an outer dimension of the non-overlap portions of the ribs of the formliner. Thus, the overall rib structure of interconnected formliners will seem continuous in shape and dimension because the overlapping portions and the non-overlap portions (and not the overlapped portions) of the ribs of the formliners are the only portions of the ribs that are exposed.

In addition, as discussed below with regard to FIG. 10, one of the significant advantages of embodiments disclosed herein is that they are able to reduce and/or eliminate seams between adjacent formliners using the significant compressive stresses created by the weight of a curable material, such as concrete, poured onto a formliner assembly or formliner mold cavity. In other words, the configuration of the overlapped and overlapping portions of adjacent formliners enabled the weight of the material to press down upon the overlapping portions of a formliner in order to optimize the fit between overlapping portions and overlapped portions of adjacent formliners to thereby reduce any visible seaming between the formliners.

Referring still to FIG. 3, the rib structure of the formliners 120, 122 can be generally defined by a semicylindrical or arch shape. Accordingly, the overlapping portions 144 and the overlapped portions 146 can be defined by a radius. In particular, a lower surface 160 of the overlapping portion 144 of the formliner 122 can be defined by a first radius. Similarly, an upper surface 162 of the overlapped portion 146 of the formliner 120 can be defined by a second radius. The first radius can be greater than the second radius in order to allow the overlapped portion 146 to be nested within the overlapping portion 144. As such, the overlapped portions 146 can define a smaller cross-sectional profile than the interior cavity of the overlapping portions 144.

Furthermore, although the rib structure is illustrated as being formed by semicylindrical or arch shaped channels, the rib structure can be formed by a rectangular cross-section. In this regard, any variety of shapes can be used. For example, while an embodiment of the formliners discussed herein is generally intended to create an appearance of faux brick, other embodiments of the formliners disclosed herein can be designed to create an appearance of faux stone, including any of various commercial stone such as cut stone, castle rock, sand stone, ledgestone, fieldstone, etc., as well as, wood, river rock, slate, or other materials and variations, which is merely an exemplary and non-limiting list of potential appearances and applications. Thus, the rib structure can be varied and diverse. The dimensions of the rib structure can be variable and allow for irregular patterns as may be seen in natural settings of stone, brick, wood, or other materials.

In addition, referring again to FIG. 1, the formliner 100 can comprise a plurality of rib openings 180. The rib openings 180 can be positioned along the ribs 102 of the rib structure of the formliner 100. The location of the openings 180 can correspond to a location of a corresponding rib of another formliner to which the formliner 100 is interconnected. The rib openings 180 can facilitate precise alignment of a plurality of formliners. Further, the rib openings 180 can further contribute to the natural appearance of the faux brick pattern created in the concrete structure. The formation and configuration of rib openings 180 is shown and described further below.

Figure 4:
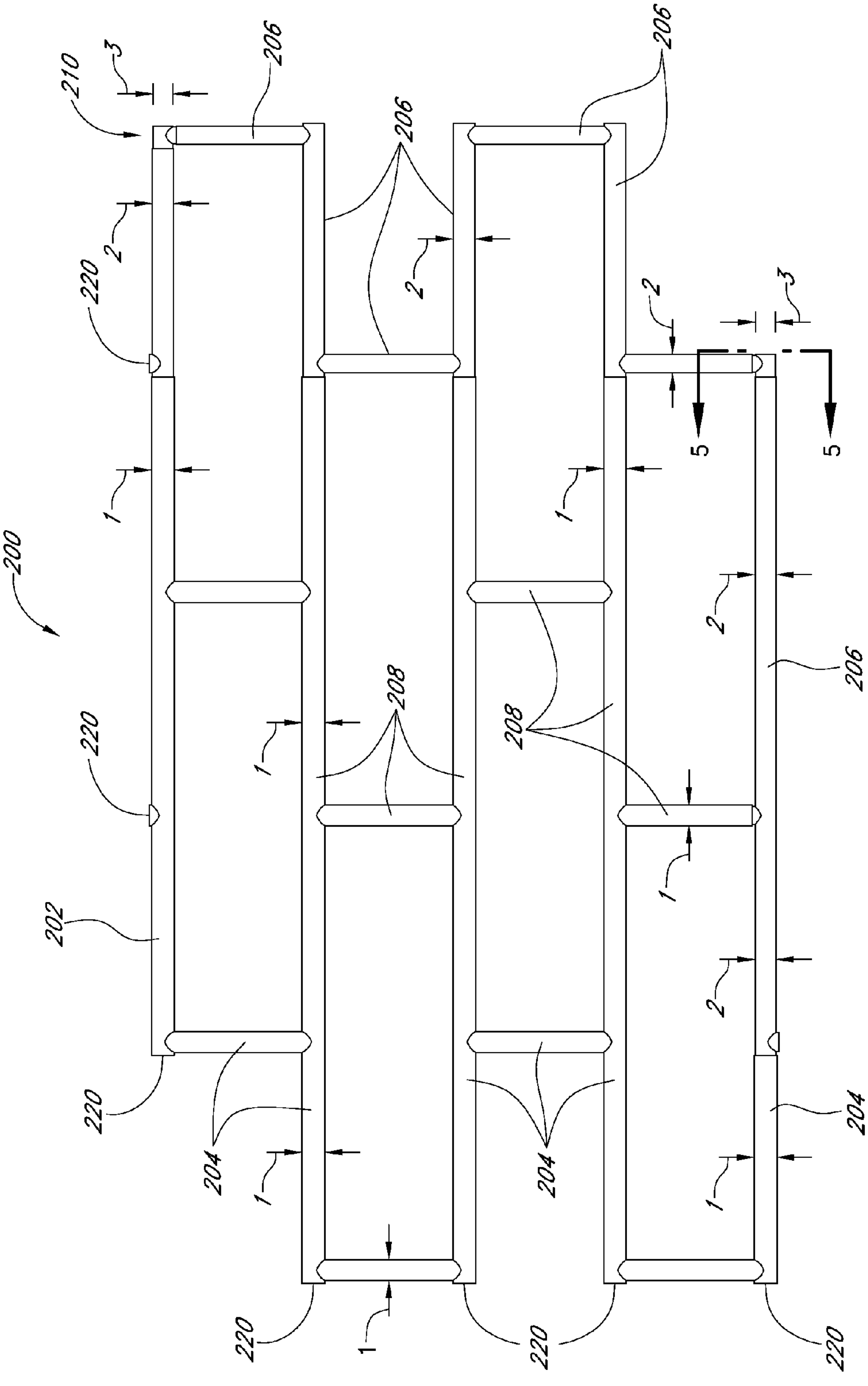
FIG. 4 is a top view of a formliner, according to an embodiment.

FIG. 4 is a top view of a formliner 200 in accordance with an embodiment. As with the formliner 100, the formliner 200 comprises a plurality of ribs 202 that form a ribs structure. The ribs 202 can comprise one or more overlapping portions 204 and one or more overlapped portions 206. Additionally, the formliner 200 can comprise non-overlap portions 208. The embodiment of FIG. 4 illustrates that the overlapping portions 204 and the non-overlap portions 208 can define a common outer dimension 1. Thus, when a plurality of the formliners 200 are interconnected, the overlapping portions 204 overlap with the overlapped portions 206 and the resulting rib structure of the interconnected formliners has a common outer dimension 1.

In this regard, as discussed above, the overlapped portions 206 can define an outer dimension 2. The outer dimension 2 can be less than the outer dimension 1. Further, an inner dimension of the overlapping portions 204 can also be greater than the outer dimension 2 of the overlapped portions 206.

Moreover, it is contemplated that in using a formliner that defines a generally rectangular perimeter, there may be sections of interconnected formliners in which more than two formliners overlap. Accordingly, in some embodiments, the formliner 200 can be configured to define a sub-overlapped section 210. As illustrated in the upper and lower right corners of the formliner 200, the sub-overlapped sections 210 can define an outer dimension 3. The outer dimension 3 can be less than the outer dimension 2 and the outer dimension 1. Further, an inner dimension of the overlapped portions 206 can also be greater than the outer dimension 3 of the sub-overlapped portions 210. Additionally, as described above with respect to FIG. 1, the formliner 200 can also be configured to include a plurality of rib openings 220. As similarly described above, the plurality of rib openings 220 can be located and configured to correspond with corresponding ribs of adjacent interconnected formliners.

In this manner, a single configuration of a formliner can be used to create a continuous decorative pattern that can be used for any size concrete structure. Advantageously, in contrast to prior art formliners, embodiments of the formliners disclosed herein can be interconnected to create a dimensionally continuous, precise assembly of formliners.

Figure 5:
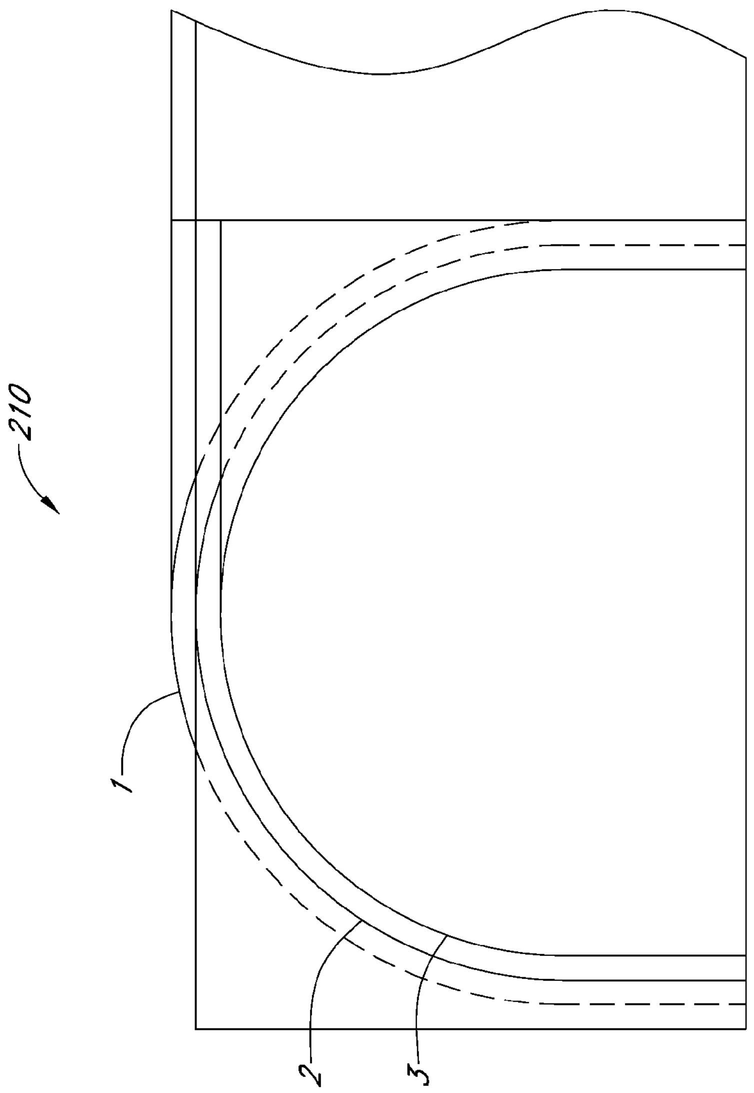
FIG. 5 is an end view taken along section 5-5 of FIG. 4.

Referring now to FIG. 5, an end view of the sub-overlapped section 210 of FIG. 4 is illustrated. As shown, the sub-overlapped section 210 defines an outer dimension 3 that is less than the outer dimension 2 of the overlapped section 206 (shown in dashed lines). Additionally, the outer dimension 1 of the overlapping sections 204 is also shown dashed lines and illustrated as being greater than both the outer dimension 2 and the outer dimension 3.

Figure 6:
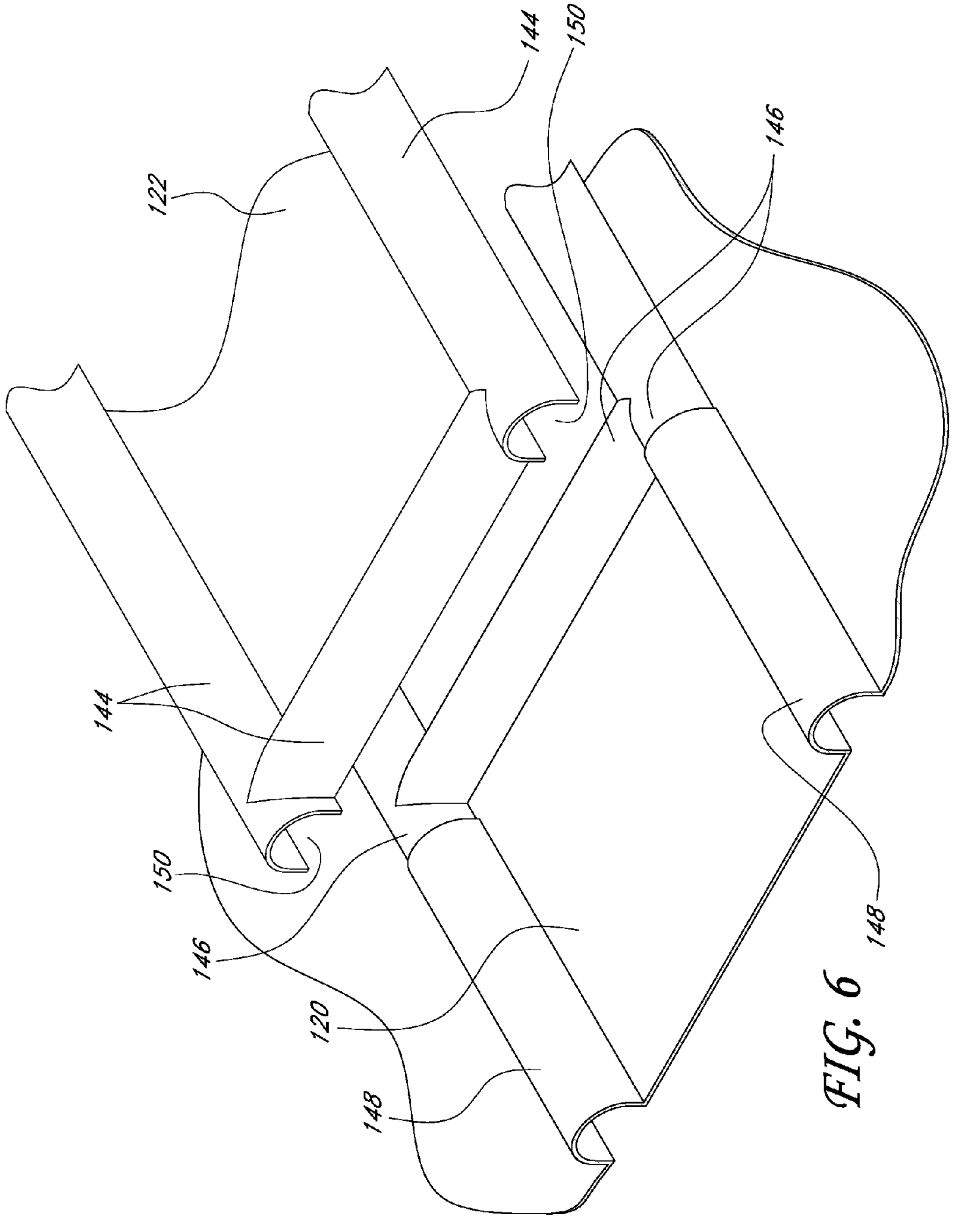
FIG. 6 is a perspective view of first and second formliners as the first formliner is overlaid onto the second formliner, according to an embodiment.

FIG. 6 is a perspective view of the formliner assembly of FIG. 2. In particular, the formliner 122 and the formliner 120 are shown in a pre-assembled state. In this regard, FIG. 6 illustrates that the overlapped sections 146 of the formliner 120 are received within cavities of the overlapping sections 144 of the formliner 122. As discussed below in reference to FIG. 10, the upper surfaces of the overlapping sections 144 of the formliner 122 can be generally flush with the upper surfaces of non-overlap sections 148 of the formliner 120.

Figure 7:
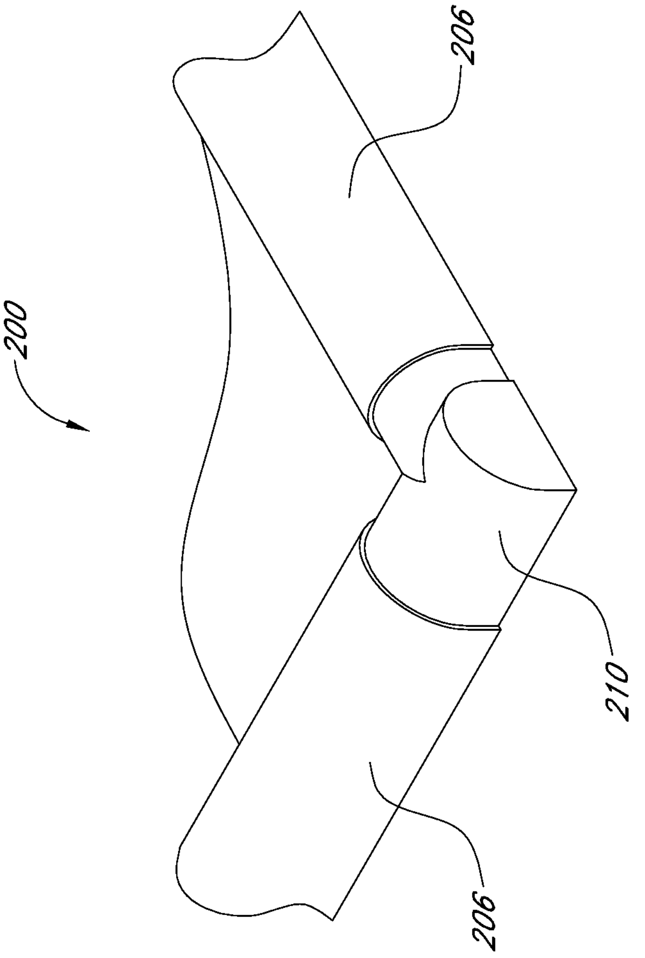
FIG. 7 is an enlarged perspective view of a rib corner of the formliner shown in FIG. 4.

FIG. 7 is a partial perspective view of the formliner 200, illustrating the sub-overlapped portion 210 thereof. As shown, the sub-overlapped portion 210 defines a smaller cross-sectional profile or dimension than the overlapped portion 206.

Figure 8:
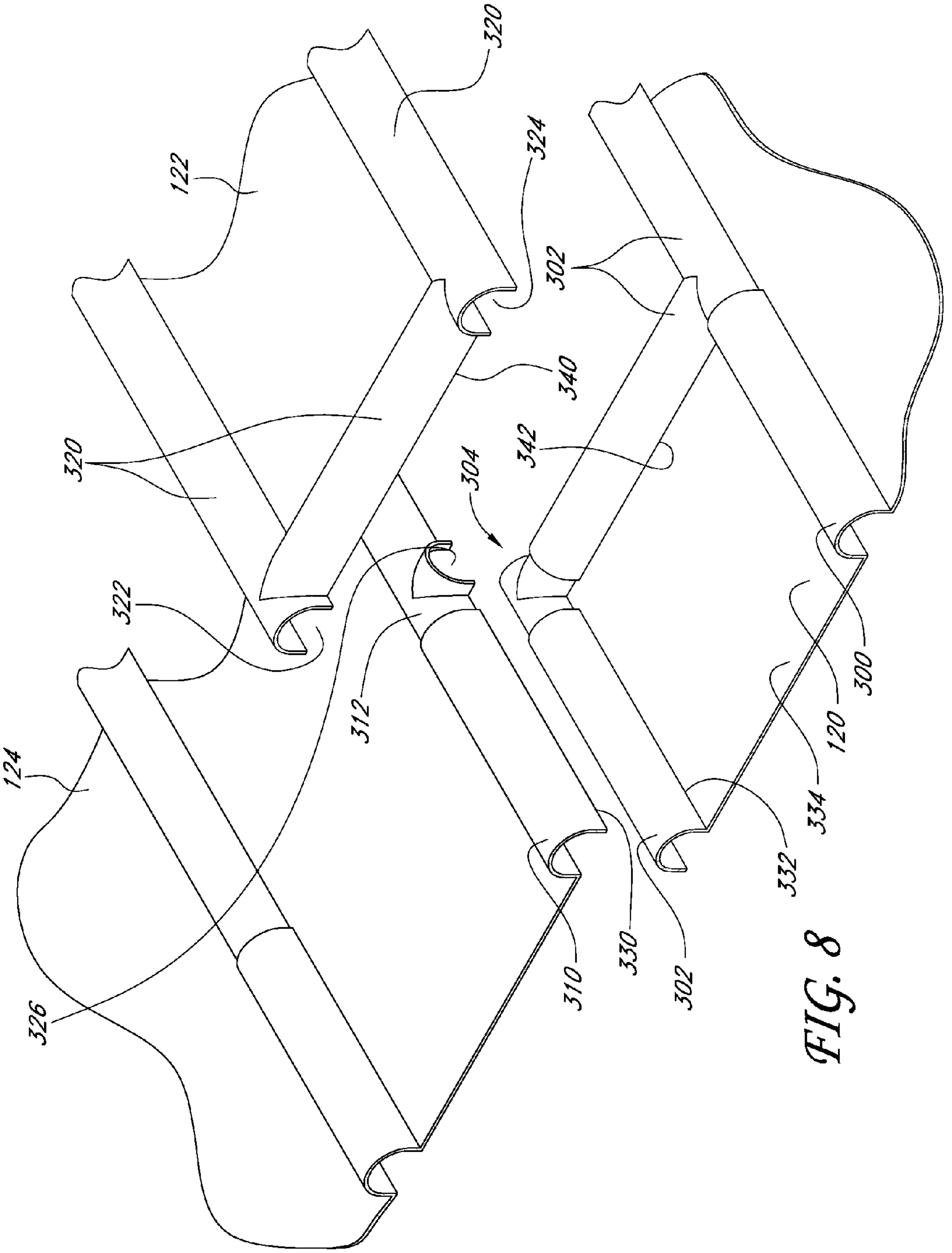
FIG. 8 is a perspective view of a first formliner, a second formliner, and a third formliner illustrating nesting of the formliners along a rib corner of the first formliner, according to an embodiment.

FIG. 8 is a perspective view of the formliner assembly of FIG. 2 illustrating the formliners 120, 122, and 124. In this view, the ribs structure of the formliner 120 comprises overlapping portions 300, overlapped portions 302, and a sub-overlapped portion 304. The formliner 124 is first placed onto the overlapped portion 302 of the formliner 120. As can be appreciated, an overlapping portion 310 of the formliner 124 is placed onto an overlapped portion 302 of the formliner 120. Additionally, an overlapped portion 312 (shown as a T-connection) of the formliner 124 is placed onto the sub-overlapped portion 304 of the formliner 120. Finally, overlapping portions 320 of the formliner 122 are placed onto the overlapped portions 302 of the formliner 120 and the overlapped portion 312 of the formliner 124.

One of the unique features of embodiments disclosed herein is the inclusion of rib openings that allow the overlapped portions of the ribs to be nested within overlapping portions of other ribs and to extend through the rib openings. For example, with reference to FIG. 6, rib openings 150 can be provided in the overlapping sections 144 of the formliner 122. Further, with regard to FIG. 8, a rib opening 322 is provided in the overlapping portions 320 of the formliner 122. This rib opening 322 allows the overlapping portions 320 to be overlaid onto the overlapped portion 312 with the overlapped portion 312 extending through the rib opening 322. Similarly, a rib opening 324 allows the overlapped portions 302 the past therethrough thus enabling the overlapping portions 320 to be overlaid onto the overlapped portions 302. Finally, the illustrated embodiment in FIG. 8 also shows a rib opening 326 formed in the overlapped portion 312, which enables the sub-overlapped portion 304 to extend therethrough. As will be appreciated by one of skill in the art, the rib openings of some embodiments disclosed herein uniquely allow overlapping formliners to minimize visible seaming by allowing the overlapping portions of the formliners to fit tightly and closely together.

With reference to FIG. 8, once assembled, the overlapping portions 300, 310, and 320 each define a common outer dimension or shape. Thus, when the formliner assembly is pressed into an exposed surface of fresh concrete or when concrete is poured thereagainst, the impressions of the rib structure of the formliner assembly will appear seamless and uniform.

In addition, as will be appreciated, once the formliners 120, 122, and 124 are assembled, an edge 330 of the overlapping portion 310 of the formliner 124 will be disposed into a corner 332 formed between the overlapped portion 302 and a cell 334 of the formliner 120. As such, any seaming between the overlapping portion 310 of the formliner 124 and the cell 334 of the formliner 120 will be reduced and/or eliminated.

Similarly, an edge 340 of the overlapping portion 320 of the formliner 122 will be disposed into a corner 342 formed by the overlapped portion 302 and the cell 334. Thus, seaming between the formliner 120 and formliner 122 will be greatly reduced and/or eliminated.

Figure 9:
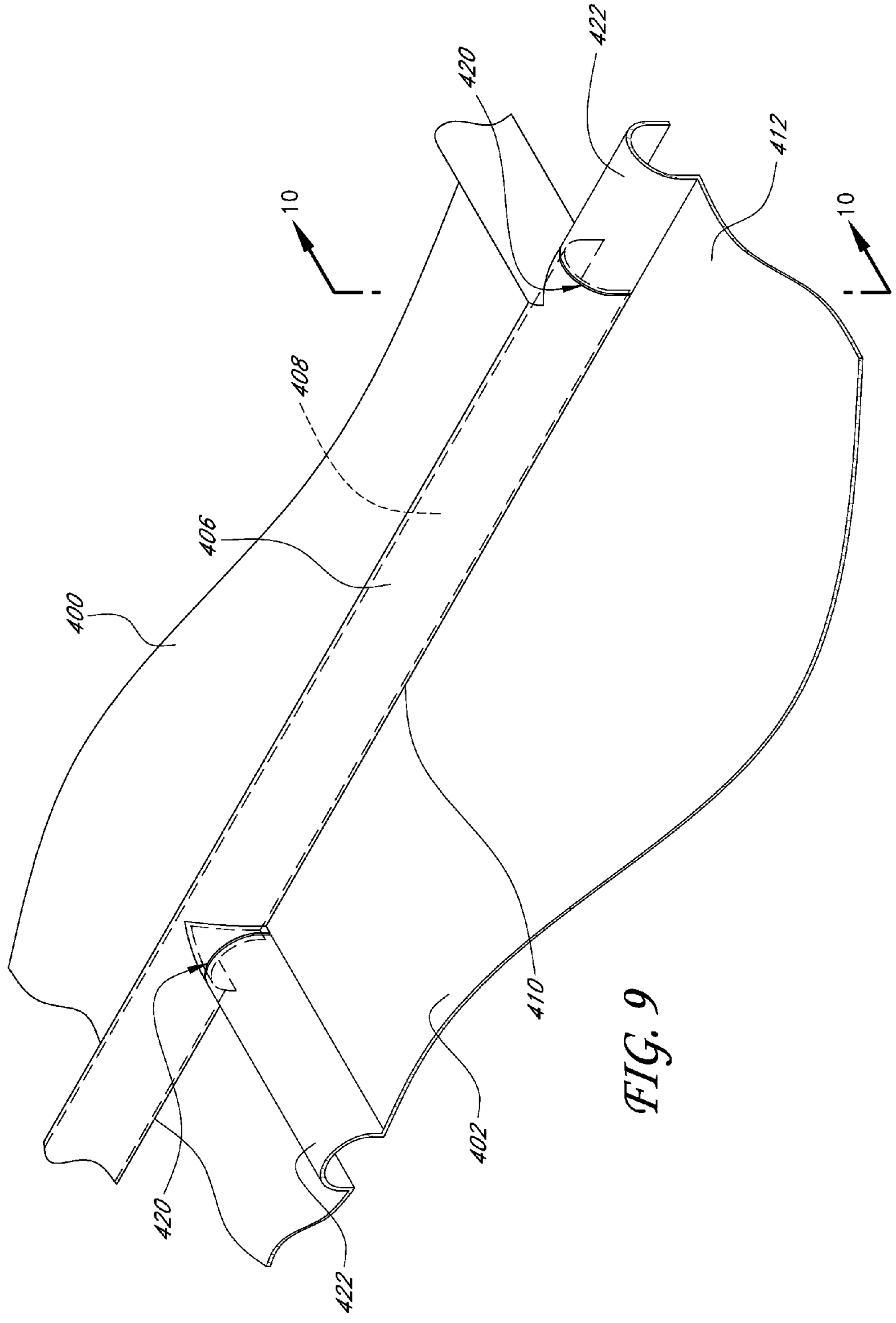
FIG. 9 is a perspective view of first and second formliners in an interconnected configuration, according to an embodiment.

FIG. 9 illustrates many of the above-discussed principles. In this figure, a first formliner 400 is mated with a second formliner 402. And overlapping portion 406 of the first formliner 400 is placed onto an overlapped portion 408 of the second formliner 402. As discussed above with respect to FIG. 8, the mating of an edge 410 of the overlapping portion 406 with 412 of the second formliner 402 can create an imperceptible seam between the first and second formliners 400, 402. Further, transition zones or joints 420 between the overlapping portion 406 of the first formliner 400 and an overlapping portion 422 of the second formliner 402 can be minimized so as to reduce and/or eliminate any visible seaming at the transition zones or joints 420.

Figure 10:
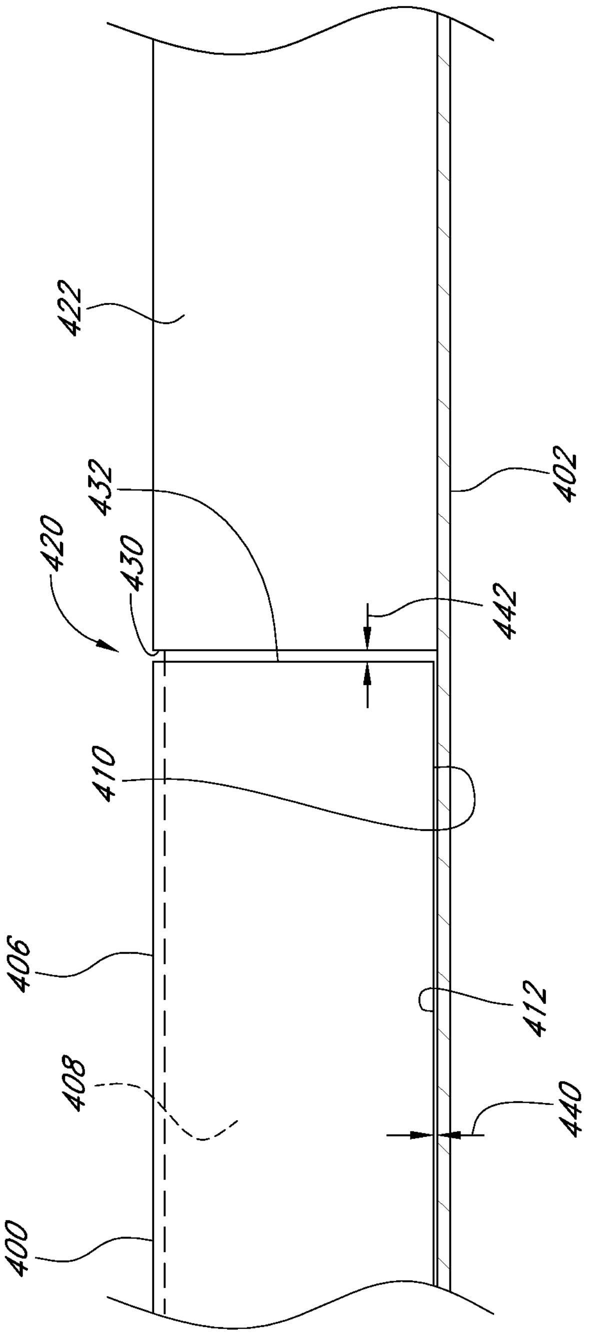
FIG. 10 is a cross-sectional side view of the first and second formliners shown in FIG. 9 illustrating flush exterior surfaces of the first and second formliners.

Referring now to FIG. 10, an enlarged view of a transition zone or joint 420 of FIG. 9 is illustrated. As shown, the transition zone or joint 420 can comprise a simple step 430 from a first dimension to a second dimension. In some embodiments, this may be an immediate increase in the dimension along the rib of the second formliner, specifically from the overlapped portion 408 to the overlapping portion 422. However, in other embodiments, it is contemplated that the step 430 can be a tapered transition between the overlapped portion 408 in the overlapping portion 422. Additionally, a side edge 432 of the overlapping portion 406 of the first formliner 400 can be configured to correspond to the shape and dimension of the step 430.

Further, FIG. 10 also illustrates the nesting arrangement of the overlapping portion 406 of the first formliner 400 is shown with respect to the overlapped portion 408 of the second formliner 402. Finally, FIG. 10 also illustrates the orientation of the edge 410 of the overlapping portion 406 of the formliner 400 is shown with respect to the cell 412 of the second formliner 402.

With continued reference to FIG. 10, it will be appreciated that a seam 440 formed between the edge 410 and the cell 412 can be reduced as the fit between the first formliner 400 and the second formliner 402 are optimized. In this regard, the internal geometry of the overlapping portion 406 can be specifically configured to match the external geometry of the overlapped portion 408, thus reducing any seam (whether along the edge 410 or the side edge 432) between the overlapping portion 406 and the overlapped portion 408.

As noted above, one of the advantages of embodiments disclosed herein is that seams of overlapped portions of adjacent formliners can be minimized and/or eliminated. In this regard, as illustrated in FIG. 10, the seam 440 is created along a corner at or along a bottom portion of the cell 412 of the formliner 402 which forms part of a prepared formliner mold cavity. In this regard, the seam 440 is positioned such that the weight of a curable material, such as concrete, against the first formliner 400 causes the overlapping portion 406 of the first formliner 400 to be pressed against the overlapped portion 408 of the second formliner 402 with great force thereby causing the edge 410 to be positioned as close as possible relative to the cell 412 in order to minimize and/or eliminate the seam 440 between the adjacent formliners 400, 402. This innovative feature of embodiments disclosed herein, which allows seams to be created along the bottom faces or portions of the mold allows the weight of the curable material to act as a compressive agent in reducing and/or eliminating seams between adjacent formliners. For example, a common curable material such as concrete generally weighs 150 pounds per cubic foot, and embodiments of the present inventions are able to take advantage of the significant force of such a material in order to create an aesthetically superior product.

Furthermore, the tolerances between the overlapping portion 406 and the overlapped portion 408 can also define a seam 442. Specifically, the distance between the edge 432 and the step 430 can define the seam 442. It is contemplated that the overlapping portion 406 can be toleranced with a longitudinal length such that the edge 432 thereof abuts the step 430. It is also contemplated that as with the seam 440, the compressive forces of the material against the first formliner 400 and the second formliner 402 can serve to reduce the size of the seam 442 to thereby create a superior finished product.

Referring now to FIGS. 1-10, it is noted that the above-discussed embodiments of the formliner and formliner components provide for a distinct shelf or step between rib sections having differing geometries or configurations. For example, as noted above with respect to FIG. 10, the step 430 is a transition zone, shelf, or shoulder between the overlapping portion 422 and the overlapped portion 408 of the second formliner 402. As briefly mentioned above, the step 430 can provide a gradual transition from the overlapping portion 422 to the overlapped portion 408. However, in some embodiments, it is contemplated that the formliner can be formed with ribs or ridges that taper from a first geometry or configuration to a second geometry or configuration. As such, the shoulder 430 can be eliminated from such embodiments.

For example, referring generally to a side view similar to that of FIG. 10, it is contemplated that a rib can taper from a first dimension or configuration in an overlapping portion to a second dimension or configuration in an overlapped portion. In yet other embodiments, it is contemplated that the rib can taper from the second dimension or configuration to a third dimension or configuration. The tapering of the rib from one dimension to another can comprise a generally constant taper or a variable taper.

Further, in some embodiments, overlapping portions of the ribs of the formliner can be configured to define a variable thickness corresponding to the tapering of the overlapped portions onto which the overlapping portions will be overlaid. As such, the cumulative dimension or configuration of nested or overlaid rib portions can be generally constant. However, it is likewise contemplated that the thickness of overlapping or interconnecting formliners can be generally constant along their respective ribs or ridges.

Additionally, in accordance with at least one of the embodiments disclosed herein is the realization that in forming a pattern of interconnected formliners, the edges along the top, bottom, left, and right sides of a pattern or casting can be carefully arranged in order to ensure a natural appearance. Commonly, a plurality of formliners must be used in order to form a pattern or casting larger than a few square feet in size. Typically, in arranging or interconnecting the formliners, an artisan may begin from a top left corner and work down and across toward the bottom right corner. Thus, the left side and the top side of the pattern or casting can generally be comprised of whole or entire formliners that are interconnected vertically and horizontally. Additionally, formliners located in the center portions of the pattern or casting are also whole or entire formliners. However, according to at least one of the embodiments disclosed herein is the realization that formliners located along the bottom and right sides of the pattern or casting may only be partial sheets. In some embodiments, this deficiency can be overcome by providing alternative embodiments of a formliner that enable the artisan to create desirable bottom and right side edges and/or that can be interconnected with other formliners along a partial length thereof in order to form a clean edge, whether it is a straight edge, curved edge, angled edge, or otherwise.

Figure 11:
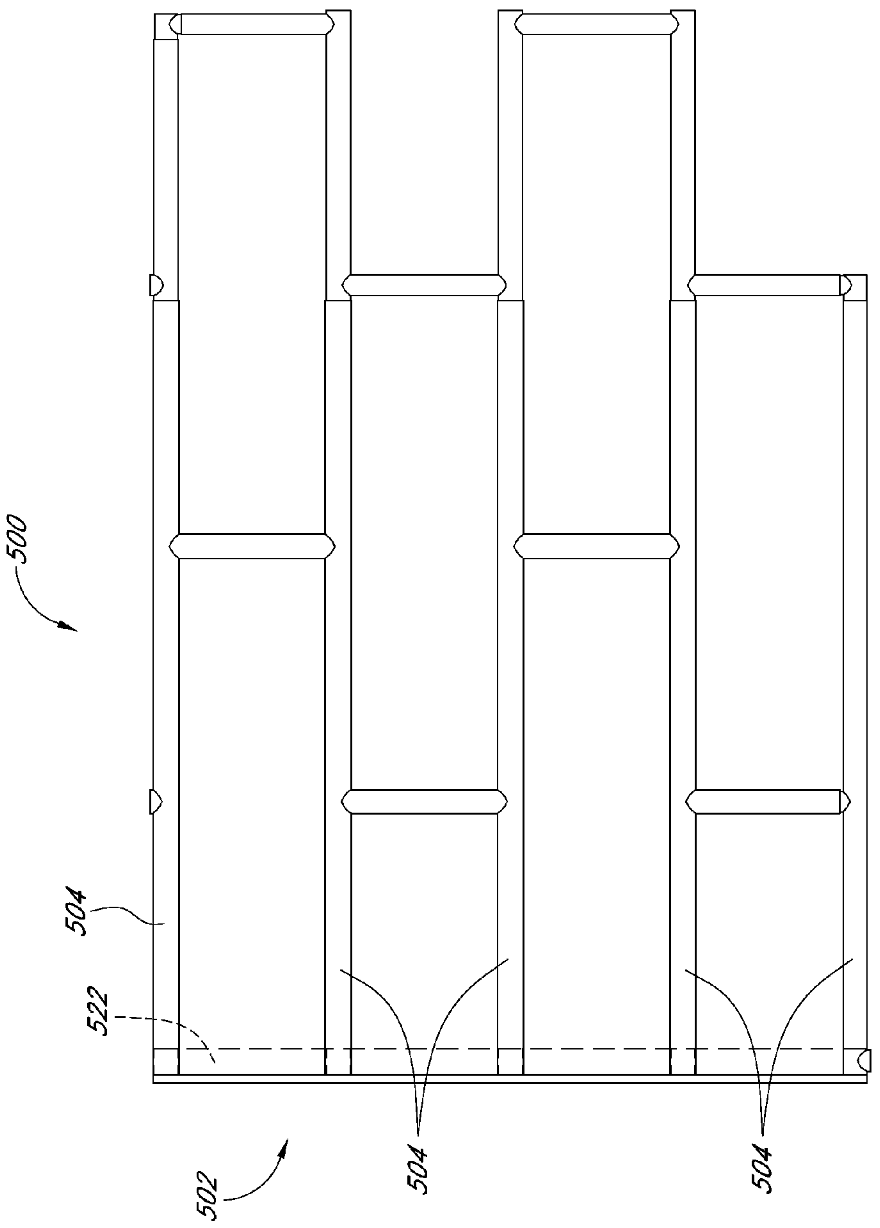
FIG. 11 is a top view of a formliner for forming a mold corner, according to another embodiment.

Accordingly, referring to FIGS. 11-14, alternative formliner embodiments are shown. In FIG. 11, a formliner end portion 500 is shown. The formliner end portion 500 can comprise many of the same features as discussed above with respect to the other formliner embodiments. However, the formliner end portion 500 can also optionally comprise a generally straight side 502 that is configured to mate with a corresponding formliner end portion. In this regard, it is contemplated that in use, the formliner end portion 500 can be used at a far side or end of the desired pattern. For example, the formliner end portion 500 can be used for a left side boundary or a right side boundary.

In some embodiments, the formliner end portion 500 can be configured to mate with another formliner to form a corner of a pattern, casting, or formwork. In such an embodiment, the formliner end portion 500 can also optionally comprise a ledge recess 522, as described below. For example, the ledge recess 522 can be forwarded by a length of the ribs 504 which comprises a reduced geometry or dimension, as shown in dashed lines in FIG. 11. Accordingly, some embodiments of the formliner end portion 500 can be provided in which the side 502 can mate with corresponding formliner components or portions.

Figure 12:
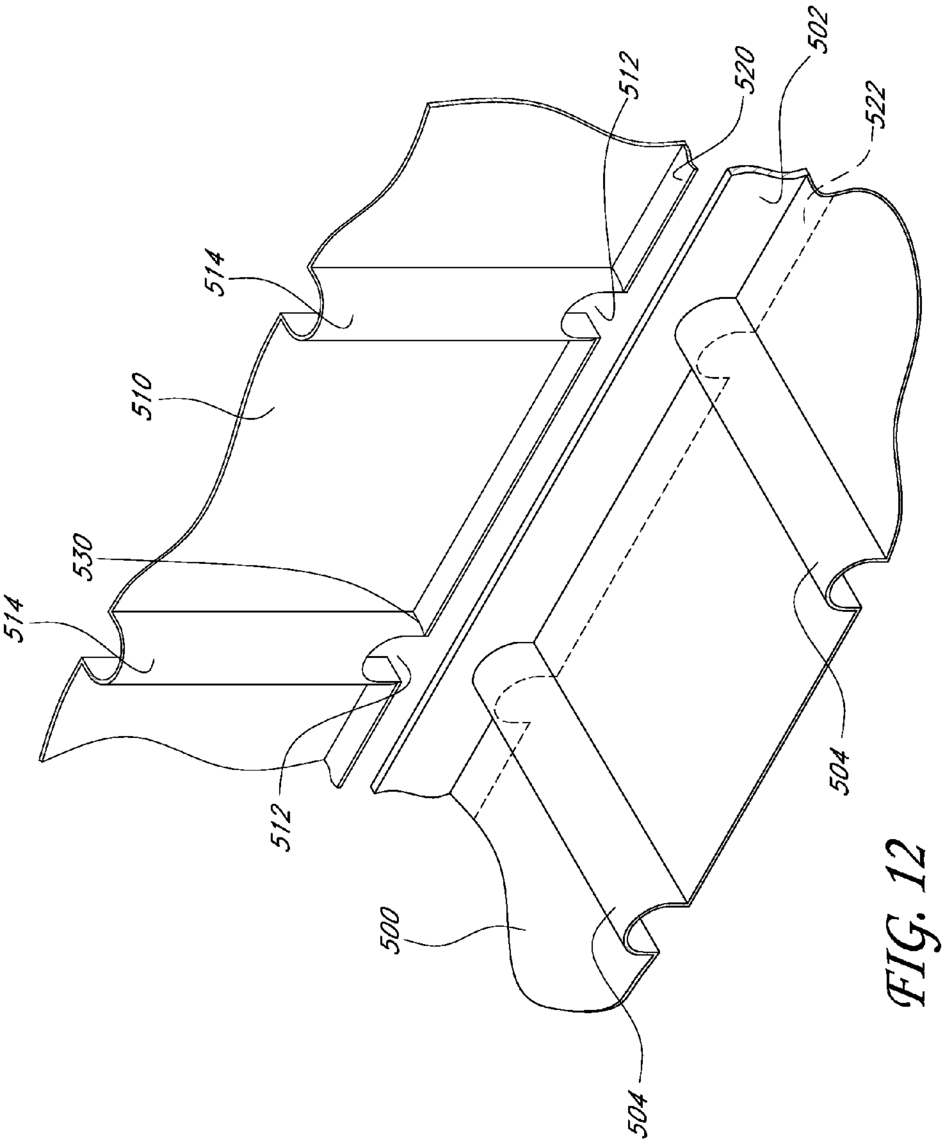
FIG. 12 is a perspective view of first and second formliners configured to form a mold corner, according to an embodiment.

For example, an exemplary mating arrangement of the formliner end portion 500 with a formliner component or portion is illustrated in FIG. 12. As shown therein, the formliner end portion 500 can receive a corresponding formliner end portion 510. The formliner end portion 500 and the corresponding formliner end portion 510 can be interconnected or positioned such that they form a corner in a pattern, casting, or formwork.

In accordance with the embodiments of the formliner end portion 500 and the corresponding formliner end portion 510 illustrated in FIG. 12, the corresponding formliner end portion 510 can define a plurality of recesses 512 formed at the ends of rib members 514. The recesses 512 can be configured to allow the rib members 514 to fit over the ribs 504 of the formliner end portion 500. Thus, the formliner end portion 500 and the corresponding formliner end portion 510 can be positioned relative to each other at a right angle such that a right angle corner in the pattern or casting is produced. However, it is contemplated that the recesses 512 can define other shapes that allowed the corresponding formliner end portion 510 to be oriented at any variety of angles relative to the formliner end portion 500. In this regard, the side 502 can be oriented generally perpendicularly relative to the ribs 504, or the side 502 can be disposed at an angle relative to the ribs 504, thereby facilitating a desired angular interconnection between the formliner end portion 500 and the corresponding formliner end portion 510.

Additionally, in the embodiments illustrated in FIG. 12, the corresponding formliner end portion 510 can also comprise a mating ledge 520. In some embodiments, the mating ledge 520 can be connected to both the ribs 514 and the planar portions of the cells above the corresponding formliner end portion 510. As such, the mating ledge 520 could be generally rigidly positioned relative to the ribs 514. Such an embodiment could be advantageous in facilitating the alignment between the formliner end portion 500 and the corresponding formliner end portion 510. In this regard, as mentioned above with respect to the side 502, the mating ledge 520 can be oriented at a given angle relative to the ribs 514. As illustrated, the mating ledge 520 can be oriented at approximately a right angle relative to the ribs 514. However, it is contemplated that the mating ledge 520 can also be oriented at any variety of angles relative to the ribs 514. In some embodiments, the mating ledge 520 can be configured to fit into or be received in the ledge recess 522 formed along the formliner end portion 500.

However, in other embodiments, the mating ledge 520 can be hingedly or moveably attached to the corresponding formliner end portion 510. For example, the mating ledge 520 can be attached to the corresponding formliner end portion 510 along the length of the cells thereof, but not connected to the ribs 514. In other words, the mating ledge 520 can be separated or cut from the ribs 514 by means of a slit 530. Thus, the slit 530 can allow the mating ledge 520 to be generally flexible or movable relative to the corresponding formliner end portion 510. In such embodiments, the mating ledge 520 can be folded under a portion of the formliner end portion 500. Optionally, the side 502 of the formliner end portion 500 can be eliminated in order to allow the mating ledge 520 to extend to underneath the formliner end portion 500.

Figure 13:
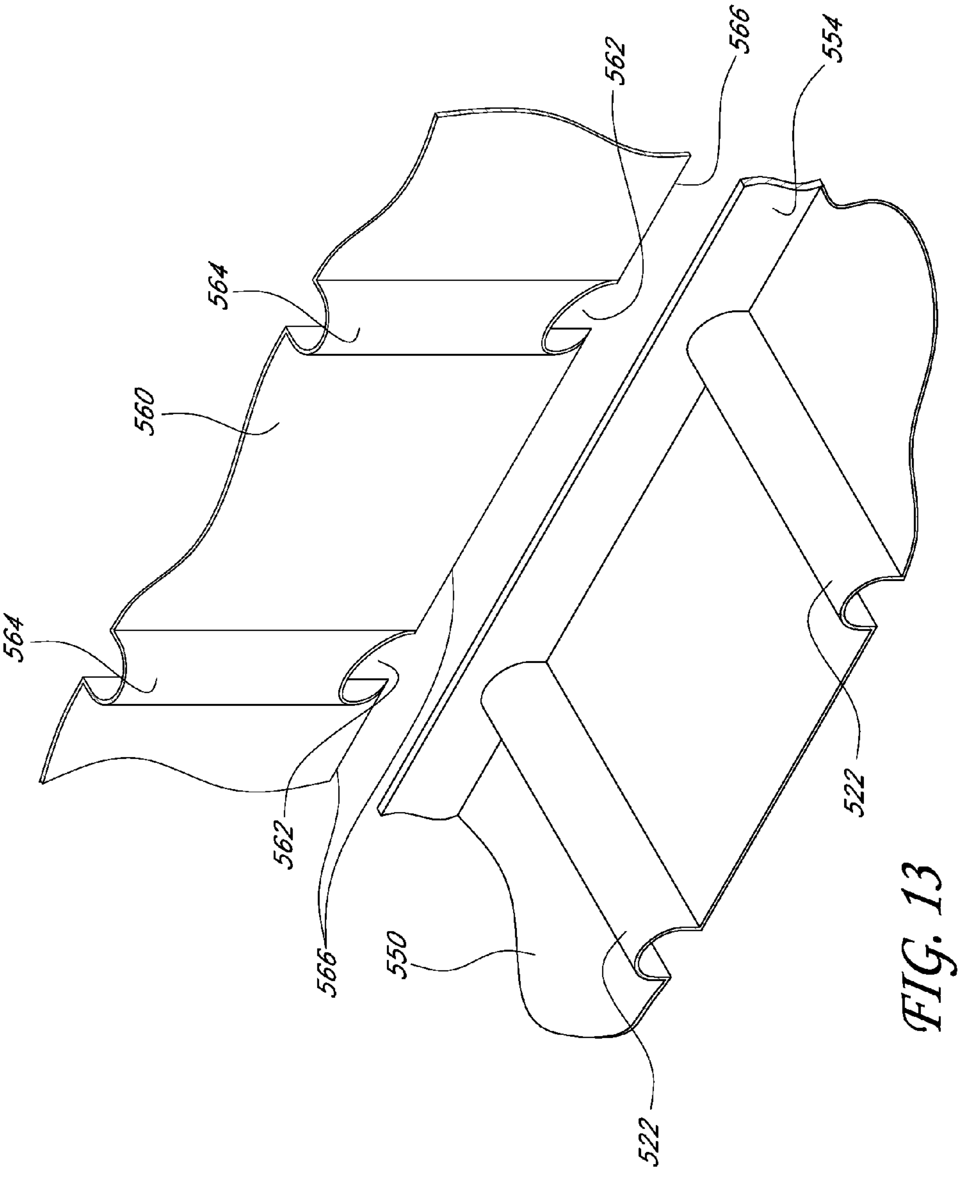
FIG. 13 is a perspective view of first and second formliners configured to form a mold corner, according to another embodiment.

However, in other embodiments, such as that illustrated in FIG. 13, it is contemplated that the ledge recess can be eliminated and that the ribs define a generally constant cross-sectional geometry. For example, the cross-sectional geometry of the ribs can be generally constant along central portions and end portions of the ribs adjacent the side of the formliner end portion.

Referring to FIG. 13, a formliner end portion 550 can comprise one or more ribs 552. Optionally, the formliner end portion can also comprise a side 554. However, as described above, the side 554 can also be eliminated in some embodiments. Additionally, the corresponding formliner end portion 560 can be configured to mate with the formliner end portion 550. The embodiment of the corresponding formliner end portion 560 does not include the mating ledge of the embodiment discussed in regard to FIG. 12. As will be appreciated with reference to FIG. 13, openings 562 in ribs 564 of the corresponding formliner end portion 560 can be mated against the ribs 522 of the formliner end portion 550 to create a corner of a desired angle measurement for a pattern or casting. Further, the openings 562 are preferably configured such that an edge 566 of the corresponding formliner end portion 560 can be positioned against the top surface of the cells of the formliner end portion 550. Optionally, the openings 562 can be configured to be manipulated in order to allow varying angles of orientation between the formliner end portion 550 and the corresponding formliner end portion 560. For example, a portion of the ribs 564 can be configured as a "tear away" that allows the openings 562 to be enlarged. The embodiment of FIG. 13 can facilitate a tight fit between the formliner end portion 550 and the corresponding formliner end portion 560.

Figure 14:
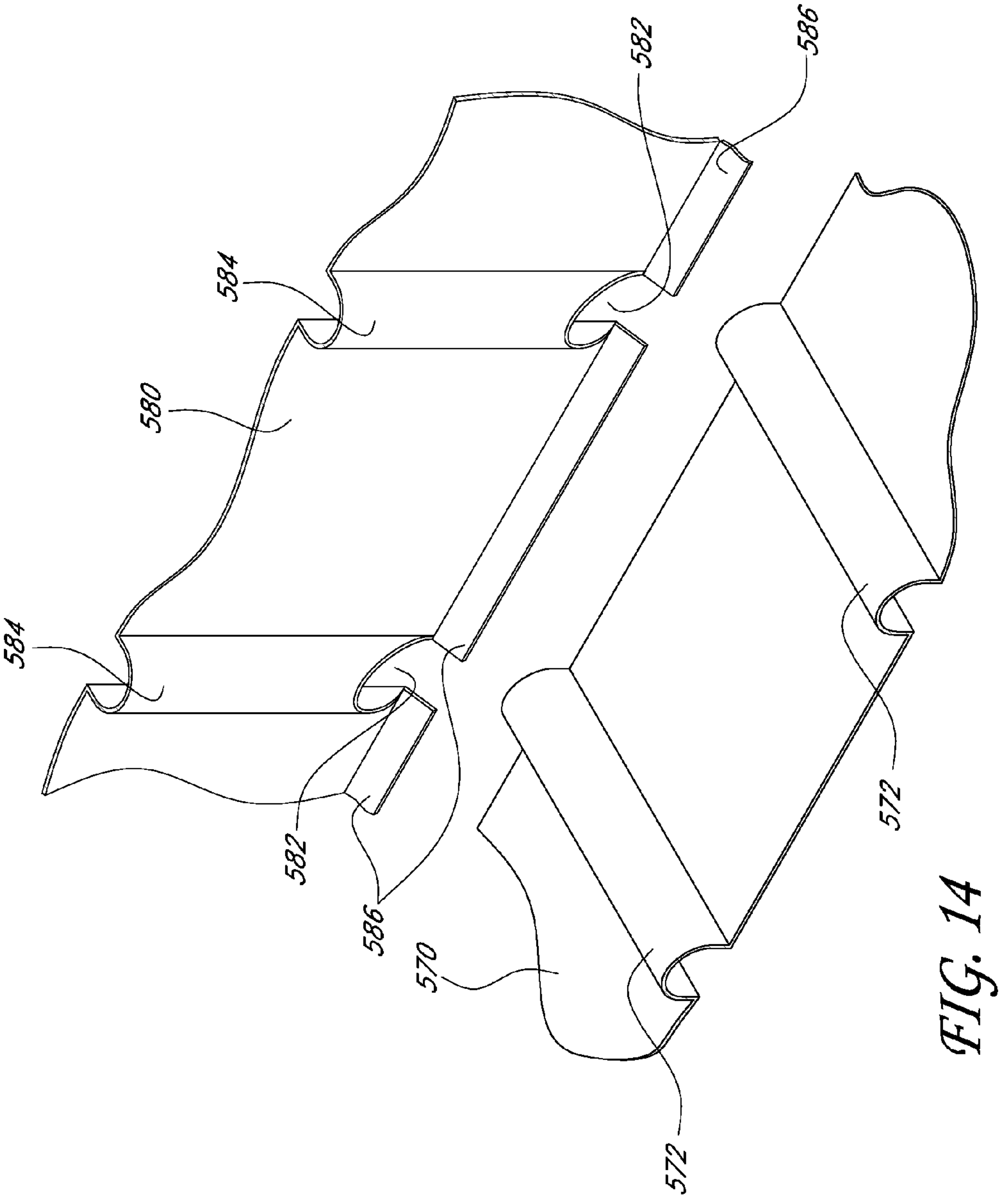
FIG. 14 is a perspective view of first and second formliners configured to form a mold corner, according to yet another embodiment.

Referring to FIG. 14, another embodiment of a formliner end portion 570 can be provided which comprises one or more ribs 572. As noted above, the formliner end portion 570 is an embodiment in which no side is used. Similar to the other embodiments disclosed herein, the formliner end portion 570 can be configured to mate with a corresponding formliner end portion 580. The embodiment of the corresponding formliner end portion 580 does not include the mating ledge of the embodiment discussed in regard to FIG. 12. As will be appreciated with reference to FIG. 14, openings 582 in ribs 584 of the corresponding formliner end portion 580 can be mated against the ribs 572 of the formliner end portion 570 to create a corner of a desired angle measurement for a pattern or casting.

Additionally, as illustrated in the embodiment of FIG. 14, the corresponding formliner end portion 580 can comprise a flange 586 extending from an edge thereof. The flange 586 can be monolithically formed with the corresponding formliner end portion 580. The flange 586 can be flexible relative to other portions of the corresponding formliner end portion 580. For example, the flange 586 can be folded underneath the formliner end portion 570 when the corresponding formliner end portion 580 is fitted onto the formliner end portion 570. In this manner, the corresponding formliner end portion 580 can be placed against and/or interconnected with the formliner end portion 570. Further, in some embodiments it is contemplated that the formliner end portion 570 and the corresponding formliner end portion 580 can be attached along the flange 586 by means of an adhesive. The embodiment of FIG. 14 can facilitate a tight fit between the formliner end portion 570 and the corresponding formliner end portion 580.

It is contemplated that the embodiment of FIGS. 11-14 can aid the artisan in creating a dimensionally accurate and seamless corner of a faux brick mold. It is contemplated also that other such features, such as three-point corners, convex arches, and concave arches can be formed using similar principles.

Figure 16:
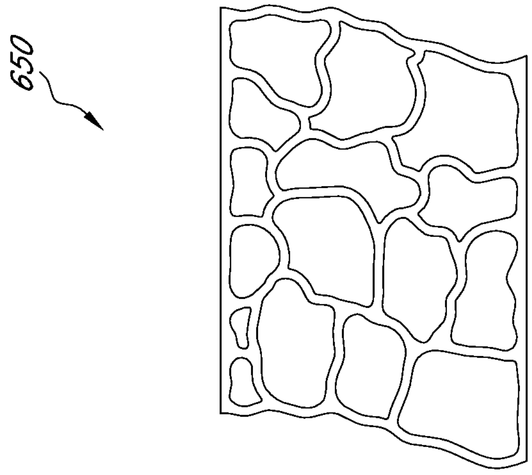
FIG. 16 is a top view of another alternative configuration of a formliner, according to another embodiment.
Figure 15:
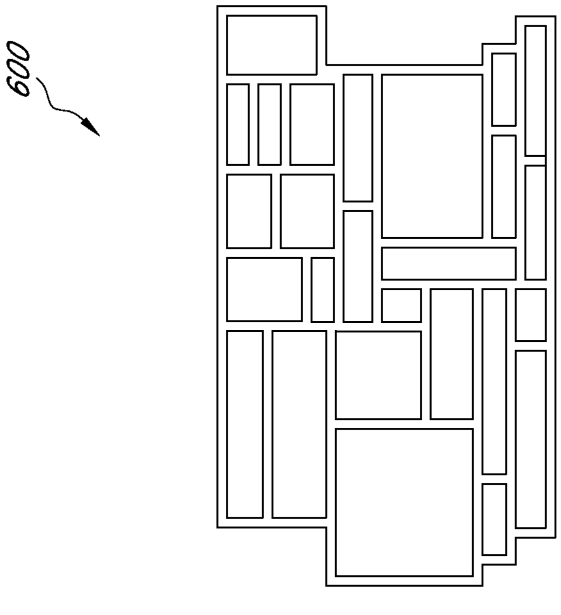
FIG. 15 is a top view of an alternative configuration of a formliner, according to an embodiment.

Further, FIGS. 15-16 illustrate other embodiments of a formliner, sheet, or panel having other shapes and geometries for imparting different patterns onto the treated or exposed surface. As discussed above, such patterns can be of stone, wood, slate, or other materials. FIG. 15 is a representation of a formliner 600 used to produce a stone pattern on an exposed surface six or 50. FIG. 16 is a representation of a formliner used to produce a rock pattern on an exposed surface.

Figure 17:
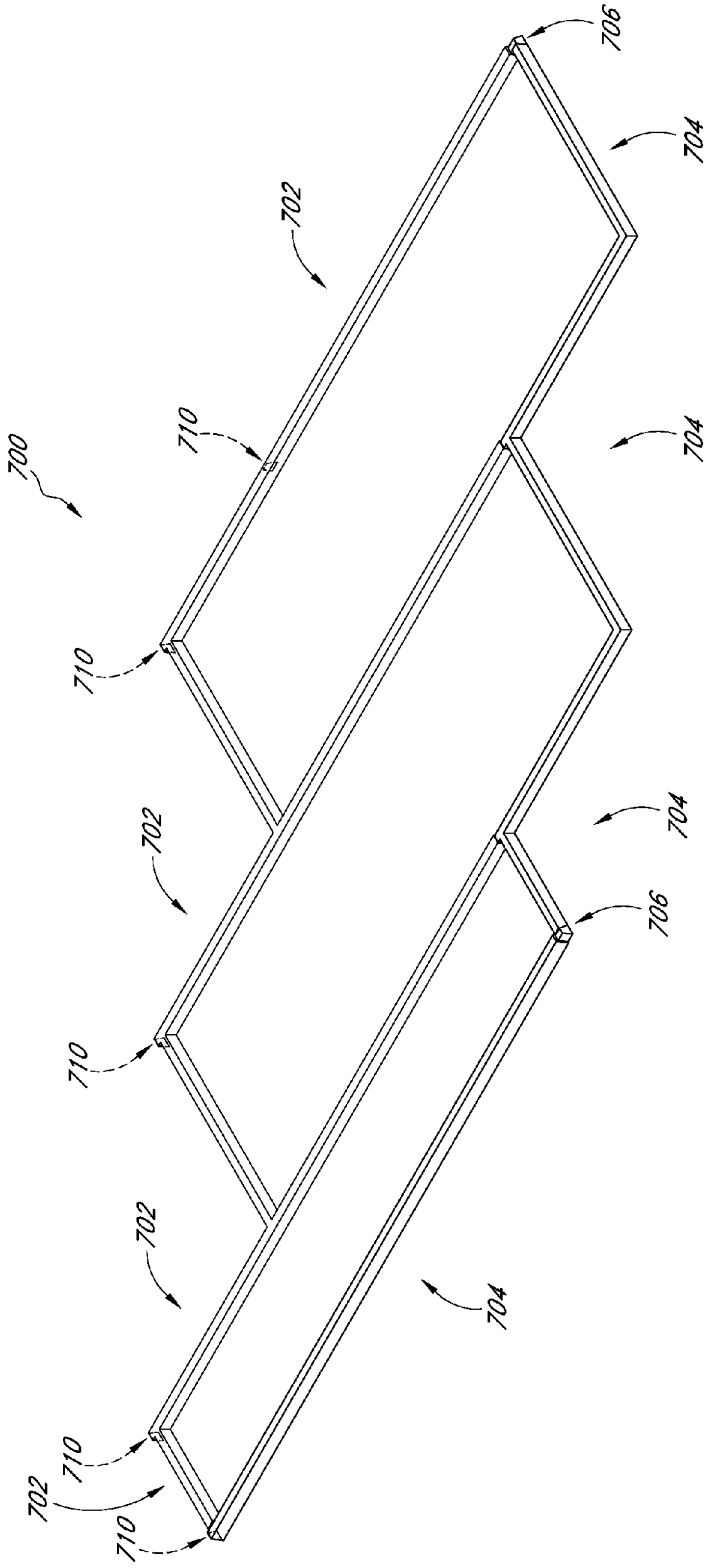
FIG. 17 is a perspective view of yet another alternative configuration of a formliner, according to another embodiment.

FIG. 17 illustrates yet another embodiment of a formliner, sheet, or panel 700 having a pattern configured to provide the appearance of cut stone. As shown therein, first rib portions 702 of the formliner 700 can be configured to define a first geometry or configuration, and second rib portions 704 can define a second geometry or configuration that corresponds to the first geometry or configuration and enables multiple formliners 700 to be interconnected along the rib portions 702, 704.

In some embodiments, the formliner 700 can comprise one or more third rib portions 706 that can define a third geometry or configuration that corresponds to one of the first and second geometries or configurations. For example, the first rib portion 702, the second rib portion 704, and the third rib portion 706 can allow the formliner 700 to be overlaid with other formliners 700 in a similar manner as to the formliner 100 described above, and as shown in FIGS. 2-10.

As mentioned above with respect to the embodiments disclosed in FIGS. 1-10, the first rib portions 702, the second rib portions 704, and the third rib portions 706, can each comprise rib portions having a generally constant geometry or configuration, such as a cross-sectional geometry. However, it is also contemplated that the first rib portions 702, the second rib portions 704, and the third rib portions 706 of the formliner 700 can taper from one geometry or configuration to another. In other words, the ribs or ridges of the formliner 700 can taper from the first geometry or configuration to the second geometry or configuration. In yet other embodiments, the ribs or ridges of the formliner 700 can also taper from the second geometry or configuration to the third geometry or configuration. The tapering in any such embodiment can be formed as a constant taper from one geometry or configuration to another, from one corner to another or along lengths of the ribs or ridges. The tapering in other embodiments can also be formed over discrete sections of the ribs or ridges. Accordingly, in such embodiments, the ribs or bridges can be formed without a distinct shelf or step from a given geometry or configuration to another geometry or configuration. Further, it is contemplated that overlapping portions of adjacent formliners can be configured to define variable thicknesses that taper along with the dimension or configuration of that portion of the ribs or ridges.

Moreover, the formliner 700 can also comprise one or more openings 710 in one or more of the first, second, or third rib portions 702, 704, 706 in order to allow nesting and overlaying of the rib portions with each other, as similarly described above with respect to the embodiments shown in FIGS. 1-10. In this manner, a plurality of the formliners 700 can be used to create a desirable cut stone pattern while eliminating any appearance of seaming between the formliner 700.

Additionally, in accordance various embodiments, no adhesive is required to interconnect a plurality of the formliners during set up. As noted above, one of the inventive realizations disclosed herein is that the set up and interconnection of formliners can also be expedited by eliminating the need to apply adhesives to the overlapping joints of interconnected formliners. Thus, the assembly time for a setting up a large pattern of interconnected formliners can be substantially reduced, as well as the cost and parts required, by eliminating the need for adhesives.

In order to provide such a superior benefit, embodiments of the formliners disclosed herein can comprise a snap-fit arrangement that allows overlapping formliners to form an interlocking joint. Thus, the formliners can be securely connected without using adhesives. Further, such embodiments also result in reduced seaming between the formliners where the formliners meet. Furthermore, another of the unique advantages of such an interlocking joint is that the joint is further stabilized and strengthened through the application of force to the overlapping formliners, such as the application of a curable material such as concrete. Therefore, such an interlocking joint not only allows for the elimination of adhesives, but also provides several structural benefits that ultimately create an aesthetically superior product.

Another unique benefit of embodiments disclosed herein is that the interlocking joint can be formed by encasing a rib or ridge of an overlapped formliner with a rib or ridge of an overlapping formliner. In other words, the rib of the overlapping formliner can comprise a recess or cavity into which the rib of the overlapped formliner can be received. The cavity can comprise an opening that is less than the cross-sectional size or passing profile of the rib of the overlapped formliner. Thus, the opening of the cavity must be expanded when the rib of the overlapped formliner is inserted therein. Such expansion can occur through deflection or elastic deformation of the opening. The rib of the overlapped formliner can be inserted into the cavity until being fully received therein such that the opening of the cavity returns to its normal size, thus collapsing around a lower portion or base of the rib of the overlapped formliner. In this manner, the rib of the overlapped formliner is encased within the cavity. The term "snap-fit" can refer to the interference fit, deformation, and subsequent collapsing of the opening to its normal size around the base of the rib of the overlapped formliner. Additionally, the encasing of the rib of the overlapped formliner thereby prevents horizontal and vertical relative movement between the overlapped and overlapping formliners.

Figure 18A:
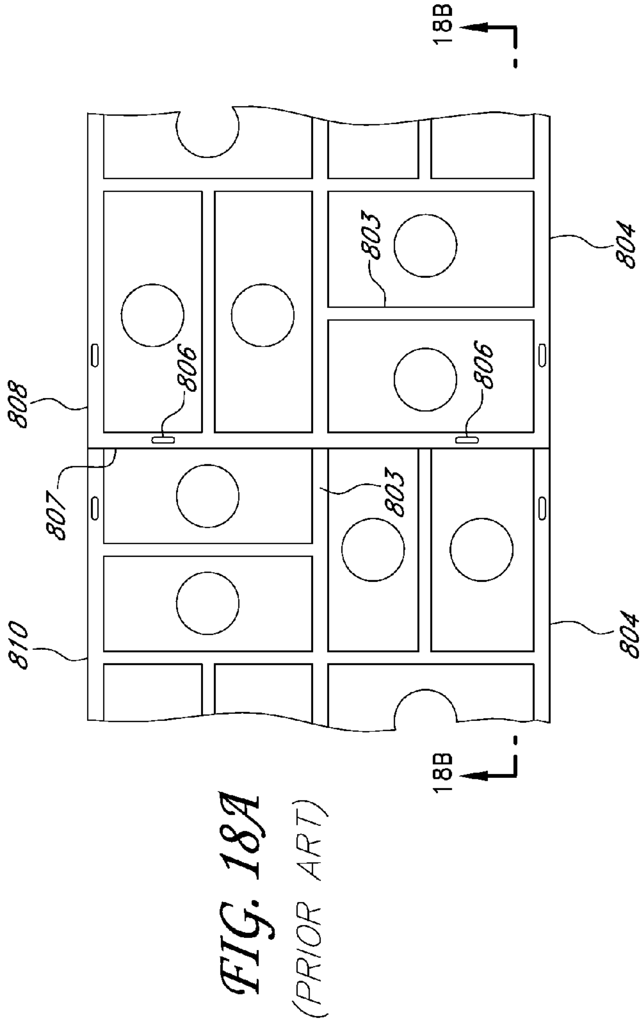
FIG. 18A (PRIOR ART)
FIGS. 18A-C illustrate a prior art brickwork form system.
Figure 18B:
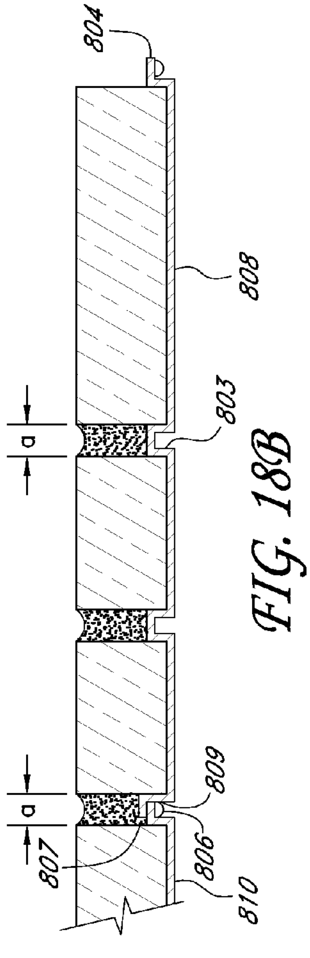
FIG. 18B (PRIOR ART)
Figure 18C:
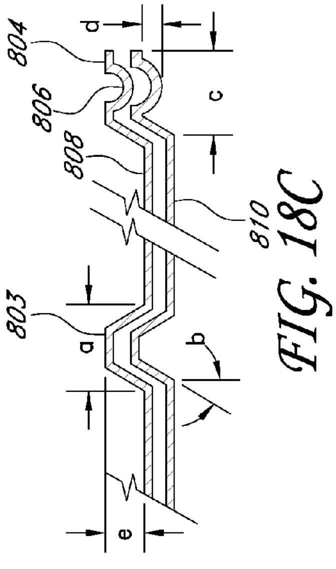
FIG. 18C (PRIOR ART)

In this regard, the interlocking joint and encasing disclosed above is distinct from various other prior art systems, such as that disclosed in U.S. Pat. No. 4,858,410, issued to Goldman (hereinafter "Goldman"). FIGS. 18A-C are the original FIGS. 20-22 taken from the Goldman reference and illustrate a modular brickwork form 802 that is disclosed in Goldman. The brickwork form 802 comprises raised dividers 803 and raised edges 804. A first edge 807 of first form 808 overlaps a second edge 809 of a second form 810. Dimples 806 on the first edge 807 nest within the dimples 806 on the second edge 809 (see FIG. 18C). Goldman indicates that the dimples 806 are concave up/convex down depressions on the edge 804. The shape and location of the dimples, raised dividers and edges allow nesting of the forms when stacked. Further, the notches or dimples 806 are also placed to overlap and nest within adjoining dimples (see FIG. 18B).

FIG. 18C illustrates a cross-sectional side view of the dimples 806 of the Goldman brickwork form. Goldman indicates that the forms are stacked such that the first form 808 is placed on top of second form 810. Dividers 806 provide a spacing "a" between bricks (see FIG. 18B). The dividers and dimpled edges 804 are tapered by an angle "b" to allow nesting when stacked. The edge dimension "c" is slightly smaller than "a" and is selected to provide a spaced apart dimension "a" between adjoining bricks when first form 808 is placed on top of the second form 810. The depth "d" of dimples 806 is a function of the need to retain adjoining forms. If the forms are to be laid out on a flat horizontal surface, the dimples function only as locators, requiring a nominal projection into the adjoining edge. The depth "d" of the preferred embodiment in this case is less than 3 cm (0.125 inches) in comparison to the overall raised edge dimension "e" which is approximately 9 cm (0.375 inches).

Thus, although the Goldman reference discloses a brickwork form with dimples, the dimples thereof do not comprise any protrusion or detent, for example, to interlock the dimples 806 of the first form 808 with the dimples of the second form 810. The dimples 806 serve only a locating function when positioning the forms to align the ridges of the forms relative to each other. However, the dimples can easily be dislodged or shifted. Further, it is apparent that loading on the edges of the forms can create deformation of the edges. Because the dimples do not serve to restrict separation between the forms in a vertical direction, such loading can cause the forms to be disengaged and become misaligned. The dimples simply do not interlock the forms or provide any meaningful engagement between the forms that can eliminate the need for adhesives. Indeed, adhesives are required in order to properly adjoin the forms disclosed in the Goldman reference.

In contrast, embodiments disclosed herein provide a secure interconnection and engagement between overlapping formliners. For example, as discussed herein, an embodiment of the formliner can comprise a protrusion and a detent such that a plurality of formliners can be interconnected with the protrusions engaging respective detents such that the formliners are not only restrained in a horizontal direction, but also in a vertical direction. As such, these features can effectively eliminate the need for glues and adhesives required by inferior prior art designs. The Goldman reference simply does not disclose such features and provides no teaching or suggestion of such features.

Embodiments of the formliner and formliner components disclosed herein can be manufactured using any of a variety of processes. For example, it is contemplated that some embodiments can be formed using a sheet and a vacuum forming operation. Other manufacturing processes such as injection molding, stamping, extrusion, etc. can also be used.

With reference now to FIGS. 19-35, FIG. 19 is a perspective view of an embodiment of a formliner, panel, or sheet 1100 in accordance with an embodiment of the present inventions. The formliner 1100 can comprise a plurality of ribs, ridges, or channels 1102. The ribs 1102 can be a raised portion of the formliner 1100. The ribs 1102 can define an outer perimeter of the formliner 1100. Additionally, the ribs 1102 can extend inwardly to form one or more cells or recesses 1104.

In some embodiments, the cells 1104 can comprise a recessed portion of the formliner 1100. The recessed portion of the cell 1104 can be configured to receive a curable material to which a pattern of the formliner can be conferred or transferred. The cells 1104 can be uniformly sized. For example, the cells 1104 can be rectangularly shaped. As discussed below, embodiments of the formliner 1100 can implement other shapes, depths, and sizes of the cells 1104.

Figure 19:
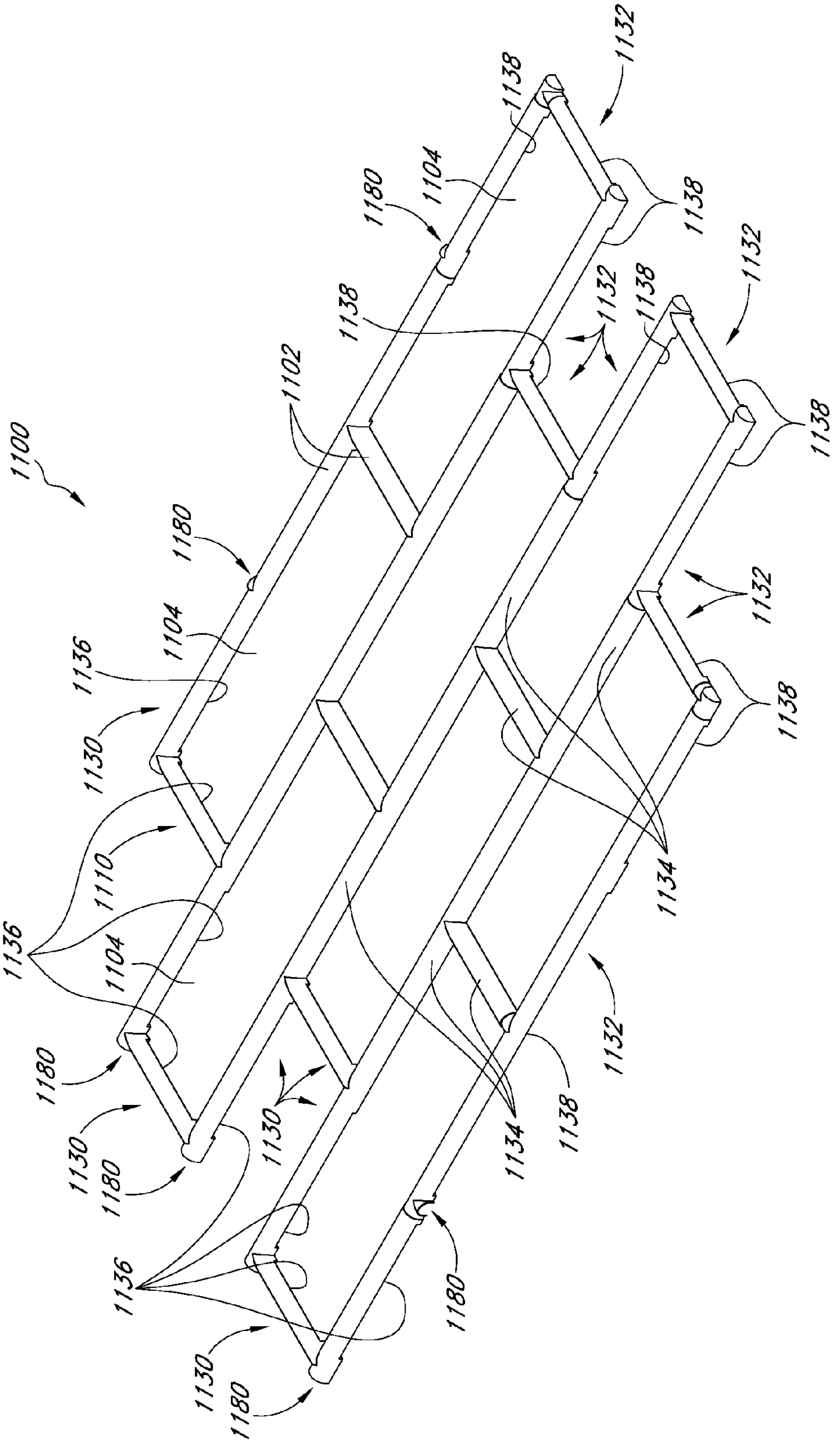
FIG. 19 is a perspective view of a formliner, according to an embodiment of the present inventions.

As illustrated in the embodiment of FIG. 19, the cells or recesses 1104 can be arranged in rows. As will be discussed further below, the cells or recesses 1104 of a given row can be offset with respect to cells or recesses of an adjacent or neighboring row. In this regard, a plurality of formliners 1100 can be interconnected along ends thereof in such a way as to reduce any visible appearance of a seam between interconnected formliners. The offset configuration of the cells or recesses 1104 in some embodiments can aid in concealing or hiding any seaming between formliners.

Additionally, the embodiment illustrated in FIG. 19 illustrates that the cells 1104 of adjacent rows can be offset from each other such that at opposing ends of the formliner 1100, some of the cells 1104 protrude at the end. In this regard, the rows can be formed to include projecting and non-projecting cells 1104. The projecting cells can be considered to be complete or whole cells. In other words, the projecting cells are not smaller than other cells 1104 of the pattern even though the offset configuration of the cells 1104 causes the projecting cells to protrude at one side or end of the formliner 1100. As will be discussed further below, the projecting cells of the pattern can be interconnected with projecting cells of another formliner.

The embodiment illustrated in FIG. 19 can be used to create a faux brick pattern on a concrete structure. The formliner 1100 can define a panel periphery bounding the plurality of cells 1104 by a plurality of sides. The formliner 1100 defines an upper surface 1110. Although not shown in FIG. 19, the formliner 1100 also defines a lower surface. In use, the upper surface 1110 of the formliner 1100 would be positioned such that it can be pressed into fresh concrete. This can be accomplished by placing the upper surface 1110 of the formliner 1100 against an exposed surface of fresh concrete. Otherwise, this can be accomplished by affixing the lower surface of the formliner 1100 to an interior wall of a pattern, casting, or formwork before concrete is poured into the pattern, casting, or formwork. In either case, a material, such as concrete can be placed against the decorative pattern of the formliner 1100 defined by the ribs 1102 and the cells 1104 in order to transfer the decorative pattern to the exposed surface of the material as the material cures.

In many cases, the exposed surface of a given structure, such as a wall, walking area, or the like, consists of a large surface area. In order to cover the entire area, several formliners must be used. As shown in the formliner assembly of FIG. 20, several formliners 1120, 1122, and 1124 can be interconnected in order to transfer a decorative pattern onto a large surface area. The interconnection of these formliners 1120, 1122, and 1124 provides a distinct advantage over prior art to formliners because the seams between the formliners 1120, 1122, and 1124 are insubstantial and/or eliminated compared to prior art formliners.

As discussed above, FIG. 20 illustrates that the formliner 1120 can comprise projecting cells 1125 in the formliner 1122 can comprise one or more projecting cells 1126. These projecting cells 1125, 1126 can be positioned in different rooms of the formliners 1120, 1122. Thus, the projecting cells 1125 can be positioned adjacent to non-projecting cells of the formliner 1122 in the projecting cell 1126 can be positioned adjacent to a non-projecting cell of the formliner 1120. Thus, the cells of the formliner 1120 can be offset with respect to each other and with respect to cells above the formliner 1122. Moreover, the interconnection of the formliners 1120, 1122 can be accomplished using offset projecting cells 1125, 1126.

Figure 20:
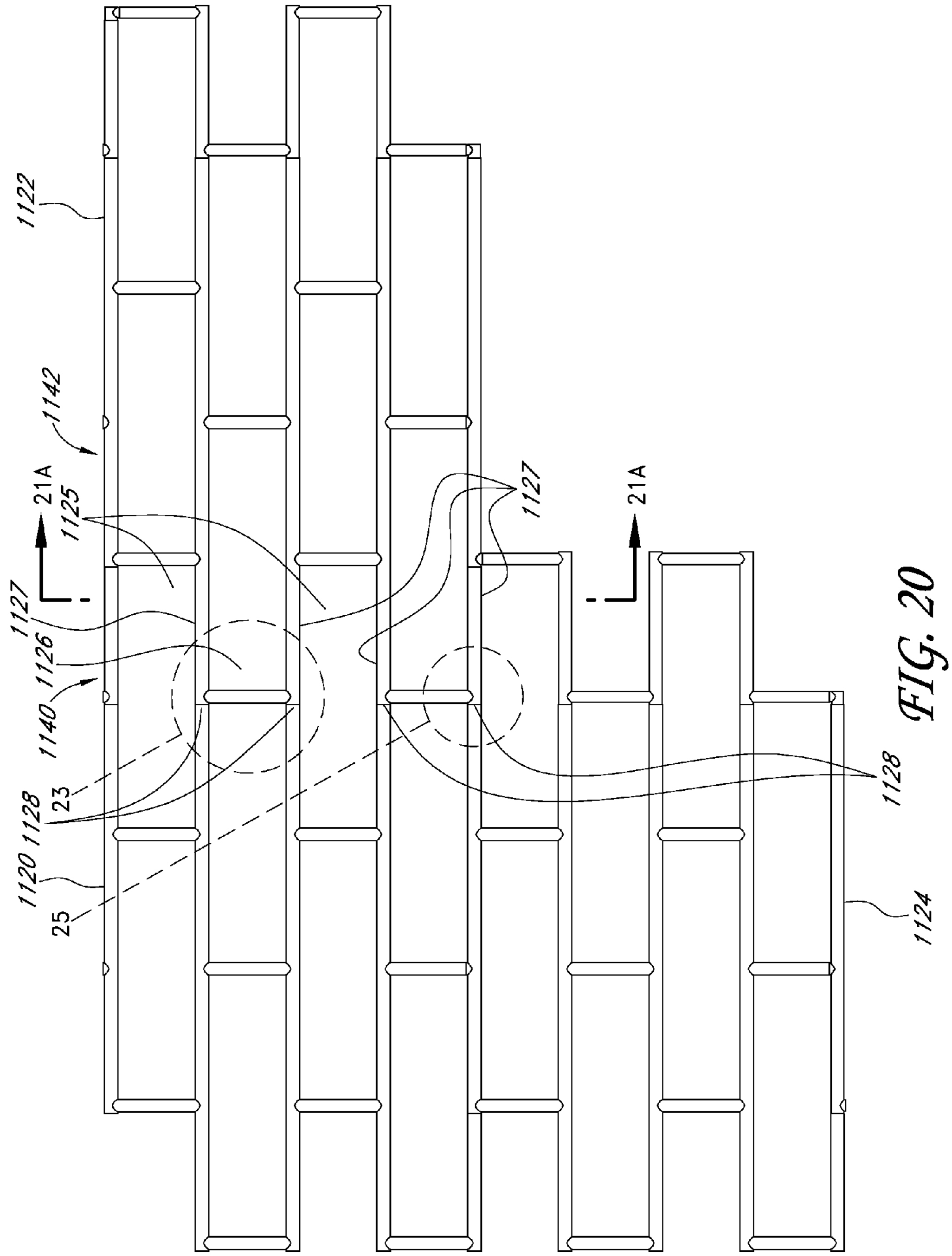
FIG. 20 is a top view of a plurality of formliners that are interconnected to create a formliner assembly, according to an embodiment.

In accordance with some embodiments, the formliner 1100 illustrated in FIG. 19 can be configured such that a plurality of formliners 1100 can be interconnected at their top and bottom ends and sides. FIG. 20 illustrates this principle. The formliners 1120, 1122, and 1124 can be interconnected and overlap each other. This interconnection allows the formliners to be easily handled and assembled to a given size. Importantly however, the formliner is configured such that portions thereof can overlap and create a generally uniform and seamless rib structure on the upper surface 1110 of the formliners 1120, 1122, and 1124. In other words, the shape and depth of the rib structure formed in the exposed surface of the concrete structure can be generally constant and the transition from a given formliner to another given formliner can be generally imperceptible.

Moreover, in some embodiments, edges of each of the respective formliners 1120, 1122, and 1124 can lie along a corner or edge feature of the decorative pattern. As such, when a curable material is placed in against the formliners and takes the shape, in this case of a rectangle having right-angle corners, an edge 1127 of the formliner 1122 forms a portion of the corner of the molded or formed rectangle and becomes nearly imperceptible. Accordingly, the overlapping edges 1127 of the formliner 1122 create minimal visible seaming, if at all, between the formliners 1120 and 1122. This principle is illustrated in greater detail in FIGS. 25-28.

Additionally, transition zones or joints 1128 are formed where upper surfaces of ribs the formliners 1120, 1122, and 1124 meet. In this regard, the transition zones or joints 1128 can be toleranced in order to define an extremely narrow gap between interconnected formliners. Thus, any seaming at the transition zones or joints 1128 can also be greatly reduced in order to reduce and/or eliminate visible seaming.

In this regard, the formliner 1100 can be configured such that the plurality of ribs 1102 includes one or more overlapping portions 1130 and one or more overlapped portions 1132. The overlapping portions 1130 can be configured to include an internal cavity with an internal geometry that accommodates the external geometry of the overlapped portions 1132. Thus, the overlapped portions 1132 can be received within the internal cavities of the overlapping portions 1130.

The formliner 1100 can be configured to comprise a protrusion and a detent in order to facilitate interconnection between a plurality of formliners. For example, the ribs 1102 can be configured to comprise one or more protrusions 1136 and/or detents 1138. In some embodiments, as shown in FIGS. 19 and 21A-C, the protrusion 1136 and/or the detent 1138 can be disposed on the rib 1102. The protrusion 1136 and/or detent 1138 can extend along less than the entire length of a respective rib 1102 such that the protrusion 1136 and/or detent 1138 is offset from a corner or end of the respective rib. Indeed, a series of the protrusions 1136 and/or detents 1138 can extend along a length of the rib, with a series of breaks between respective protrusions 1136 and/or detents 1138.

For example, the protrusion 1136 can be disposed on overlapping portions 1130 of the rib 1102, and the detent 1138 can be disposed on overlapped portions 1132 of the rib 1102. As such, when the formliner 1100 is interconnected with other formliners, as shown in FIG. 20, the protrusions and the detents can engage each other to interlock the formliners in an assembled state. Due to the superior engagement created by the protrusions and detents, no adhesives need be used to secure the formliners to each other. Thus, the assembled formliner system can be placed in a form and a curable material can be placed thereon without worry of having the edges or ribs of the formliners become disengaged from each other. Moreover, no adhesive is required for such exceptional performance. As noted above, these advantages are not present or taught in the prior art.

In some embodiments, the plurality of ribs 1102 of the formliner 1100 can be configured to comprise one or more non-overlap portions 1134. The non-overlap portions 1134 can extend between overlapping portions 1130 and overlapped portions 1132. However, the non-overlap portions 1134 will not overlap or be overlapped by portions of another formliner win a plurality of formliners are interconnected. When a plurality of formliners is interconnected, the external surface of the overlapping portions 1130 can be flush with the external surface of the non-overlap portions 1134.

Figure 21A:
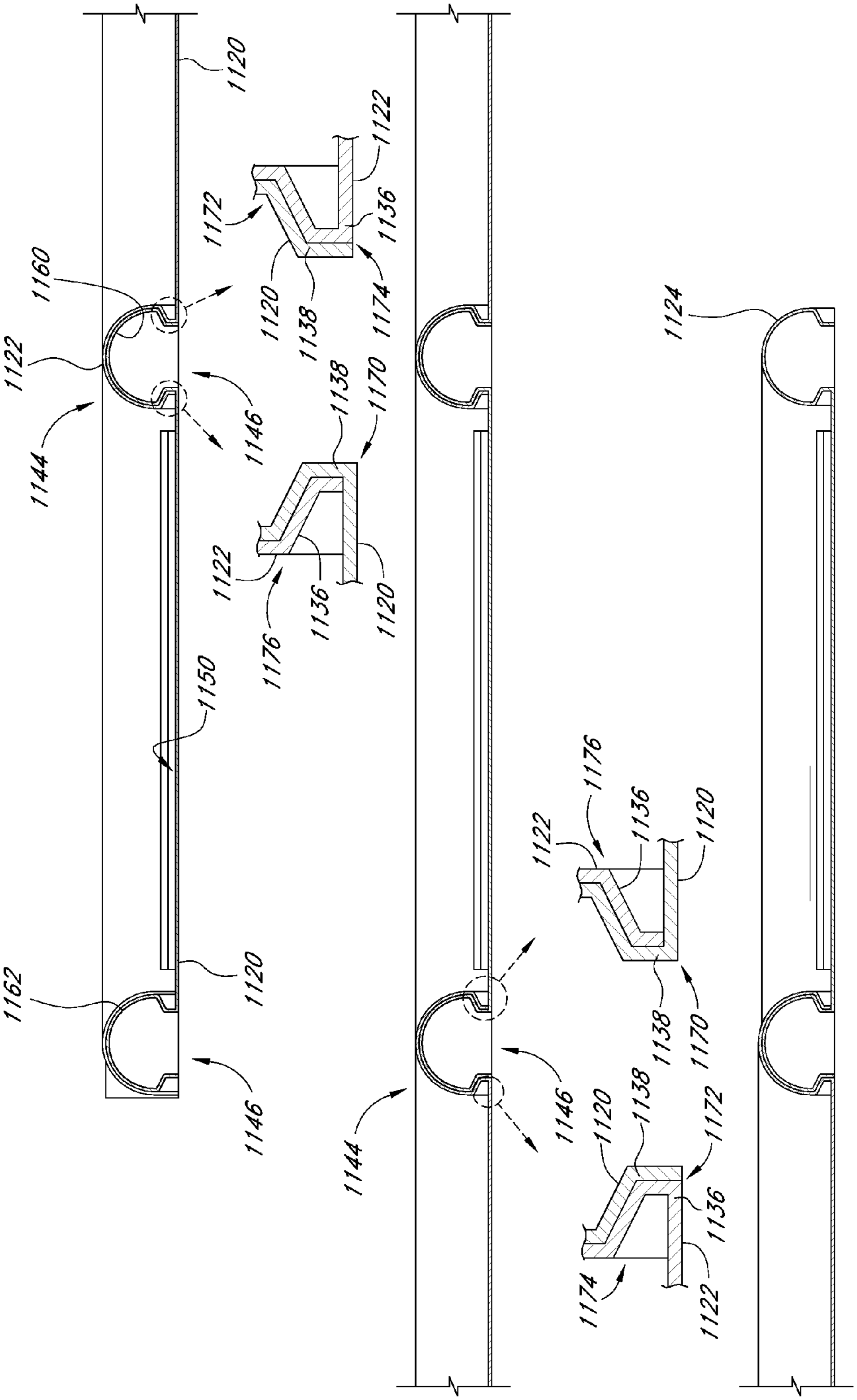
FIG. 21A is a cross-sectional side view taken along section 21A-21A of FIG. 20.

An illustration of this principle is shown in FIGS. 21A-C and 24 and described below. FIG. 21A it is a cross-sectional side view taken along Section 21A-21A of FIG. 20. FIG. 20 illustrates that a right side 1140 of the formliner 1120 overlaps with a left side 1142 of the formliner 1122.

In FIG. 21A, an overlapping portion 1144 of the formliner 1122 rests on top of an overlapped portion 146 of the formliner 1120. The cross-sectional side view also illustrates a cell 1150 of the formliner 1120. Further, the formliners 1120, 1122 are configured such that the overlapping portion 1144 of the formliner 1122 defines an outer surface that matches an outer surface of the ribs 1102 of the formliners 1120, 1122, and 1124. In other words, the overlapping portions of a formliner can have an outer dimension that is equal to an outer dimension of the non-overlap portions of the ribs of the formliner. Thus, the overall rib structure of interconnected formliners will seem continuous in shape and dimension because the overlapping portions and the non-overlap portions (and not the overlapped portions) of the ribs of the formliners are the only portions of the ribs that are exposed.

In addition, as discussed below with regard to FIG. 29, one of the significant advantages of embodiments disclosed herein is that they are able to reduce and/or eliminate seams between adjacent formliners using the significant compressive stresses created by the weight of a curable material, such as concrete, poured onto a formliner assembly or formliner mold cavity. In other words, the configuration of the overlapped and overlapping portions of adjacent formliners enabled the weight of the material to press down upon the overlapping portions of a formliner in order to optimize the fit between overlapping portions and overlapped portions of adjacent formliners to thereby reduce any visible seaming between the formliners.

FIG. 21A also illustrates that in some embodiments, the overlapping portions 1144 can comprise the protrusions 1136 that engage with detents 1138 of the overlapped portions 1146. In the embodiment illustrated in FIGS. 21A-C, the protrusions 1136 and the detents 1138 can define a generally trapezoidal cross-sectional profile. However, as described below, the protrusions and detents in some embodiments can define a variety of cross-sexual profiles. Further, FIG. 21A indicates that in some embodiments, the ribs of the formliners 1120, 1122, 1124 can each comprise free side edges and corner portions wherealong the rib interconnects with the cell of the formliner. For example, the ribs of the formliner 1120 can comprise a corner portion 1170 and a free side edge 1172. Additionally, the ribs of the formliner 1122 can comprise a corner portion 1174 and a free side edge 1176. Likewise, the ribs of the formliner 1124 can also comprise a corner portion and a free side edge.

Figure 21C:
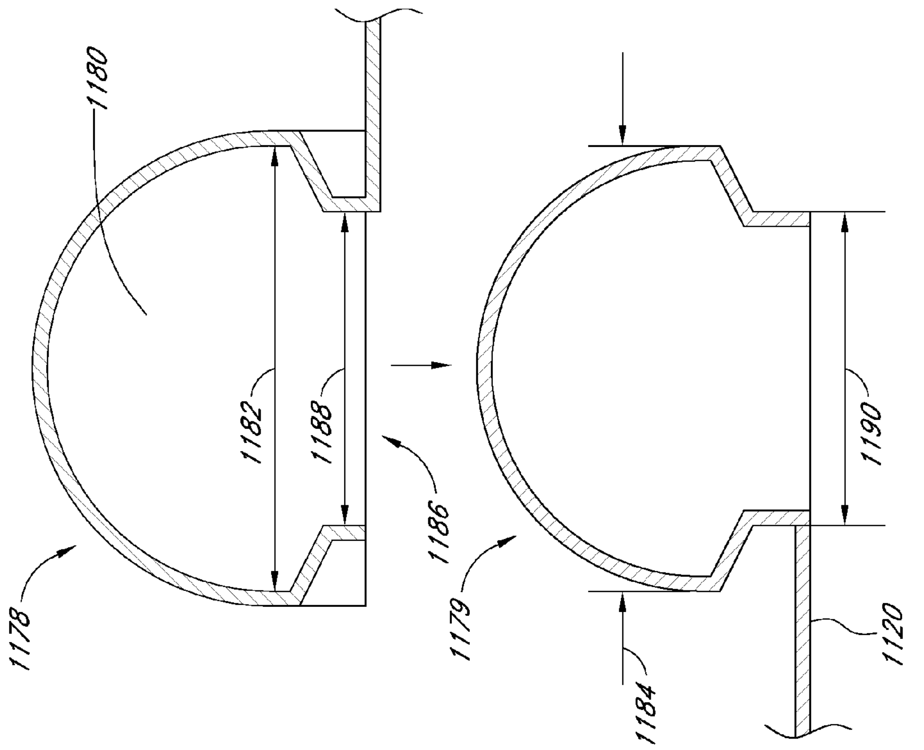
FIG. 21C is another enlarged view of a portion of the cross-sectional side view of FIG. 21A wherein the formliners are shown prior to interconnection thereof, according to an embodiment.
Figure 21B:
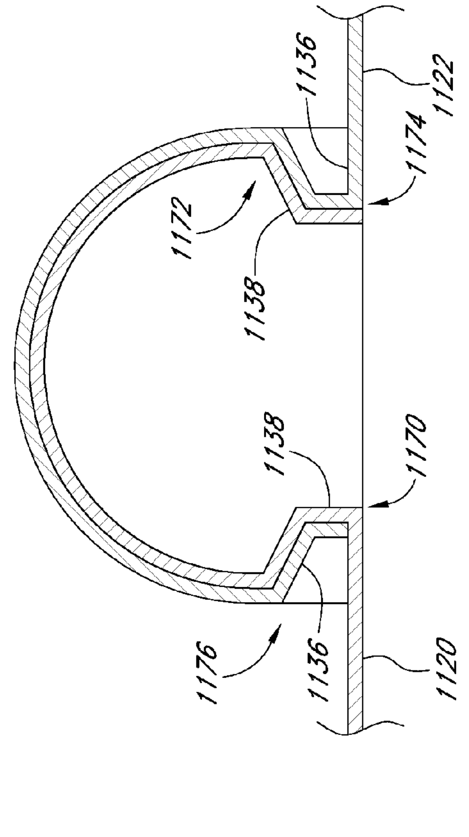
FIG. 21B is an enlarged view of a portion of the cross-sectional side view of FIG. 21A.

As illustrated, some embodiments can be configured such that the corner portions of the ribs are formed to include a protrusion or a detent. Similarly, embodiments can be configured such that the free side edges are formed to include a protrusion or a detent. The arrangement of the protrusions and detents along the corner portions or free side edges can be determined based on the pattern, for example. However, as shown in FIG. 21B, in some embodiments, if the rib portion of the formliner 1120 is configured to be overlapped by the rib portion of formliner 1122, and therefore of a smaller profile, the corner portion 1170 of that rib portion and the free side edge 1172 can each comprise a detent 1138. Further, if a rib portion of the formliner 1122 is configured to be overlapping the rib portion of the formliner 1120, and is therefore of a larger profile, the corner portion 1174 and the cancel free side edge 1176 can each comprise a protrusion 1136. However, although the rib portions are shown as comprising a pair of protrusions or detents disposed on opposing sides of the rib portion (whether overlapping or overlapped), it is also contemplated that a single protrusion or detent can be used on a side of the rib portion (whether overlapping or overlapped). Further, it is contemplated that in some embodiments, the overlapped portion of the rib (such as the rib of the formliner 120) can contact only a portion of the internal surface of the overlapping portion of the rib (such as the rib of the formliner 122). In this regard, some embodiments can be configured such that the interlocking or overlapping of the formliners can be accomplished by complete or partial surface contact between the external and internal surfaces of overlapping rib portions.

In this regard, one of the unique features of some embodiments disclosed herein is that an overlapping rib can define a recess or interior cavity whereinto an overlapped rib of an adjacent formliner can be placed. However, in order to insert the overlapped rib into the recess or interior cavity, an opening of the recess can be expanded to receive the overlapped rib. For example, FIG. 21C illustrates that a recess 1180 of a rib 1178 of formliner 1122 comprises an inner diameter, profile, or dimension 1182 that is sufficiently large to accommodate the outer diameter, profile, or dimension 1184 of a rib 1179 of the formliner 1120. However, the recess 1180 comprises an opening 1186 having a passing profile or width 1188 that is less than the outer diameter, profile, or dimension 1184 of the rib 1179 of the formliner 1120. Thus, the rib 1179 of the formliner 1120 must cause the opening 1186 to expand in order to be fitted within the recess 1180. Further, the rib 1179 can comprise a base profile 1190 that is less than the passing profile or width 1188 of the rib 1178. In this regard, once the rib 1179 of the formliner 1120 is received into the recess 1180 of the rib 1178 of the formliner 1122, the opening 1186 can converge or snap onto the base profile 1190 of the rib 1179, as shown in FIG. 21B.

Further, the formliner 1122 can be fabricated from a resilient material such that after the rib of the formliner 1120 is inserted within the cavity 1180, the opening 1180 elastically returns to its original dimension 1188. In this manner, the opening 1180 closes around a base of the rib of the formliner 1120. In other words, with the rib of the formliner 1120 received within the recess 1180, the width 1188 of the opening 1180 will return to less than the outer diameter, profile, or dimension 1184 of the rib of the formliner 1120, thus encasing the rib within the recess 1180. This is shown in FIG. 21B. Further, as noted herein, such encasing or snap-fit between the ribs allows the formliner 1122 to restrict not only horizontal, but also vertical movement of the formliner 1120 with respect to the formliner 1122.

The protrusions and the detents can be configured to extend inwardly toward an interior of the rib. It is contemplated that in some implementations, the protrusions and detents can be formed into the formliner during the molding process. For example, the formliner can be vacuum formed with such features included therein. However, it is also contemplated that the protrusions and detents can be formed subsequent to the initial forming operations. Further, although the protrusions and detents can be formed integrally with the formliner, such as by forming the formliner and protrusions and detents of a common sheet of material, these features could potentially be added to the formliner in a finishing step.

Referring again to FIG. 21A, the rib structure of the formliners 1120, 1122 can be generally defined by a semicylindrical or arch shape. Accordingly, the overlapping portions 1144 and the overlapped portions 1146 can be defined by a radius. In particular, a lower surface 1160 of the overlapping portion 1144 of the formliner 1122 can be defined by a first radius. Similarly, an upper surface 1162 of the overlapped portion 1146 of the formliner 1120 can be defined by a second radius. The first radius can be greater than the second radius in order to al low the overlapped portion 1146 to be nested within the overlapping portion 1144. As such, the overlapped portions 1146 can define a smaller cross-sectional profile than the interior cavity of the overlapping portions 1144.

Furthermore, although the rib structure is illustrated as being formed by semicylindrical or arch shaped channels, the rib structure can be formed by a generally rectangular or polygonal cross-section, to provide the appearance of a “rake joint.” In this regard, any variety of shapes can be used. For example, while an embodiment of the formliners discussed herein is generally intended to create an appearance of faux brick, other embodiments of the formliners disclosed herein can be designed to create an appearance of faux stone, including any of various commercial stone such as cut stone, castle rock, sand stone, ledgestone, fieldstone, etc., as well as, wood, river rock, slate, or other materials and variations, which is merely an exemplary and non-limiting list of potential appearances and applications. Thus, the rib structure can be varied and diverse. The dimensions of the rib structure can be variable and allow for irregular patterns as may be seen in natural settings of stone, brick, wood, or other materials.

Figure 22A:
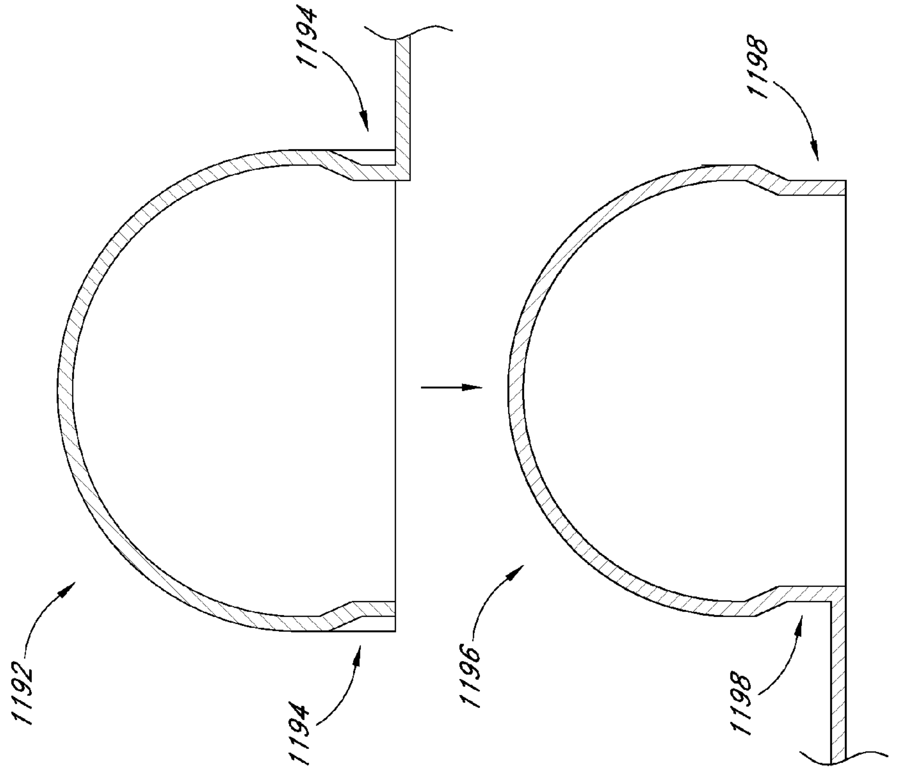
FIG. 22A is an enlarged cross-sectional side view of a formliner, similar to that shown in FIGS. 21A-C, according to another embodiment.

For example, referring now to FIG. 22A, the rib structure in some embodiments can be configured to define arcuate protrusions and detents formed therealong. This type of structure is often referred to in masonry as a “tool joint.” FIG. 22A illustrates an overlapping rib 1192 having a pair of opposing protrusions 1194 and an overlapped rib 1196 having a pair of opposing detents 1198 that are configured to receive the protrusions 1194 of the rib 1192. The protrusions 1194 and the detents 1198 can comprise a shape that is formed using a transition between convex and concave. In some embodiments, the configuration can be described as an “S” shape. In this regard, the arcuate shape of the surfaces can facilitate interlocking between the ribs 1192, 1196. Further, as illustrated therein, the protrusions 1194 and the recesses 1198 can be configured to extend inwardly to a lesser degree than the embodiment shown in FIGS. 21A-C. Accordingly, it is contemplated that the embodiment of the rib structure shown in FIG. 22A can be substituted for that shown in FIGS. 21A-C and implemented with the embodiments of the formliners disclosed herein.

Figure 22B:
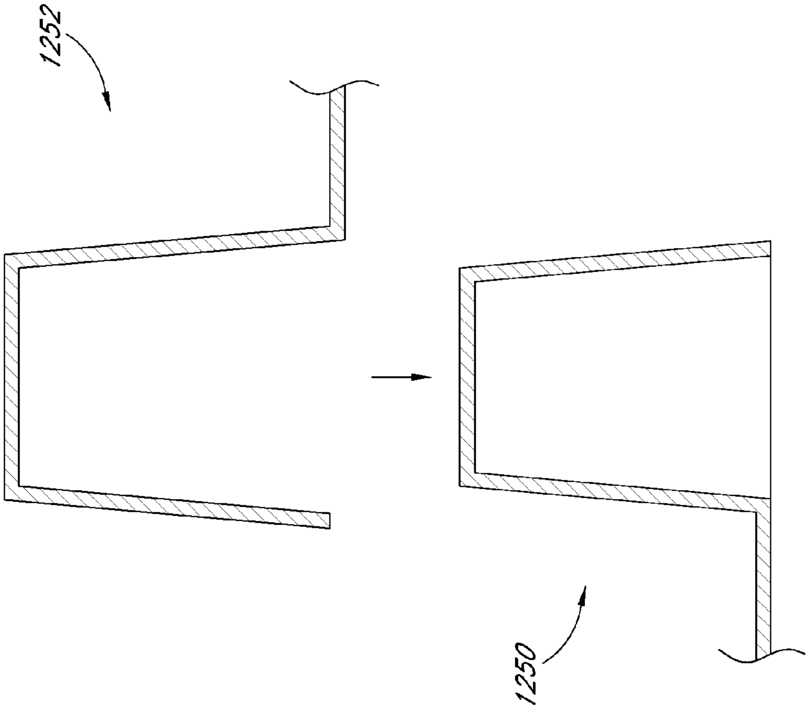
FIG. 22B is an enlarged cross-sectional side view of a formliner, similar to that shown in FIGS. 21A-C, according to yet another embodiment.

FIG. 22B is an enlarged cross-sectional side view of another embodiment of a formliner. In the embodiment illustrated in FIG. 22B, the rib structure of the formliner is provided with a polygonal geometry to provide the appearance of a “rake joint,” mentioned above. As illustrated, an overlapped rib 1250 can comprise a generally trapezoidal cross-section. The overlapped rib 1250 can define an external geometry or profile that is less than an internal geometry or profile of an overlapping rib 1252. In this regard, the overlapping rib 1252 can be overlaid onto the overlapped rib 1250, as illustrated. In the illustrated embodiment, the overlapped rib 1250 generally makes contact with the internal surface of the overlapping rib 1252. However, in accordance with some of the embodiments disclosed herein, it is contemplated that the overlapped rib 1250 contact only a portion of the internal surface of the overlapping rib 1252.

Figure 22C:
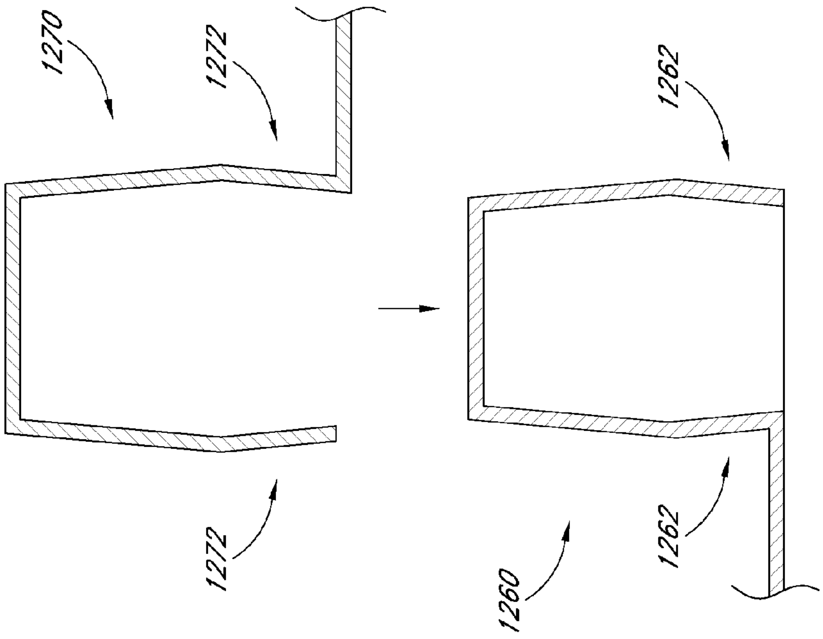
FIG. 22C is an enlarged cross-sectional side view of a formliner, similar to that shown in FIGS. 21A-C, according to yet another embodiment.

FIG. 22C is an enlarged cross-sectional side view of another embodiment of a formliner. Similar to the embodiment illustrated in FIG. 22B, the embodiment shown in FIG. 22C can provide the appearance of a “rake joint.” However, in addition to the aesthetic distinction, the embodiment in FIG. 22C can also provide enhanced engagement through the use of protrusions and recesses. As illustrated, an overlapped rib 1260 can comprise one or more recesses 1262. In the illustrated embodiment, the recesses 1262 can be oriented along a lower portion or lower edge of the rib 1260. However, as with other embodiments disclosed herein, the recesses can be disposed on other portions of the rib. Referring again to FIG. 22C, and overlapping rib 1270 can comprise one or more protrusions 1272 that can engage the one or more recesses 1262. In this manner, when the overlapping rib 1270 is overlaid onto the overlapped rib 1260, the protrusions 1272 can engage the recesses 1262 in order to facilitate interlocking engagement between the ribs 1260, 1270 of the formliners. As noted herein, this interlocking engagement provides several advantages in assembling and using the formliners.

In addition, referring again to FIG. 19, the formliner 1100 can comprise a plurality of rib openings 1180. The rib openings 1180 can be positioned along the ribs 1102 of the rib structure of the formliner 1100. The location of the openings 1180 can correspond to a location of a corresponding rib of another formliner to which the formliner 1100 is interconnected. The rib openings 1180 can facilitate precise alignment of a plurality of formliners. Further, the rib openings 1180 can further contribute to the natural appearance of the faux brick pattern created in the concrete structure. The formation and configuration of rib openings 1180 is shown and described further below.

Various methods are also provided for manufacturing embodiments of the formliners disclosed herein. Generally, many of the embodiments disclosed herein can be manufactured using material to formation processes such as vacuum or thermoforming, injection molding, and other such processes. Thermoforming with the vacuum assist can be used to achieve superior results for thick or thin gauge formliners.

As will be appreciated by one of skill in the art, the thermoforming process begins with a blank that is heated and placed over a mold. Often, a mating mold can be placed over the heated blank to trap the blank between the mold and the mating mold. Vacuum pressure can also be applied to remove any air between the mold and the blank and thereby further draw the blank into the mold.

In accordance with a unique aspect of some of the methods disclosed herein, the formed sheet can be formed to include excess material length. For example, referring to FIG. 36 below, a formliner 1800 is shown in a nearly completed state. As shown, the formliner 1800 can include rib protrusions 1804 that can extend from the left and/or right sides of a formliner 1800. In this manner, using a subsequent cutting step, the rib protrusions 1804 can be removed or trimmed such that the left and/or right sides of the formliner 1800 are prepared to receive or be overlaid with other formliners. The trimming of the rib protrusions 1804 can be used to create one or more rib openings discussed above. In this manner, the initial forming operation can be simplified while allowing a precise edge to be cut in order to define the rib openings. Therefore, in accordance with some embodiments disclosed herein, the forming step can comprise forming one or more rib protrusions in the formed sheet during manufacturing of the formliner. Subsequently, the method of manufacturing the formliner can comprise trimming or otherwise removing the one or more rib protrusions from the formliner in order to define one or more rib openings.

Once a blank has been formed into a formed sheet using a thermoforming machine, the formed sheet can be further processed using cutting equipment. In some embodiments, the process can employ a laser-cutting device. A laser can provide superior results by exact dimensioning and tolerancing; however, other cutting devices can also be used. The cutting operation or step allows the rib openings discussed above to be formed for those embodiments in which rib openings are used. However, in all embodiments, the cutting operation or step can be used to remove excess material from the edges of the formed sheet in order to produce a prepared formliner. The cutting operation or step can be particularly important in order to ensure that mating edges properly align with corresponding portions of other formliners. Additionally, the cutting operation or step can be particularly important in ensuring that protrusions and recesses of formliners can be properly engaged in assembling a plurality of formliners.

Figure 23:
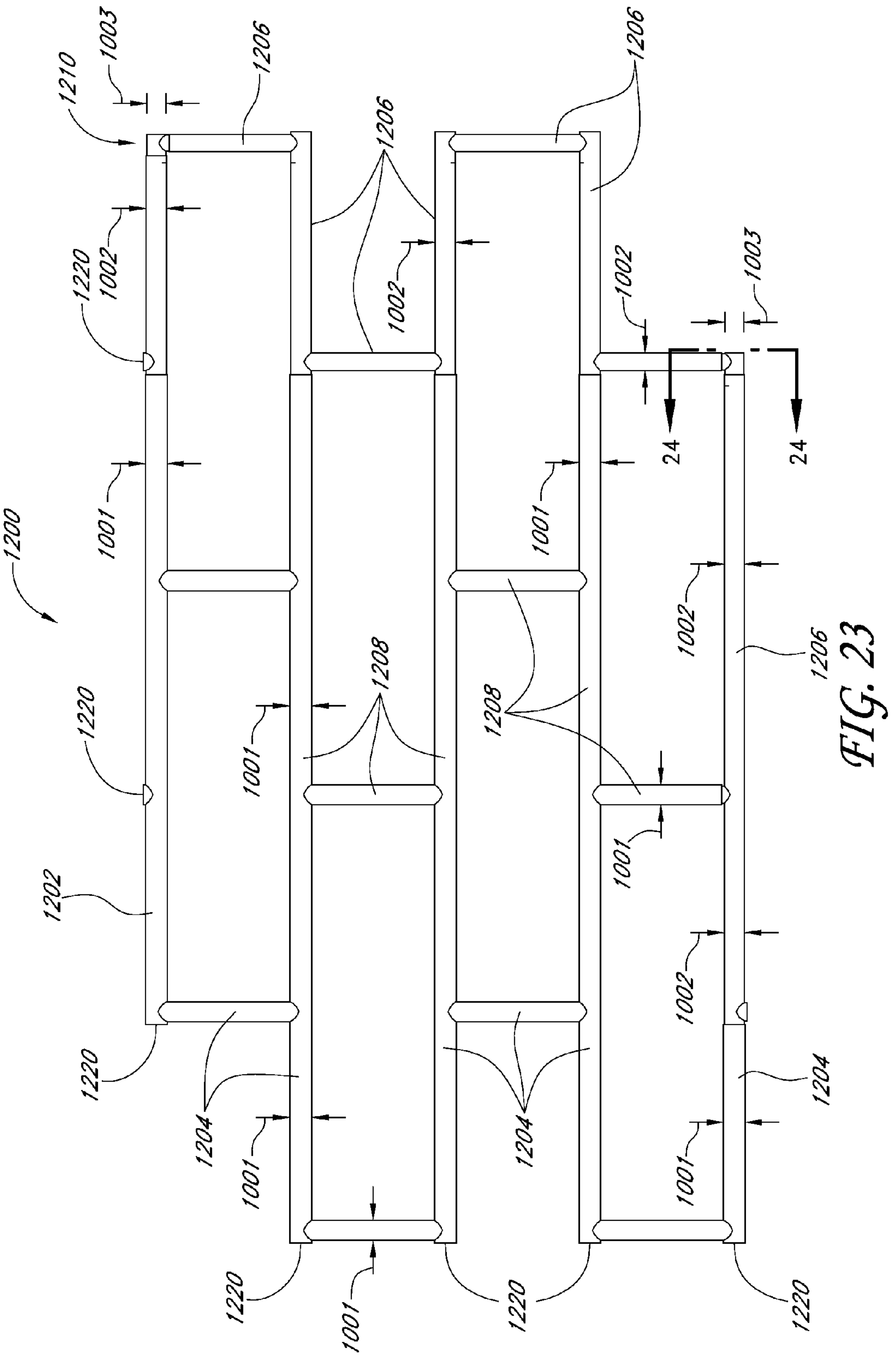
FIG. 23 is a top view of a formliner, according to an embodiment.

FIG. 23 is a top view of a formliner 1200 in accordance with an embodiment. As with the formliner 1100, the formliner 1200 comprises a plurality of ribs 1202 that form a rib structure. The ribs 1202 can comprise one or more overlapping portions 1204 and one or more overlapped portions 1206. Additionally, the formliner 1200 can comprise non-overlap portions 1208. The embodiment of FIG. 23 illustrates that the overlapping portions 1204 and the non-overlap portions 1208 can define a common outer dimension 1001, Thus, when a plurality of the formliners 1200 are interconnected, the overlapping portions 1204 overlap with the overlapped portions 1206 and the resulting rib structure of the interconnected formliners has a common outer dimension 1001. Further, the protrusions and detents can be placed on a single side or both sides of a peripheral rib, in accordance with some embodiments.

In this regard, as discussed above, the overlapped portions 1206 can define an outer dimension 1002. The outer dimension 1002 can be less than the outer dimension 1001. Further, an inner dimension of the overlapping portions 1204 can also be greater than the outer dimension 1002 of the overlapped portions 1206.

Moreover, it is contemplated that in using a formliner that defines a generally rectangular perimeter, there may be sections of interconnected formliners in which more than two formliners overlap. Accordingly, in some embodiments, the formliner 1200 can be configured to define a sub-overlapped section 1210. As illustrated in the upper and lower right corners of the formliner 1200, the sub-overlapped sections 1210 can define an outer dimension 1003. The outer dimension 1003 can be less than the outer dimension 1002 and the outer dimension 1001. Further, an inner dimension of the overlapped portions 1206 can also be greater than the outer dimension 1003 of the sub-overlapped portions 1210. Additionally, as described above with respect to FIG. 19, the formliner 1200 can also be configured to include a plurality of rib openings 1220. As similarly described above, the plurality of rib openings 1220 can be located and configured to correspond with corresponding ribs of adjacent interconnected formliners.

As noted above, in some embodiments, the overlapped portions can comprise one or more detents, and the overlapping portions can comprise one or more protrusions. In this regard, it is contemplated the protrusions and detents can extend along any length of a respective rib. For example, the protrusions and detents can extend along less than the entire length of a respective rib such that the protrusion and/or detent is offset from a corner or end of the respective rib. It is also contemplated that the protrusions and detents can extend continuously or discontinuously along the respective rib. Moreover, it is appreciated that the design and interlocking profile of the formliner can dictate the arrangement, length, and pattern of the protrusions and detents.

In this manner, a single formliner can be used to create a continuous decorative pattern that can be used for any size concrete structure. Advantageously, in contrast to prior art formliners, embodiments of the formliners disclosed herein can be interconnected to create a dimensionally continuous, precise assembly of formliners.

Figure 24:
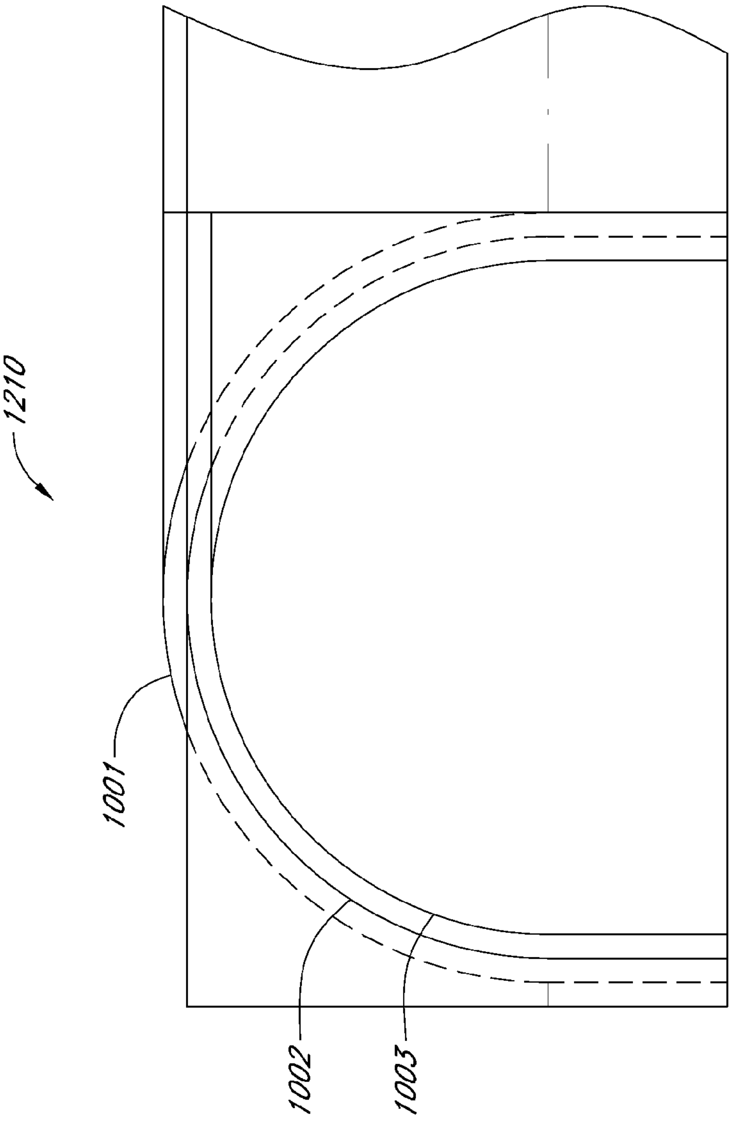
FIG. 24 is an end view taken along section 24-24 of FIG. 23.

Referring now to FIG. 24, an end view of the sub-overlapped section 1210 of FIG. 23 is illustrated. As shown, the sub-overlapped section 1210 defines an outer dimension 1003 that is less than the outer dimension 1002 of the overlapped section 1206 (shown in dashed lines). Additionally, the outer dimension 1001 of the overlapping sections 1204 is also shown dashed lines and illustrated as being greater than both the outer dimension 1002 and the outer dimension 1003.

Figure 25:
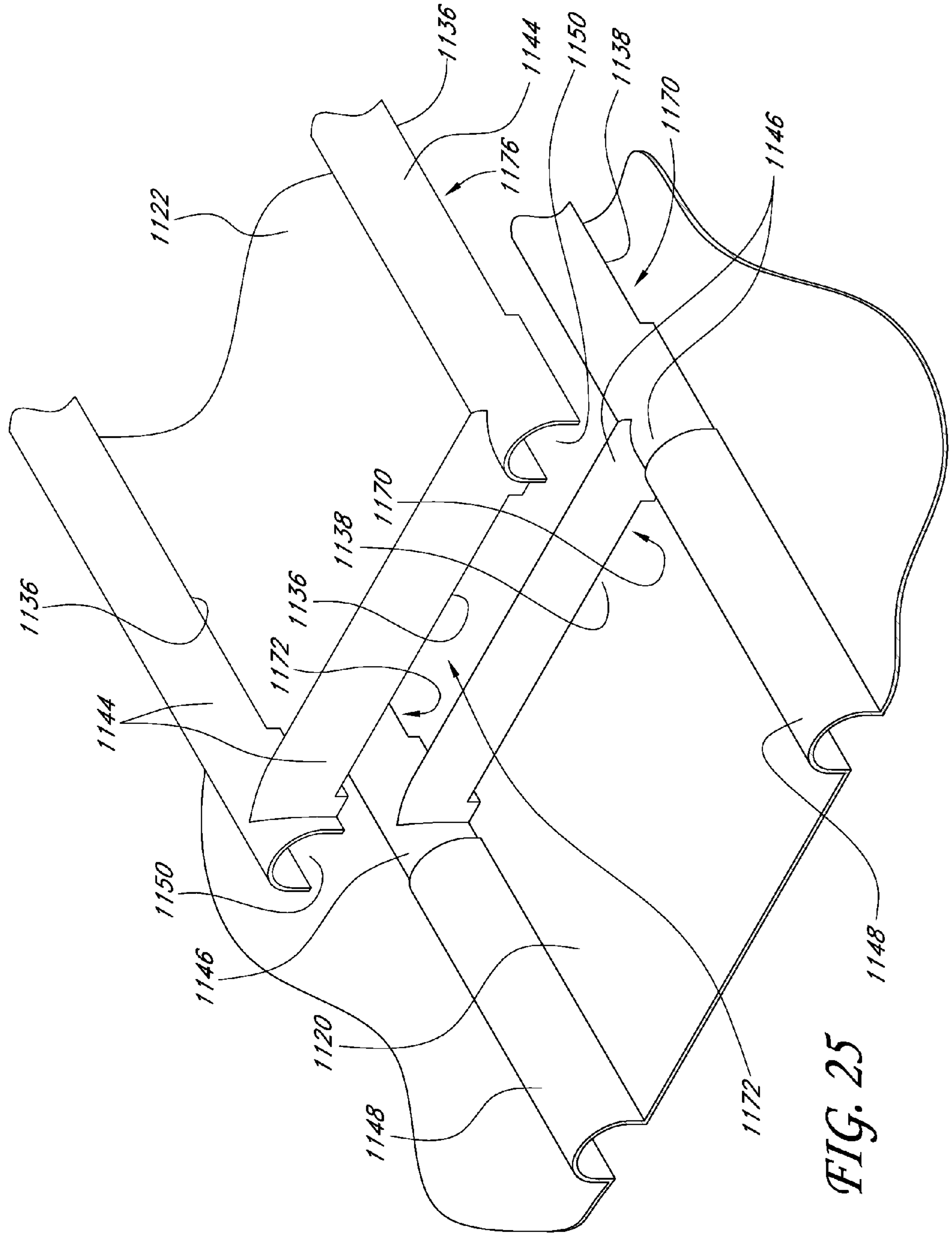
FIG. 25 is a perspective view of first and second formliners as the first formliner is overlaid onto the second formliner, according to an embodiment.

FIG. 25 is a perspective view of the formliner assembly of FIG. 20. In particular, the formliner 1122 and the formliner 1120 are shown in a pre-assembled state. In this regard, FIG. 25 illustrates that the overlapped sections 1146 of the formliner 1120 are received within cavities of the overlapping sections 1144 of the formliner 1122. As discussed below in reference to FIG. 29, the upper surfaces of the overlapping sections 1144 of the formliner 1122 can be generally flush with the upper surfaces of non-overlap sections 1148 of the formliner 1120.

FIG. 25 also illustrates another view of the engagement between the protrusions 1136 formed on the free side edges 1176 and the corner portions 1174 of the overlapping sections 1144 of the formliner 1122 and the detents 1138 formed on the free side edges 1172 and the corner portions 1170 of the overlapped sections 1146 of the formliner 1120. As shown therein, the corner portions of the rib are formed wherealong the rib and the cell meet.

Figure 26:
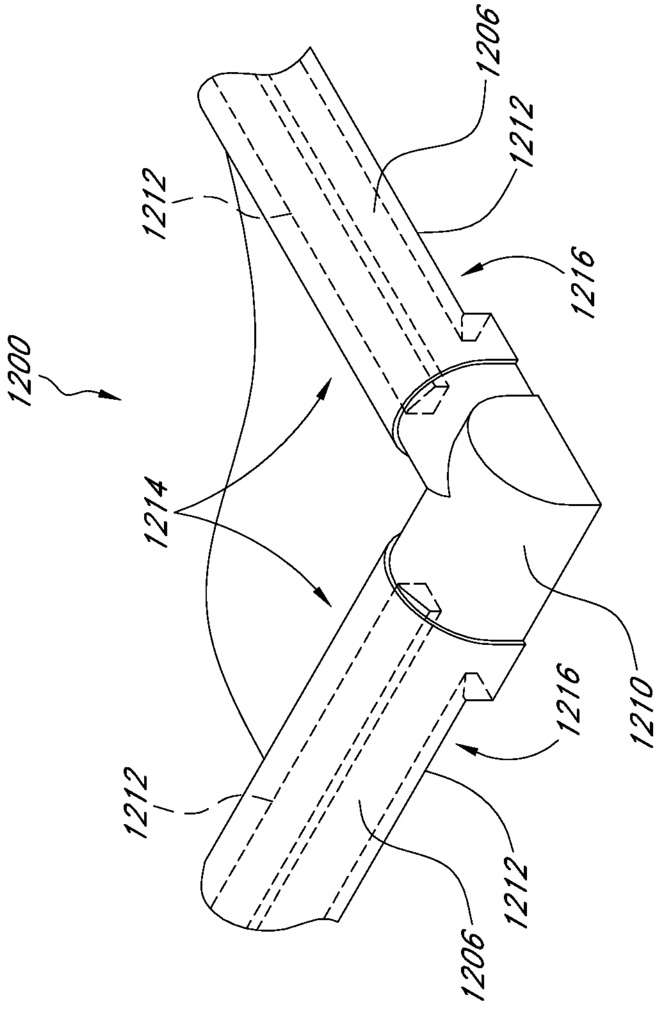
FIG. 26 is an enlarged perspective view of a rib corner of the formliner shown in FIG. 19.

FIG. 26 is a partial perspective view of the formliner 1200, illustrating the sub-overlapped portion 1210 thereof. As shown, the sub-overlapped portion 1210 defines a smaller cross-sectional profile or dimension than the overlapped portion 1206. FIG. 26 also illustrated detents 1212 formed along corner portions 1214 and outer side edges 1216 of the formliner 1200.

Figure 27:
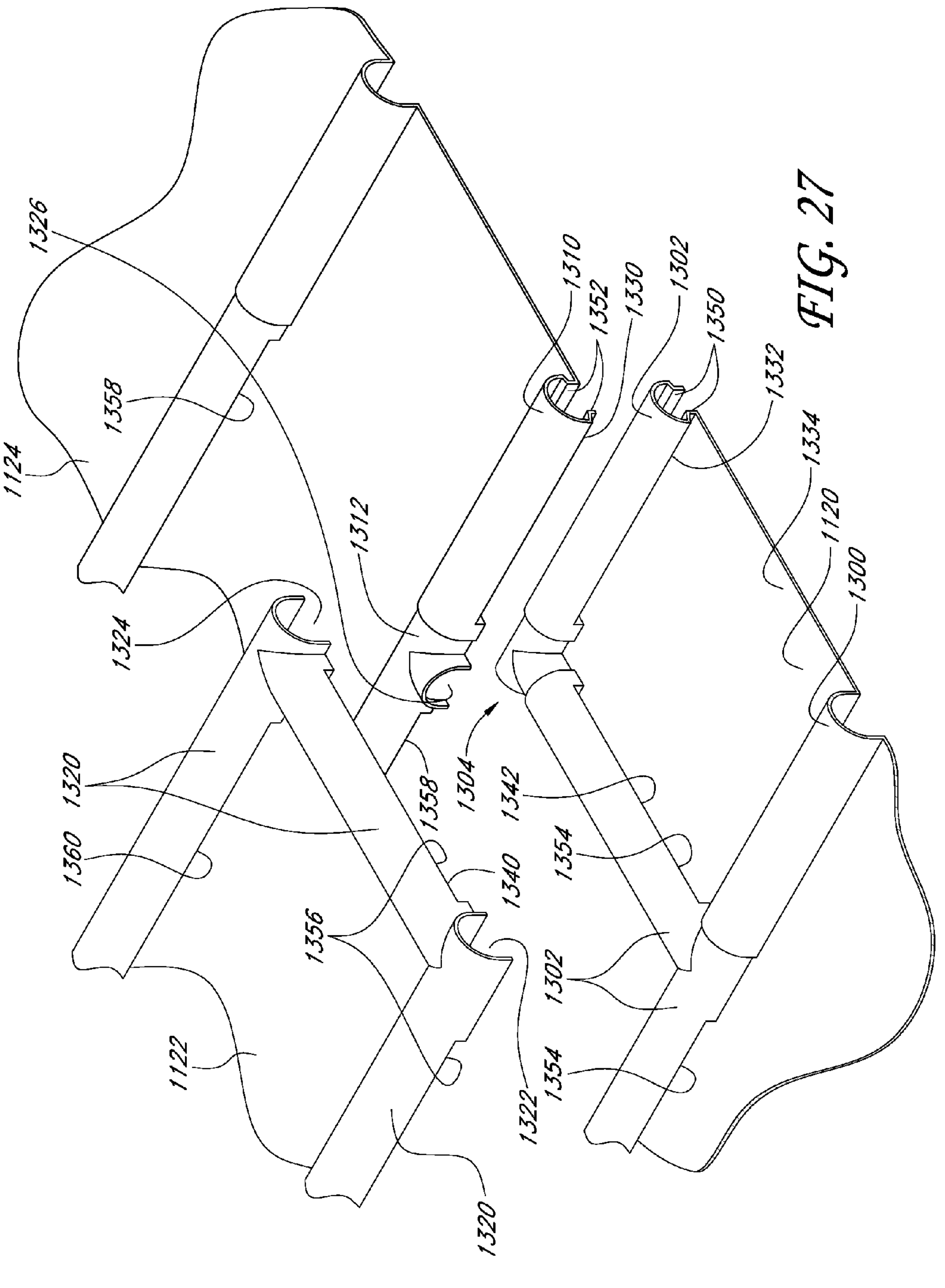
FIG. 27 is a perspective view of a first formliner, a second formliner, and a third formliner illustrating nesting of the formliners along a rib corner of the first formliner, according to an embodiment.

FIG. 27 is a perspective view of the formliner assembly of FIG. 20 illustrating the formliners 1120, 1122, and 1124. In this view, the ribs structure of the formliner 1120 comprises overlapping portions 1300, overlapped portions 1302, and a sub-overlapped portion 1304. The formliner 1124 is first placed onto the overlapped portion 1302 of the formliner 1120. As can be appreciated, an overlapping portion 1310 of the formliner 1124 is placed onto an overlapped portion 1302 of the formliner 1120. Additionally, an overlapped portion 1312 (shown as a T-connection) of the formliner 1124 is placed onto the sub-overlapped portion 1304 of the formliner 1120. Finally, overlapping portions 1320 of the formliner 1122 are placed onto the overlapped portions 1302 of the formliner 1120 and the overlapped portion 1312 of the formliner 1124.

One of the unique features of embodiments disclosed herein is the inclusion of rib openings that allow the overlapped portions of the ribs to be nested within overlapping portions of other ribs and to extend through the rib openings. For example, with reference to FIG. 25, rib openings 1150 can be provided in the overlapping sections 1144 of the formliner 1122. Further, with regard to FIG. 24, a rib opening 1322 is provided in the overlapping portions 1320 of the formliner 1122. This rib opening 1322 allows the overlapping portions 1320 to be overlaid onto the overlapped portion 1312 with the overlapped portion 1312 extending through the rib opening 1322. Similarly, a rib opening 1324 allows the overlapped portions 1302 the past therethrough thus enabling the overlapping portions 1320 to be overlaid onto the overlapped portions 1302. Finally, the illustrated embodiment in FIG. 8 also shows a rib opening 1326 formed in the overlapped portion 1312, which enables the sub-overlapped portion 1304 to extend therethrough. As will be appreciated by one of skill in the art, the rib openings of some embodiments disclosed herein uniquely allow overlapping formliners to minimize visible seaming by allowing the overlapping portions of the formliners to fit tightly and closely together.

With regard to FIG. 27, once assembled, the overlapping portions 1300, 1310, and 1320 each define a common outer dimension or shape. Thus, when the formliner assembly is pressed into fresh concrete or when concrete is poured thereagainst, the impressions of the rib structure of the formliner assembly will appear seamless and uniform.

In addition, as will be appreciated, once the formliners 1120, 1122, and 1124 are assembled, an edge 1330 of the overlapping portion 1310 of the formliner 1124 will be disposed into a corner 1332 formed between the overlapped portion 1302 and a cell 1334 of the formliner 1120. As such, any seaming between the overlapping portion 1310 of the formliner 1124 and the cell 1334 of the formliner 1120 will be reduced and/or eliminated.

Similarly, an edge 1340 of the overlapping portion 1320 of the formliner 1122 will be disposed into a corner 1342 formed by the overlapped portion 1302 and the cell 1334. Thus, seaming between the formliner 1120 and formliner 1122 will be greatly reduced and/or eliminated.

Further, the seaming can further be reduced in some embodiments wherein the formliners 1120, 1122, 1124 comprise detents and protrusions that facilitate engagement between the formliners 1120, 1122, 1124. As illustrated, the formliner 1120 can comprise detents 1350 that can be engaged by protrusions 1352 of the formliner 1124. Further, the formliner 1120 can comprise detents 1354 that can be engaged by protrusions 1356 of the formliner 1122. Finally, the formliner 1124 can comprise detents 1358 that can be engaged by protrusions 1360 of the formliner 1122.

Figure 28:
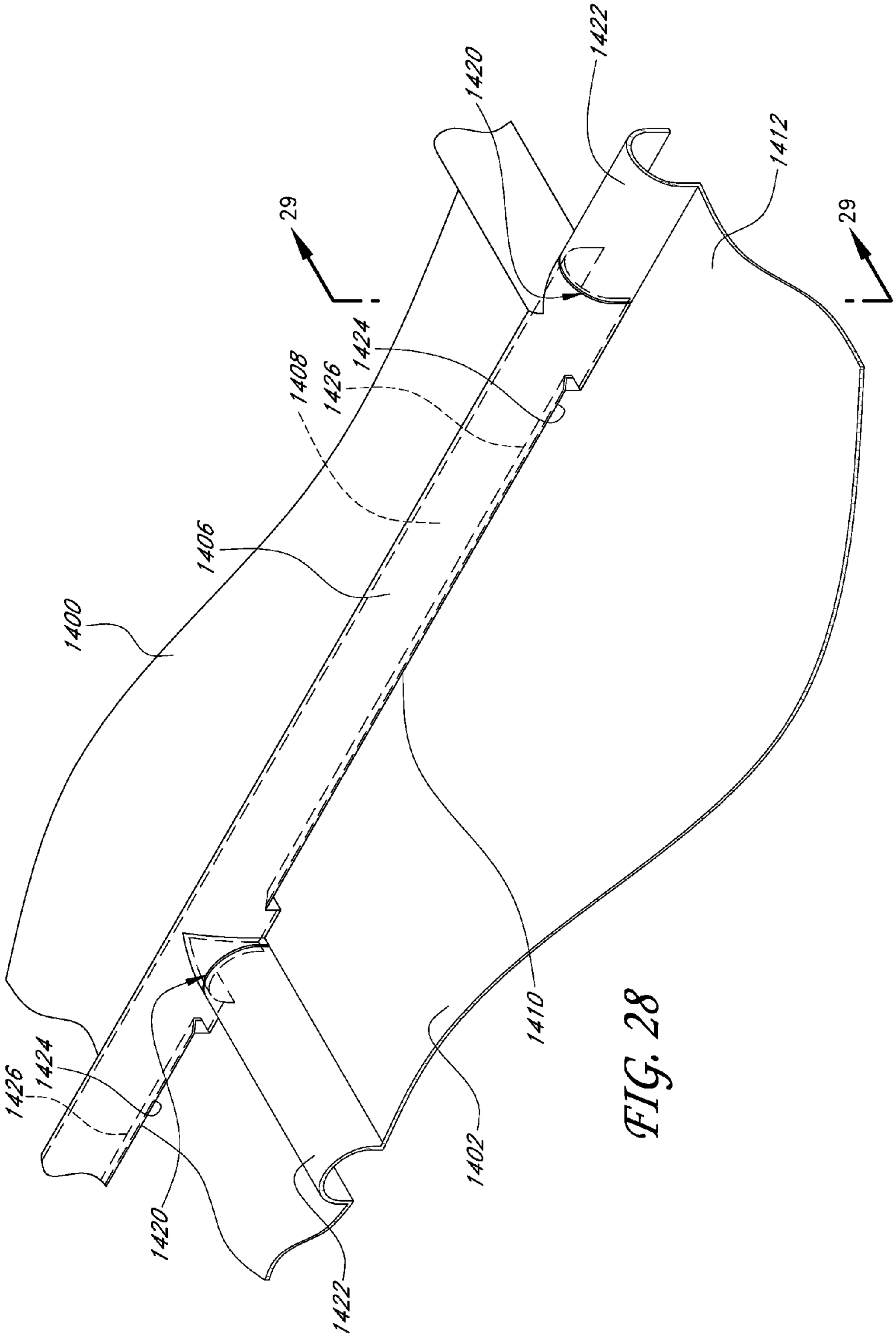
FIG. 28 is a perspective view of first and second formliners in an interconnected configuration, according to an embodiment.

FIG. 28 illustrates many of the above-discussed principles. In this figure, a first formliner 1400 is mated with a second formliner 1402. And overlapping portion 1406 of the first formliner 1400 is placed onto an overlapped portion 1408 of the second formliner 1402. As discussed above with respect to FIG. 27, the mating of an edge 1410 of the overlapping portion 1406 with 1412 of the second formliner 1402 can create an imperceptible seam between the first and second formliners 1400, 1402. Further, transition zones or joints 1420 between the overlapping portion 1406 of the first formliner 1400 and an overlapping portion 1422 of the second formliner 1402 can be minimized so as to reduce and/or eliminate any visible seaming at the transition zones or joints 1420.

Figure 29:
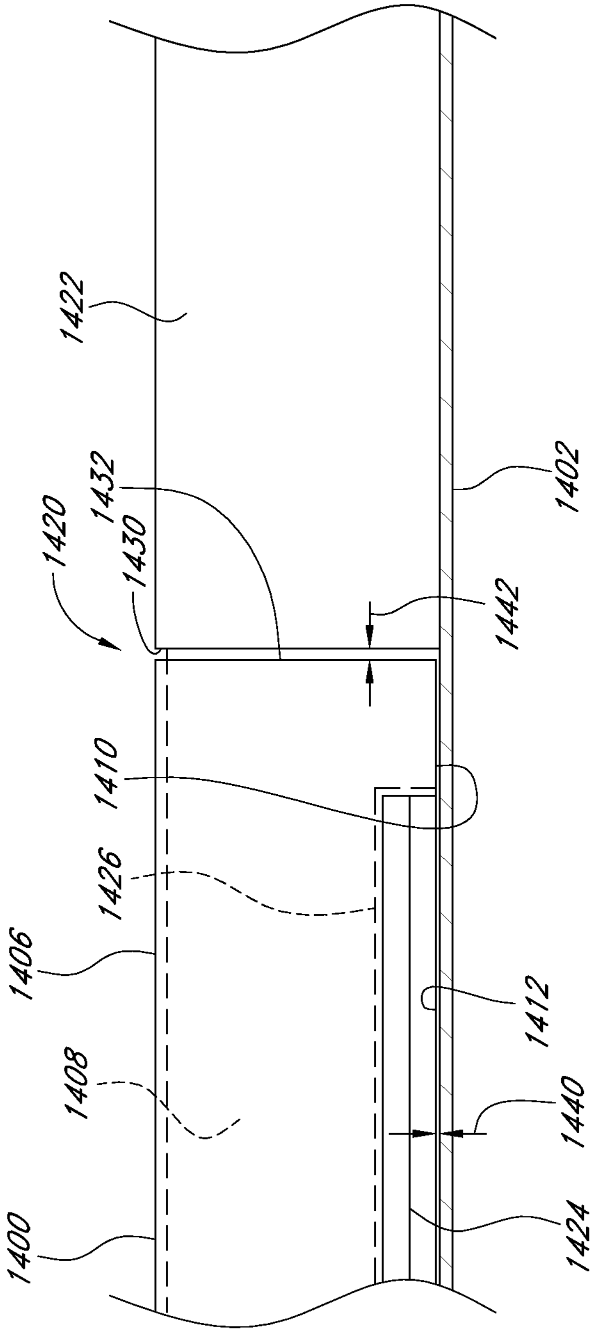
FIG. 29 is a cross-sectional side view of the first and second formliners shown in FIG. 28 illustrating flush exterior surfaces of the first and second formliners.

Furthermore, upon application of a curable material to the formliner assembly illustrated in FIGS. 28 and 29, protrusions 1424 of the overlapping portion 1406 of the first formliner 1400 can be further engaged with detents 1426 of the overlapped portions 1408 of the second formliner 1402. This enhanced engagement further prevents dislodging or misalignment between the formliners 1400, 1402. Again, such a superior benefit is not disclosed or taught by prior art formliners.

Referring now to FIG. 29, an enlarged view of a transition zone or joint 1420 of FIG. 28 is illustrated. As shown, the transition zone or joint 1420 can comprise a simple step 1430 from a first dimension to a second dimension. In some embodiments, this may be an immediate increase in the dimension along the rib of the second formliner, specifically from the overlapped portion 1408 to the overlapping portion 1422. However, in other embodiments, it is contemplated that the step 1430 can be a tapered transition between the overlapped portion 1408 and the overlapping portion 1422. Additionally, a side edge 1432 of the overlapping portion 1406 of the first formliner 1400 can be configured to correspond to the shape and dimension of the step 1430.

Further, FIG. 29 also illustrates the nesting arrangement of the overlapping portion 1406 of the first formliner 1400 is shown with respect to the overlapped portion 1408 of the second formliner 1402. Finally, FIG. 29 also illustrates the orientation of the edge 1410 of the overlapping portion 1406 of the formliner 1400 is shown with respect to the cell 1412 of the second formliner 1402.

With continued reference to FIG. 29, it will be appreciated that a seam 1440 formed between the edge 1410 and the cell 1412 can be reduced as the fit between the first formliner 1400 and the second formliner 1402 are optimized. In this regard, the internal geometry of the overlapping portion 1406 can be specifically configured to match the external geometry of the overlapped portion 1408, thus reducing any seam (whether along the edge 1410 or the side edge 1432) between the overlapping portion 1406 and the overlapped portion 1408.

As noted above, one of the advantages of embodiments disclosed herein is that seams of overlapped portions of adjacent formliners can be minimized and/or eliminated. In this regard, as illustrated in FIG. 29, the seam 1440 is created along a corner at or along a bottom portion of the cell 1412 of the formliner 1402 which forms part of a prepared formliner mold cavity. In this regard, the seam 1440 is positioned such that the weight of a curable material, such as concrete, against the first formliner 1400 causes the overlapping portion 1406 of the first formliner 1400 to be pressed against the overlapped portion 1408 of the second formliner 1402 with great force thereby causing the edge 1410 to be positioned as close as possible relative to the cell 1412 in order to minimize and/or eliminate the seam 1440 between the adjacent formliners 1400, 1402. This innovative feature of embodiments disclosed herein, which allows seams to be created along the bottom faces or portions of the mold allows the weight of the curable material to act as a compressive agent in reducing and/or eliminating seams between adjacent formliners. For example, a common curable material such as concrete generally weighs 150 pounds per cubic foot, and embodiments of the present inventions are able to take advantage of the significant force of such a material in order to create an aesthetically superior product.

Furthermore, the tolerances between the overlapping portion 1406 and the overlapped portion 1408 can also define a seam 1442. Specifically, the distance between the edge 1432 and the step 1430 can define the seam 1442. It is contemplated that the overlapping portion 1406 can be toleranced with a longitudinal length such that the edge 1432 thereof abuts the step 1430. It is also contemplated that as with the seam 1440, the compressive forces of the material against the first formliner 1400 and the second formliner 1402 can serve to reduce the size of the seam 1442 to thereby create a superior finished product.

Referring now to FIGS. 19-29, it is noted that the above-discussed embodiments of the formliner and formliner components provide for a distinct shelf or step between rib sections having differing geometries or configurations. For example, as noted above with respect to FIG. 29, the step 1430 is a transition zone, shelf, or shoulder between the overlapping portion 1422 and the overlapped portion 1408 of the second formliner 1402 as briefly mentioned above, the step 1430 can provide a gradual transition from the overlapping portion 1422 to the overlapped portion 1408. However, in some embodiments, it is contemplated that the formliner can be formed with ribs or ridges that taper from a first geometry or configuration to a second geometry or configuration. As such, the shoulder 1430 can be eliminated from such embodiments.

For example, referring generally to a side view similar to that of FIG. 29, it is contemplated that a rib can taper from a first dimension or configuration in an overlapping portion to a second dimension or configuration in an overlapped portion. In yet other embodiments, it is contemplated that the rib can taper from the second dimension or configuration to a third dimension or configuration. The tapering of the rib from one dimension to another can comprise a generally constant taper or a variable taper.

Further, in some embodiments, overlapping portions of the ribs of the formliner can be configured to define a variable thickness corresponding to the tapering of the overlapped portions onto which the overlapping portions will be overlaid. As such, the cumulative dimension or configuration of nested or overlaid rib portions can be generally constant. However, it is likewise contemplated that the thickness of overlapping or interconnecting formliners can be generally constant along their respective ribs or ridges.

Additionally, in accordance with at least one of the embodiments disclosed herein is the realization that in forming a pattern of interconnected formliners, the edges along the top, bottom, left, and right sides of a pattern or casting can be carefully arranged in order to ensure a natural appearance. Commonly, a plurality of formliners must be used in order to form a pattern or casting larger than a few square feet in size. Typically, in arranging or interconnecting the formliners, an artisan may begin from a top left corner and work down and across toward the bottom right corner. Thus, the left side and the top side of the pattern or casting can generally be comprised of whole or entire formliners that are interconnected vertically and horizontally. Additionally, formliners located in the center portions of the pattern or casting are also whole or entire formliners. However, according to at least one of the embodiments disclosed herein is the realization that formliners located along the bottom and right sides of the pattern or casting may only be partial sheets. In some embodiments, this deficiency can be overcome by providing alternative embodiments of a formliner that enable the artisan to create desirable bottom and right side edges and/or that can be interconnected with other formliners along a partial length thereof in order to form a clean edge, whether it is a straight edge, curved edge, angled edge, or otherwise.

Figure 30:
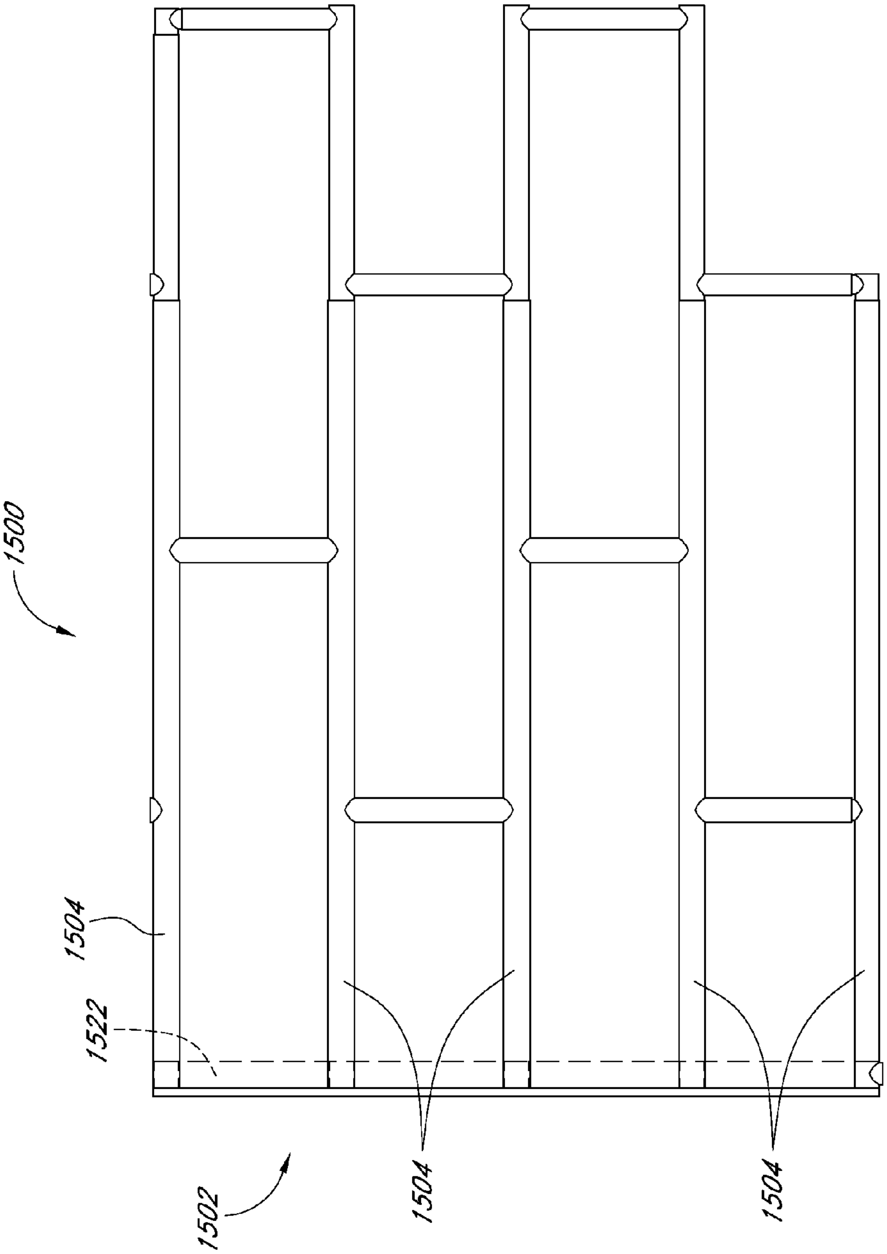
FIG. 30 is a top view of a formliner for forming a mold corner, according to another embodiment.

Accordingly, referring to FIGS. 30-33, alternative formliner embodiments are shown. In FIG. 30, a formliner end portion 1500 is shown. The formliner end portion 1500 can comprise many of the same features as discussed above with respect to the other formliner embodiments. For example, the formliner end portion 1500 can comprise the protrusions and/or detents discussed above. However, the formliner end portion 1500 can also optionally comprise a generally straight side 1502 that is configured to mate with a corresponding formliner end portion. In this regard, it is contemplated that in use, the formliner end portion 1500 can be used at a far side or end of the desired pattern. For example, the formliner end portion 1500 can be used for a left side boundary or a right side boundary.

In some embodiments, the formliner end portion 1500 can be configured to mate with another formliner to form a corner of a pattern, casting, or formwork. In such an embodiment, the formliner end portion 1500 can also optionally comprise a ledge recess 1522, as described below. For example, the ledge recess 1522 can be forwarded by a length of the ribs 1504 which comprises a reduced geometry or dimension, as shown in dashed lines in FIG. 30. Accordingly, some embodiments of the formliner end portion 1500 can be provided in which the side 1502 can mate with corresponding formliner components or portions.

Figure 31:
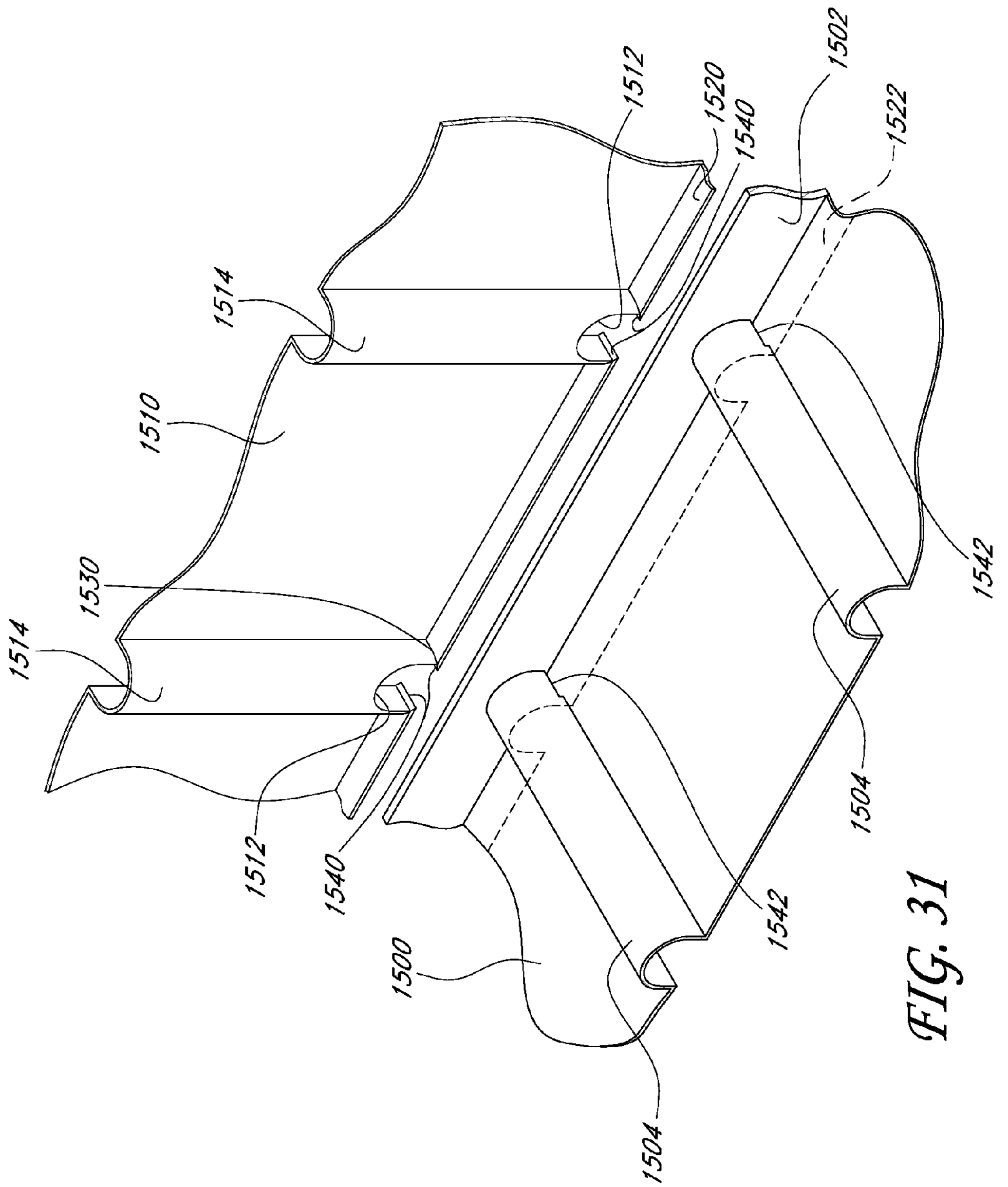
FIG. 31 is a perspective view of first and second formliners configured to form a mold corner, according to an embodiment.

For example, an exemplary mating arrangement of the formliner end portion 1500 with a formliner component or portion is illustrated in FIG. 31. As shown therein, the formliner end portion 1500 can receive a corresponding formliner end portion 1510. The formliner end portion 1500 and the corresponding formliner end portion 1510 can be interconnected or positioned such that they form a corner in a pattern, casting, or formwork.

In accordance with the embodiments of the formliner end portion 1500 and the corresponding formliner end portion 1510 illustrated in FIG. 31, the corresponding formliner end portion 1510 can define a plurality of recesses 1512 formed at the ends of rib members 1514. The recesses 1512 can be configured to allow the rib members 1514 to fit over the ribs 1504 of the formliner end portion 1500. Thus, the formliner end portion 1500 and the corresponding formliner end portion 1510 can be positioned relative to each other at a right angle such that a right angle corner in the pattern or casting is produced. However, it is contemplated that the recesses 1512 can define other shapes that allowed the corresponding formliner end portion 1510 to be oriented at any variety of angles relative to the formliner end portion 1500. In this regard, the side 1502 can be oriented generally perpendicularly relative to the ribs 1504, or the side 1502 can be disposed at an angle relative to the ribs 1504, thereby facilitating a desired angular interconnection between the formliner end portion 1500 and the corresponding formliner end portion 1510.

Additionally, in the embodiments illustrated in FIG. 31, the corresponding formliner end portion 1510 can also comprise a mating ledge 1520. In some embodiments, the mating ledge 1520 can be connected to both the ribs 1514 and the planar portions of the cells above the corresponding formliner end portion 1510. As such, the mating ledge 1520 could be generally rigidly positioned relative to the ribs 1514. Such an embodiment could be advantageous in facilitating the alignment between the formliner end portion 1500 and the corresponding formliner end portion 1510. In this regard, as mentioned above with respect to the side 1502, the mating ledge 1520 can be oriented at a given angle relative to the ribs 1514. As illustrated, the mating ledge 1520 can be oriented at approximately a right angle relative to the ribs 1514. However, it is contemplated that the mating ledge 1520 can also be oriented at any variety of angles relative to the ribs 1514. In some embodiments, the mating ledge 1520 can be configured to fit into or be received in the ledge recess 1522 formed along the formliner end portion 1500.

However, in other embodiments, the mating ledge 1520 can be hingedly or moveably attached to the corresponding formliner end portion 1510. For example, the mating ledge 1520 can be attached to the corresponding formliner end portion 1510 along the length of the cells thereof, but not connected to the ribs 1514. In other words, the mating ledge 1520 can be separated or cut from the ribs 1514 by means of a slit 1530. Thus, the slit 1530 can allow the mating ledge 1520 to be generally flexible or movable relative to the corresponding formliner end portion 1510. In such embodiments, the mating ledge 1520 can be folded under a portion of the formliner end portion 1500. Optionally, the side 1502 of the formliner end portion 1500 can be eliminated in order to allow the mating ledge 1520 to extend to underneath the formliner end portion 1500.

Figure 32:
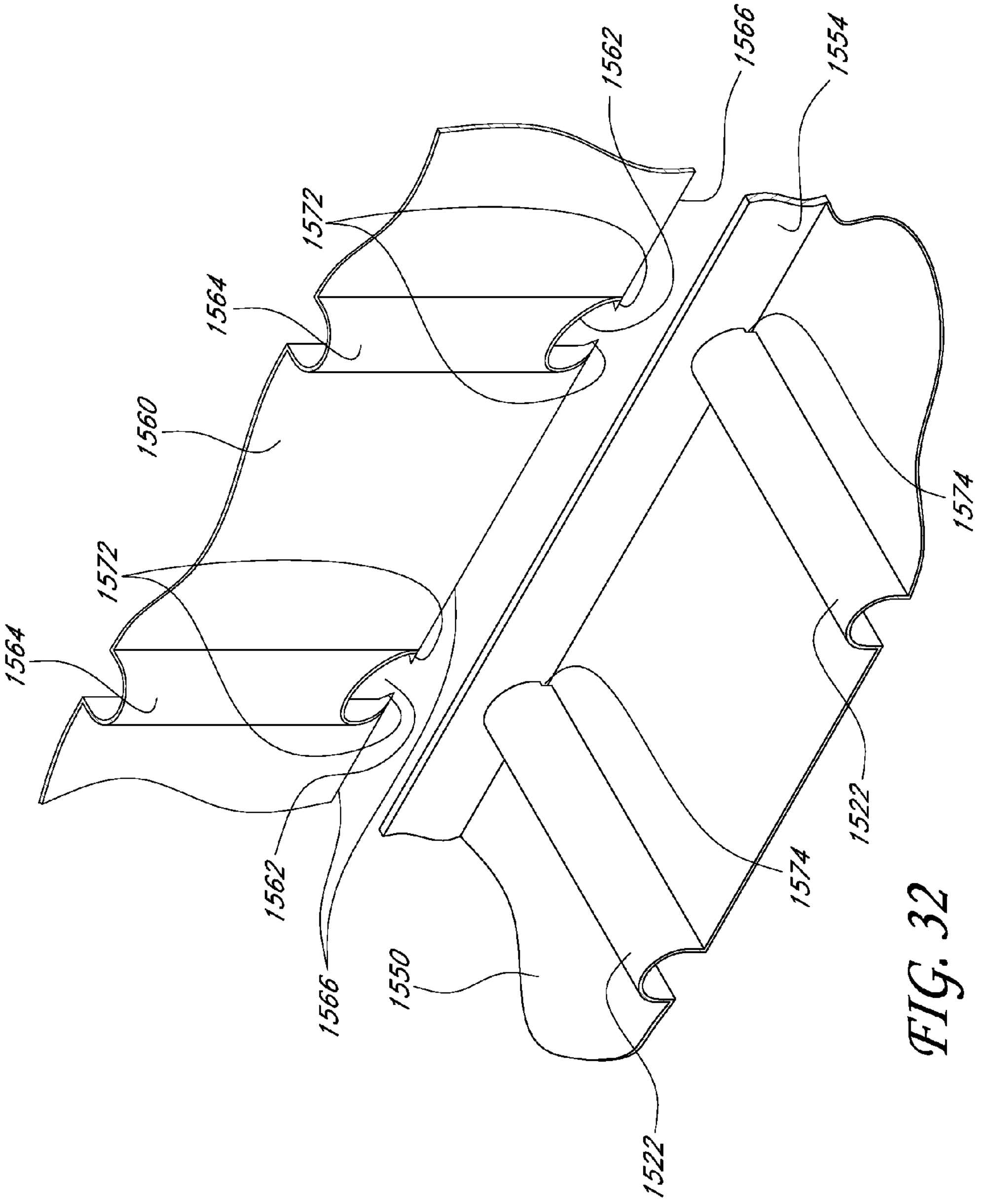
FIG. 32 is a perspective view of first and second formliners configured to form a mold corner, according to another embodiment.

Nevertheless, in other embodiments, such as that illustrated in FIG. 32, it is contemplated that the ledge recess can be eliminated and that the ribs define a generally constant cross-sectional geometry. For example, the cross-sectional geometry of the ribs can be generally constant along central portions and end portions of the ribs adjacent the side of the formliner end portion.

Further, as shown in FIG. 31, in some embodiments, the formliner end portion 1510 can comprise one or more protrusions 1540 disposed at the recesses 1512 for engaging corresponding detents 1542 formed in the ribs 1504. As such, the interconnection of the formliner end portions 1500, 1510 can be sufficiently secure so as not to require an adhesive.

Referring to FIG. 32, a formliner end portion 1550 can comprise one or more ribs 1552. Optionally, the formliner end portion can also comprise a side 1554. However, as described above, the side 1554 can also be eliminated in some embodiments. Additionally, the corresponding formliner end portion 1560 can be configured to mate with the formliner end portion 1550. The embodiment of the corresponding formliner end portion 1560 does not include the mating ledge of the embodiment discussed in regard to FIG. 31. As will be appreciated with reference to FIG. 32, openings 1562 in ribs 1564 of the corresponding formliner end portion 1560 can be mated against the ribs 1522 of the formliner end portion 1550 to create a corner of a desired angle measurement for a pattern or casting. Further, the openings 1562 are preferably configured such that an edge 1566 of the corresponding formliner end portion 1560 can be positioned against the top surface of the cells of the formliner end portion 1550. Optionally, the openings 1562 can be configured to be manipulated in order to allow varying angles of orientation between the formliner end portion 1550 and the corresponding formliner end portion 1560. For example, a portion of the ribs 1564 can be configured as a “tear away” that allows the openings 1562 to be enlarged. The embodiment of FIG. 32 can facilitate a tight fit between the formliner end portion 1550 and the corresponding formliner end portion 1560.

Further, as shown in FIG. 32, in some embodiments, the formliner end portion 1560 can comprise one or more protrusions 1572 disposed at the recesses 1562 for engaging corresponding detents 1574 formed in the ribs 1522. As such, the interconnection of the formliner end portions 1550, 1560 can be sufficiently secure so as not to require an adhesive.

Figure 33:
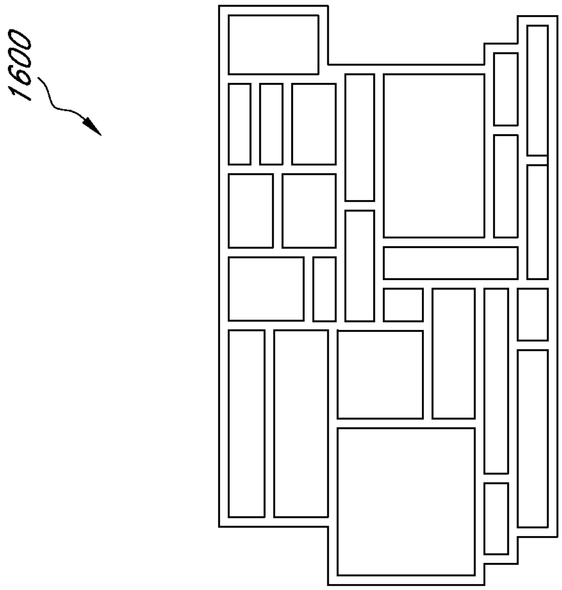
FIG. 33 is a top view of an alternative configuration of a formliner, according to an embodiment.

Referring to FIG. 33, another embodiment of a formliner end portion 1570 can be provided which comprises one or more ribs 1572. As noted above, the formliner end portion 1570 is an embodiment in which no side is used. Similar to the other embodiments disclosed herein, the formliner end portion 1570 can be configured to mate with a corresponding formliner end portion 1580. The embodiment of the corresponding formliner end portion 1580 does not include the mating ledge of the embodiment discussed in regard to FIG. 31. As will be appreciated with reference to FIG. 33, openings 1582 in ribs 1584 of the corresponding formliner end portion 1580 can be mated against the ribs 1572 of the formliner end portion 1570 to create a corner of a desired angle measurement for a pattern or casting.

It is contemplated that the embodiment of FIGS. 30-32 can aid the artisan in creating a dimensionally accurate and seamless corner of a faux brick mold. It is contemplated also that other such features, such as three-point corners, convex arches, and concave arches can be formed using similar principles.

Figure 34:
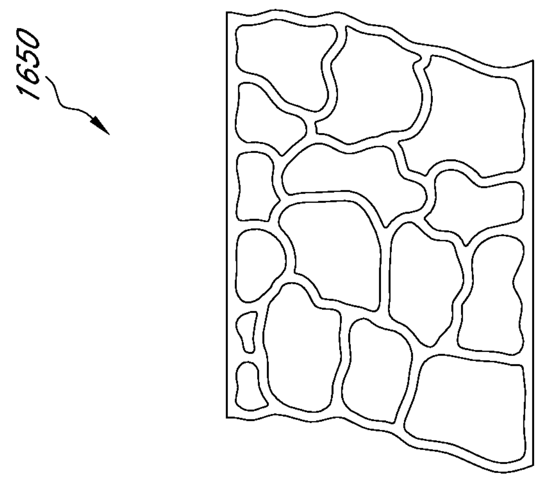
FIG. 34 is a top view of another alternative configuration of a formliner, according to another embodiment.

Further, FIGS. 33-34 illustrate other embodiments of a formliner, sheet, or panel having other shapes and geometries for imparting different patterns to a curable material. As discussed above, such patterns can be of stone, wood, slate, or other materials. FIG. 33 is a representation of a formliner 1600 used to produce a stone pattern on an exposed surface. FIG. 34 is a representation of a formliner 1650 used to produce a rock pattern on an exposed surface. As discussed herein, the formliners 1600, 1650 can also be formed to include one or more protrusions and/or detents for enhancing engagement of interconnected formliners so as to eliminate the need for adhesives.

Figure 35:
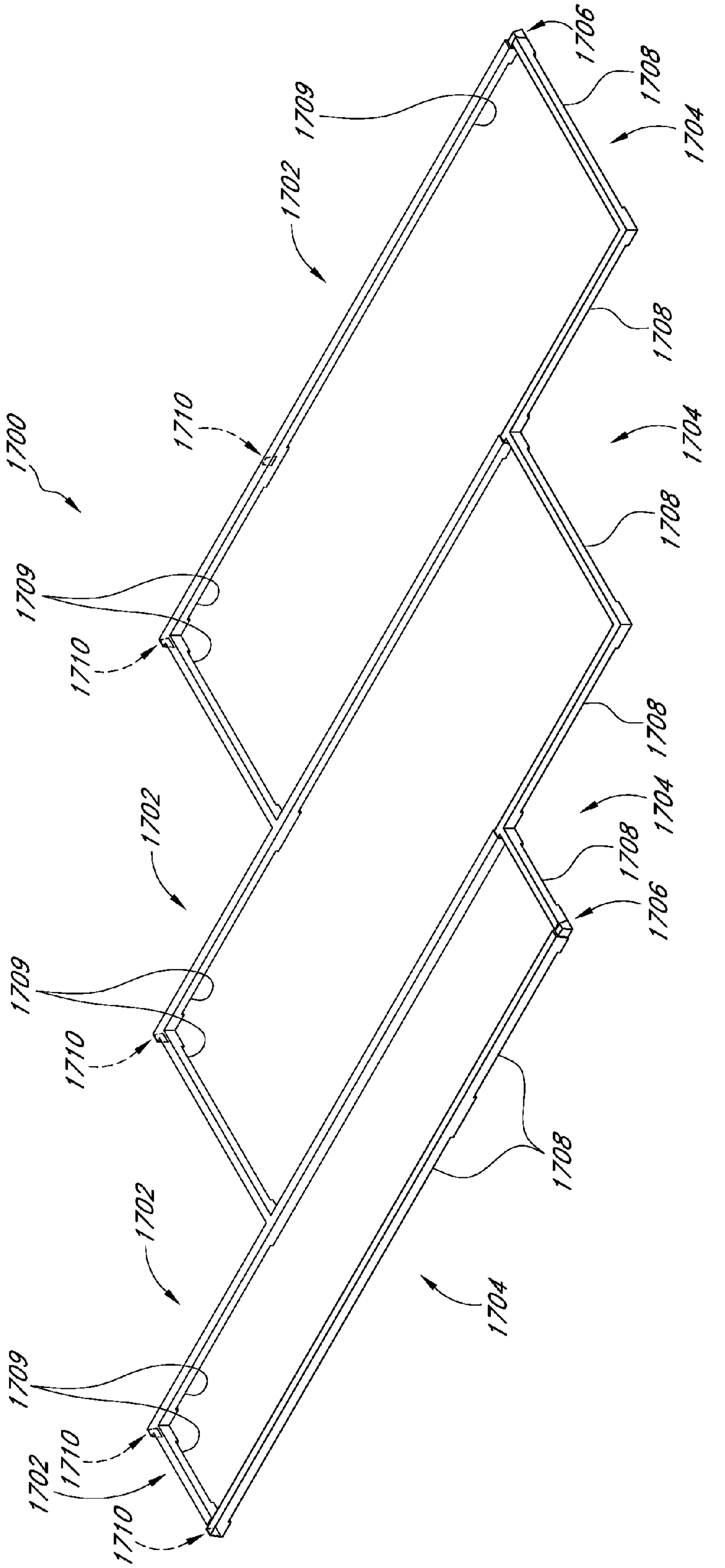
FIG. 35 is a perspective view of yet another alternative configuration of a formliner, according to another embodiment.

FIG. 35 illustrates yet another embodiment of a formliner, sheet, or panel 1700 having a pattern configured to provide the appearance of cut stone. As shown therein, first rib portions 1702 of the formliner 1700 can be configured to define a first geometry or configuration, and second rib portions 1704 can define a second geometry or configuration that corresponds to the first geometry or configuration and enables multiple formliners 1700 to be interconnected along the rib portions 1702, 1704.

In some embodiments, the formliner 1700 can comprise one or more third rib portions 1706 that can define a third geometry or configuration that corresponds to one of the first and second geometries or configurations. For example, the first rib portion 1702, the second rib portion 1704, and the third rib portion 1706 can allow the formliner 1700 to be overlaid with other formliners 1700 in a similar manner as to the formliner 1100 described above, and as shown in FIGS. 20-29.

As mentioned above with respect to the embodiments disclosed in FIGS. 19-29, the first rib portions 1702, the second rib portions 1704, and the third rib portions 1706, can each comprise rib portions having a generally constant geometry or configuration, such as a cross-sectional geometry. However, it is also contemplated that the first rib portions 1702, the second rib portions 1704, and the third rib portions 1706 of the formliner 1700 can taper from one geometry or configuration to another. In other words, the ribs or ridges of the formliner 1700 can taper from the first geometry or configuration to the second geometry or configuration. In yet other embodiments, the ribs or ridges of the formliner 1700 can also taper from the second geometry or configuration to the third geometry or configuration. The tapering in any such embodiment can be formed as a constant taper from one geometry or configuration to another, from one corner to another or along lengths of the ribs or ridges. The tapering in other embodiments can also be formed over discrete sections of the ribs or ridges. Accordingly, in such embodiments, the ribs or bridges can be formed without a distinct shelf or step from a given geometry or configuration to another geometry or configuration. Further, it is contemplated that overlapping portions of adjacent formliners can be configured to define variable thicknesses that taper along with the dimension or configuration of that portion of the ribs or ridges.

Furthermore, the formliner 1700 can comprise one or more detents 1708 and one or more protrusions 1709. As discussed above with respect to the various other embodiments disclosed herein, the protrusions and detents can enhance the interlocking connection between formliners so as to eliminate the need for adhesives.

Finally, the formliner 1700 can also comprise one or more openings 1710 in one or more of the first, second, or third rib portions 1702, 1704, 1706 in order to allow nesting and overlaying of the rib portions with each other, as similarly described above with respect to the embodiments shown in FIGS. 19-29. In this manner, a plurality of the formliners 1700 can be used to create a desirable cut stone pattern while eliminating any appearance of seaming between the formliner 1700.

In accordance with some embodiments, any of the embodiments of the formliner or combinations thereof can be used in a method of creating a decorative pattern in a curable material, such as a casting, whether vertical or horizontal, a wall, etc. The method can comprise assembling a plurality of any of the formliners disclosed herein to form an assembly. Further, a curable material can be positioned against the assembly, such as by pouring. In this manner, the seams between portions of adjacent formliners can be lessened due to the weight of the material. As the material cures, the seams between the adjacent formliners are reduced and/or eliminated compared to the prior art methods and formliners. As such, one may obtain an aesthetically superior product. Further, any of the embodiments herein provides the additional benefit that the artisan need not perform additional finishing steps to eliminate unsightly seams, thus resulting in a tremendous cost and time savings and efficiency.

Figure 36:
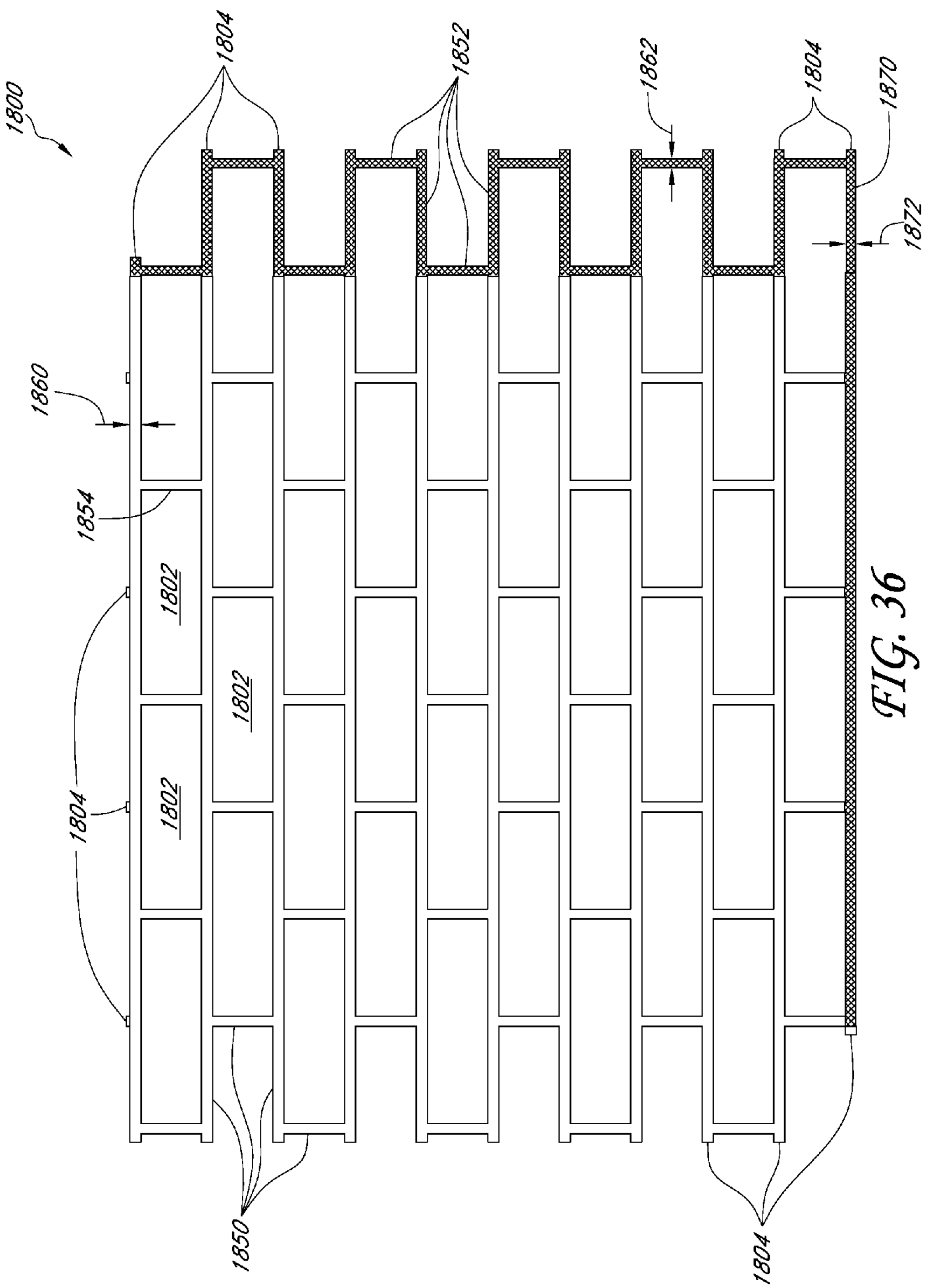
FIG. 36 is a top view of yet another embodiment of an alternative configuration of a formliner, according to another embodiment.

FIG. 36 is a top view of yet another embodiment of an alternative configuration of a formliner 1800, according to another embodiment. The illustrated embodiment of the formliner 1800 differs from other embodiments, such as that shown in FIGS. 1 and 19. For example, the formliner 1800 comprise a larger number of cells 1802. Accordingly, the formliner 1800 can be interconnected with other such formliners and be utilized to cover large areas more efficiently than a smaller formliner, such as that shown in FIGS. 1 and 19.

Additionally, as discussed above, the formliner 1800 is also shown in a nearly finished state. In other words, the formliner 1800 can still be trimmed in order to produce a finished or prepared formliner. In accordance with some embodiments, the formliner 1800 can comprise one or more rib protrusions 1804 that extend from left and/or right sides of the formliner 1800. As discussed above, these rib protrusions 1804 can be removed prior to use in order to form a rib openings, which are discussed above with respect to other embodiments and shown, for example, in at least FIGS. 6, 8, 19, 23, 25, and 27.

Further, as in the other embodiments disclosed herein, the formliner 1800 shown in FIG. 36 also comprises one or more overlapping portions 1850 and one or more overlapped portions 1852. Additionally, the formliner 1800 can comprise non-overlap portions 1854. The embodiment of FIG. 36 illustrates that the overlapping portions 1850 and the non-overlap portions 1854 can define a common outer dimension 1860. Thus, when a plurality of the formliners 1800 are interconnected, the overlapping portions 1850 overlap with the overlapped portions 1852 and the resulting rib structure of the interconnected formliners has a common outer dimension 1860.

In this regard, as discussed above, the overlapped portions 1852 can define an outer dimension 1862. The outer dimension 1862 can be less than the outer dimension 1860. Further, an inner dimension of the overlapping portions 1850 can also be greater than the outer dimension 1862 of the overlapped portions 1852.

Moreover, as discussed above, it is contemplated that in using a formliner that defines a generally rectangular perimeter, there may be sections of interconnected formliners in which more than two formliners overlap. Accordingly, in some embodiments, the formliner 1800 can be configured to define one or more sub-overlapped sections 1870. Similar to the embodiments discussed above, the sub-overlapped sections 1870 can be provided in the upper and lower right corners of the formliner 1800. Further, the sub-overlapped sections 1870 can define an outer dimension 1872. The outer dimension 1872 can be less than the outer dimension 1862 and the outer dimension 1860. Further, an inner dimension of the overlapped portions 1852 can also be greater than the outer dimension 1870 of the sub-overlapped portions 1870. Additionally, as described above, the formliner 1800 can also be configured to include a plurality of rib openings that are formed upon removal of the rib protrusions 1804. As similarly described above, the plurality of rib openings can be located and configured to correspond with corresponding ribs of adjacent interconnected formliners.

In accordance with some embodiments of the formliners disclosed herein, the sub-overlapped section (such as 210, 304, 1210, 1304, and 1870) can also be configured such that a length of the sub-overlapped section, as measured along the longitudinal direction of the rib, varies to provide optimal fit between overlapping formliners. For example, as shown in FIG. 36, the sub-overlapped section 1870 can be disposed along a length of the rib, not just at the corner of the formliner. In particular, the sub-overlapped section 1870 can extend along the rib for approximately one-haft of the total width of the cell 1802. In other embodiments, it is contemplated that the sub-overlapped section 1870 can extend along the rib for one-fourth or one-third of the total width of the cell 1802. Additionally, in configurations where the cells 1802 are offset, the length of the sub-overlapped section can correspond to the length of the offset of the cell 1802 from the formliner 1800. In other words, the length of the sub-overlapped section can correspond to the amount of protrusion of a cell from the formliner. In this manner, the fit and nesting of the ribs is optimized when a plurality of formliners are fitted together, such as with an overlapping section of a first formliner, an overlapped section of a second formliner, and a sub-overlapped section of a third formliner being overlaid onto each other.

Figure 37:
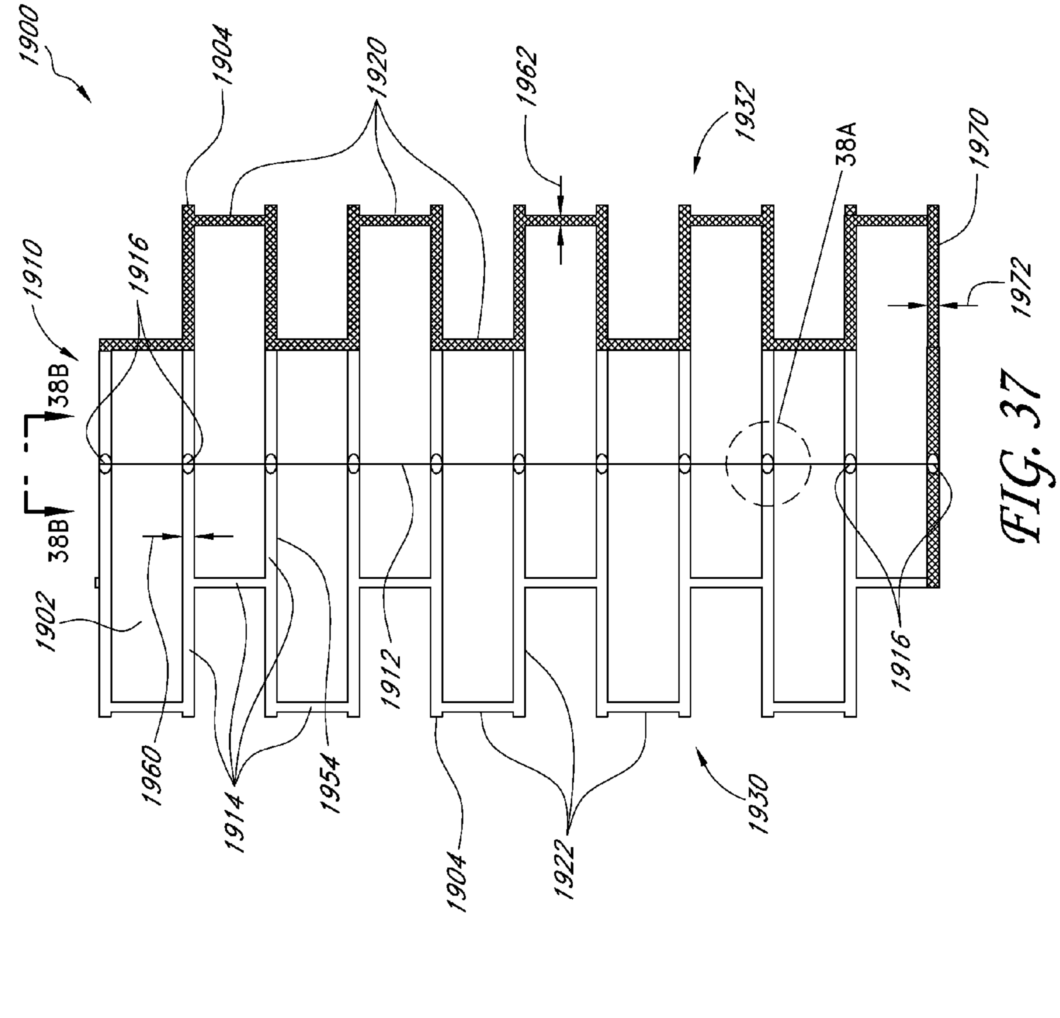
FIG. 37 is a top view of a mold corner, according to another embodiment.

FIG. 37 is a top view of a formliner that has been modified to be a mold corner 1900, according to another embodiment. The term “mold corner” or “formliner” can be used to describe such embodiments. In the illustrated embodiment, the mold corner 1900 comprises several rows of cells 1902 with only a single cell 1902 per row. Nevertheless, embodiments can be provided that include a plurality of cells 1902 in each row of the mold corner 1900. Additionally, invite immense can also be provided that include more or less rows of cells 1902.

Similar to the embodiment of FIG. 36 discussed above, the mold corner 1900 is also shown in a nearly finished state. In other words, the mold corner 1900 can still be trimmed in order to produce a finished or prepared formliner. In accordance with some embodiments, the mold corner 1900 can comprise one or more rib protrusions 1904 that extend from left and/or right sides of the formliner 1900. As discussed above, these rib protrusions 1904 can be removed prior to use in order to form a rib openings, which are discussed above with respect to other embodiments and shown, for example, in at least FIGS. 6, 8, 19, 23, 25, and 27.

In accordance with the embodiment illustrated in FIG. 37, the mold corner 1900 can comprise a central folding zone 1910. The mold corner 1900 can be formed such that the central folding zone 1910 comprises a folding line 1912 and such ribs 1914 of the mold corner 1900 include recesses 1916. The mold corner 1900 can be configured to be folded along the central folding zone 1910 such that a rear face of the mold corner 1900 can be positioned against an interior corner of a form. In this regard, the ribs 1914 of the mold corner 1900 can also be formed to include overlapped portions 1920 and overlapping portions 1922. As disclosed generally herein, the overlapped portions 1920 can be received within or made with overlapping portions of one or more other formliners in order to form a system of formliners. Further, the overlapping portions 1922 can be overlaid onto overlapped portions of one or more other formliners in order to form a system of formliners. Other features disclosed with respect to other embodiments can also be incorporated into embodiments of the mold corner 1900, such as sub-overlapped portions, interlocking protrusions and recesses, and other such features.

One of the unique advantages of the mold corner 1900 is that the mold corner 1900 helps to reduce the number of scenes and components in a system of formliners used to create a final molded product. In this regard, it is contemplated that the mold corner 1900 can be configured to bend along the folding line 1912 to achieve one of a variety of angular orientations between a first portion 1930 and a second portion 1932 of the mold corner 1900. In this regard, the folding line 1912 can be configured as a thinned area of the mold corner 1900. Further, the folding line 1912 can be configured as a perforated area of the mold corner 1900. Furthermore, the folding line 1912 can also be configured as an indented area of the mold corner 1900. Other variations and configurations of the folding line 1912 can be provided in order to facilitate folding of the mold corner 1900 along the folding line 1912.

Figure 38A:
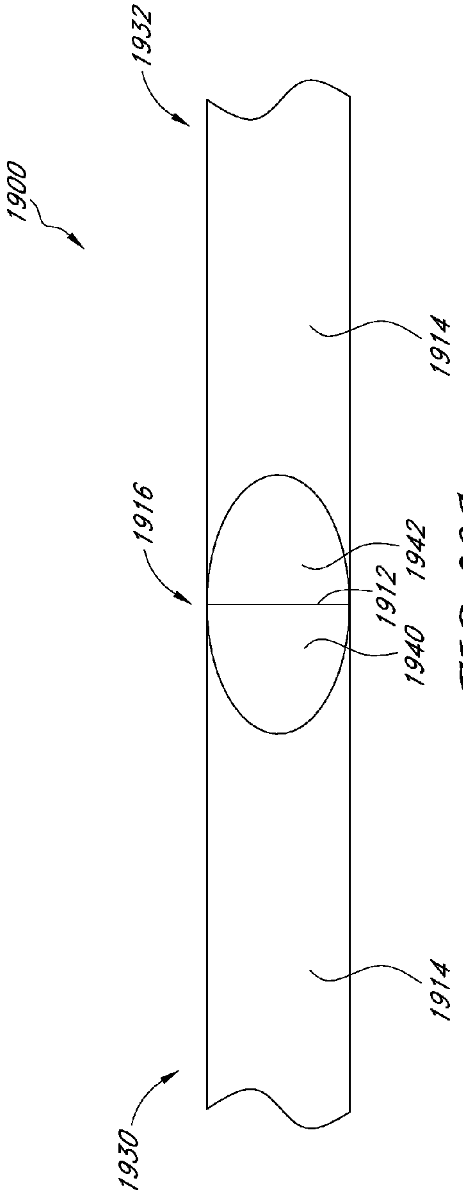
FIG. 38A is an enlarged view of a portion of the mold corner shown in FIG. 37.

For example, it is contemplated that the mold corner 1900 can be configured to provide a 90° bend between the first portion 1930 and the second portion 1932. FIG. 38A illustrates a top view of a recess 1916 formed in a rib in 1914 of the mold corner 1900. Further, FIG. 38B is a side view of the portion of the mold corner 1900 shown in FIG. 38A.

Figure 38B:
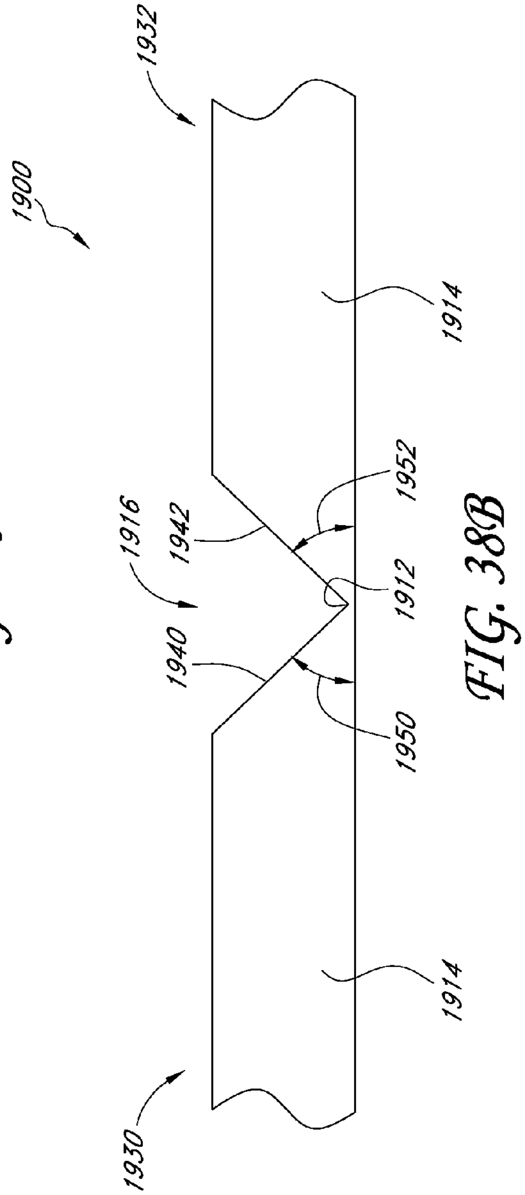
FIG. 38B is a side view of a portion of the mold corner shown in FIG. 37.

As illustrated in the embodiment of FIGS. 38A-B, the recess 1916 can comprise a generally 45° angle indentation from a top portion of the rib 1914 downwardly toward the folding line 1912. Accordingly, when the first portion 1930 is folded towards the second portion 1932, interior surfaces 1940, 1942 of the recess 1916 can collapse towards each other and contact each other to complete an interior profile of the folded mold corner 1900. In this regard, the interior surfaces 1940, 1942 can be oriented at first and second angles 1950, 1952 relative to a bottom surface or section of the rib 1914. In the illustrated embodiment, the first and second angles 1950, 1952 are approximately 45°. However, as necessary, other embodiments can be implemented that use greater or lesser angles, thus enabling the first portion 1932 form a variety of different angles relative to the second portion 1932, such that the mold corner 1902 can be used in various applications having a variety of different geometries.

In some embodiments, as illustrated in FIGS. 37-38B, upper surfaces of the first and second portions 1930, 1932 can fold inwardly toward each other. As discussed herein, this inward folding is facilitated in some embodiments by the formation of the recess in the rib. However, it is also contemplated that other implementations can be provided in which bottom surfaces of the first and second portions 1930, 1932 fold inwardly toward each other. As such, instead of forming an interior mold corner that is inserted into a corner of a mold (which can constitute an angle of less than 180°), and embodiment of the mold corner can also provide an exterior mold corner that is folded around a corner of a mold (such as folding the bottom surfaces of the first and second portions 1930, 1932 toward each other to accommodate an angle of greater than 180°). In such embodiments, the central folding zone could be reversed so as to provide a continuous upper surface of the rib while providing a recess along a lower portion of the rib and a gap in the material so as to allow the bottom surfaces of the first and second portions 1930, 1932 fold inwardly toward each and be folded around a corner of the mold.

Referring again to FIG. 37, as noted above, the mold corner 1900 can comprise one or more overlapping portions 1922 and one or more overlapped portions 1920. Additionally, the mold corner 1900 can comprise non-overlap portions 1954. The embodiment of FIG. 37 illustrates that the overlapping portions 1922 and the non-overlap portions 1954 can define a common outer dimension 1960. Thus, when a plurality of the formliners 1900 are interconnected, the overlapping portions 1922 overlap with the overlapped portions 1920 and the resulting rib structure of the interconnected formliners has a common outer dimension 1960.

In this regard, as discussed above, the overlapped portions 1920 can define an outer dimension 1962. The outer dimension 1962 can be less than the outer dimension 1960. Further, an inner dimension of the overlapping portions 1922 can also be greater than the outer dimension 1962 of the overlapped portions 1920.

Moreover, as discussed above, it is contemplated that in interconnecting formliners with the mold corner and/or mold corners with mold corners and formliners, there are certain points where one or more formliner(s) overlap with one or more mold corner(s). Accordingly, in some embodiments, the mold corner 1900 can be configured to define one or more sub-overlapped sections 1970. Similar to the embodiments discussed above, the sub-overlapped sections 1970 can be provided in the upper and lower right corners of the mold corner 1900. Further, the sub-overlapped sections 1970 can define an outer dimension 1972. The outer dimension 1972 can be less than the outer dimension 1962 and the outer dimension 1960. Further, an inner dimension of the overlapped portions 1920 can also be greater than the outer dimension 1970 of the sub-overlapped portions 1970. Additionally, as described above, the mold corner 1900 can also be configured to include a plurality of rib openings that are formed upon removal of the rib protrusions 1904. As similarly described above, the plurality of rib openings can be located and configured to correspond with corresponding ribs of adjacent interconnected formliners.

In accordance with some embodiments of the formliners disclosed herein, the sub-overlapped section (such as 210, 304, 1210, 1304, 1870, 1970) can also be configured such that a length of the sub-overlapped section, as measured along the longitudinal direction of the rib, varies to provide optimal fit between overlapping formliner(s)/mold corner(s). For example, as shown in FIG. 37, the sub-overlapped section 1970 can be disposed along a length of the rib, not just at the corner of the mold corner. In particular, the sub-overlapped section 1970 can extend along the rib for approximately one-half of the total width of the cell 1902. In other embodiments, it is contemplated that the sub-overlapped section 1970 can extend along the rib for one-fourth or one-third of the total width of the cell 1902. Additionally, in configurations where the cells 1902 are offset, the length of the sub-overlapped section can correspond to the length of the offset of the cell 1902 from the mold corner 1900. In other words, the length of the sub-overlapped section can correspond to the amount of protrusion of a cell from the mold corner. In this manner, the fit and nesting of the ribs is optimized when a plurality of mold corner(s) and/or formliner(s) are fitted together, such as with an overlapping section of a first formliner, an overlapped section of a first mold corner, and a sub-overlapped section of a second mold corner being overlaid onto each other.

Moreover, the formliners, mold corners, and other components can be formed in any variety of shapes and the ribs or ridges formed in the formliners can serve to provide strength against the weight of the curable material positioned thereagainst without requiring that the formliner be exceedingly bulky, thick, or otherwise heavy. In this regard, embodiments of the formliner can advantageously be used, for example, in tilt-up assemblies that require heavy materials such as rebar without contributing significantly, if even much at all, to the overall weight of the assembly. As such, the formliners allow for the use of less rigorous machinery, such as smaller cranes, etc. Accordingly, the light weight of embodiments of the formliner can allow for additional reductions in cost, time, and labor.

As discussed above, embodiments of the formliners disclosed herein allows the artisan to eliminate and/or reduce any visible seaming between interconnected formliners. Some embodiments of the formliners disclosed herein are able to effectively eliminate such seaming by converging formliner edges into corners above an interconnected formliner and using tight tolerances in mating exposed surfaces of the interconnected formliners.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, the scope of at least some of the present inventions herein disclosed should not be limited by the particular disclosed embodiments described above.

What is claimed is:

1. A formliner for use in creating a decorative pattern on cementitious material, the formliner comprising:

a cell; and a rib system extending along the cell and forming a boundary of the cell, the rib system comprising:

a first section comprising a first exterior surface and a first interior surface, the first exterior surface configured to face the cementitious material in use and having a first cross-sectional exterior profile, the first interior surface having a first cross-sectional interior profile;

a second section comprising a second exterior surface and a second interior surface, the second exterior surface having a second cross-sectional exterior profile that is smaller than the first cross-sectional interior profile, the second interior surface having a second cross-sectional interior profile;

a third section comprising a third exterior surface, the third exterior surface having a third cross-sectional exterior profile that is smaller than the second cross-sectional interior profile; and a first transition zone between the first section and the second section, the first transition zone connecting the first section with the second section, the first transition zone having a first varying cross-sectional exterior profile increasing from the second cross-sectional exterior profile of the second section to the first cross-sectional exterior profile of the first section, wherein at least one formliner is configured to be connected with at least two other formliners by overlaying at least a portion of a second section of a rib system of a first formliner of the at least two other formliners onto at least a portion of a third section of a rib system of the at least one formliner and by overlaying at least a portion of a first section of a rib system of an other formliner of the at least two other formliners onto the portion of the second section of the rib system of the first formliner of the at least two other formliners, wherein, when the at least one formliner and the at least two other formliners are connected, a first exterior surface of the first section of the rib system of the other formliner of the at least two other formliners and a first exterior surface of a first section of the rib system of the first formliner of the at least two other formliners are substantially flush with each other, and wherein, when the at least one formliner and the at least two other formliners are connected, the first section of the rib system of the other formliner of the at least two other formliners is positioned adjacent to a first transition zone of the rib system of the first formliner of the at least two other formliners.

2. The formliner of claim 1, wherein the rib system comprises a plurality of ribs, and wherein the ribs are substantially arcuately shaped.

3. The formliner of claim 1, wherein the first section of the rib system of the other formliner of the at least two other formliners comprises a rib edge that substantially abuts a first transition zone of the rib system of the first formliner of the at least two other formliners when the at least one formliner and the at least two other formliners are connected.

4. The formliner of claim 1, wherein the formliner comprises a plurality of cells, wherein the rib system comprises a plurality of ribs, and wherein the plurality of ribs are disposed between the plurality of cells to form boundaries of the cells.

5. The formliner of claim 4, wherein the plurality of cells define a generally rectangular shape.

6. The formliner of claim 5, wherein the plurality of cells comprise opposing ends, the plurality of cells being arranged in a plurality of layers with each layer having at least two cells disposed end-to-end.

7. The formliner of claim 6, wherein cells of a first layer of the plurality of layers are offset from cells of a second layer of the plurality of layers.

8. The formliner of claim 1, wherein the formliner comprises a first end and a second end, the first end being formed to include a first finger joint pattern and the second end being formed to include a second finger joint pattern that is complementary to the first finger joint pattern, wherein a first end of the at least one formliner is configured to be overlaid with a second end of the first formliner of the at least two other formliners.

9. The formliner of claim 1, wherein:

the rib system further comprises a second transition zone between the second section and the third section, the second transition zone connecting the second section with the third section, the second transition zone having a second varying cross-sectional exterior profile increasing from the third cross-sectional exterior profile of the third section to the second cross-sectional exterior profile of the second section, and when the at least one formliner and the at least two other formliners are connected, the second section of the rib system of the first formliner of the at least two other formliners is positioned adjacent to a second transition zone of the rib system of the at least one formliner.

10. The formliner of claim 1, wherein the at least one formliner is configured to be connected with the at least two other formliners by overlaying at least a portion of a second section of a rib system of a second formliner of the at least two other formliners onto at least another portion of the third section of the rib system of the at least one formliner and by overlaying at least another portion of the first section of the rib system of the other formliner of the at least two other formliners onto the portion of the second section of the rib system of the second formliner of the at least two other formliners.

11. A panel for forming a pattern on a surface, the panel comprising:

a plurality of cells for receiving material to form the pattern on the surface, the plurality of cells arranged in rows with cells of each row being offset with respect to cells of an adjacent row; and a panel periphery bounding the plurality of cells, the panel periphery comprising:

a first section having a first recess and a first opening;

a second section having a second recess and a second opening, the second section configured to fit within the first recess of the first section and extend through the first opening of the first section; and a third section configured to fit within the second recess and extend through the second opening of the second section, wherein at least one panel is configured to be connected with at least two other panels by overlaying at least a portion of a second section of a panel periphery of a first panel of the at least two other panels onto at least a portion of a third section of a panel periphery of the at least one panel and by overlaying at least a portion of a first section of a panel periphery of an other panel of the at least two other panels onto the portion of the second section of the panel periphery of the first panel of the at least two other panels, and wherein, when the at least one panel and the at least two other panels are connected, an exterior surface of the first section of the panel periphery of the other panel of the at least two other panels is substantially flush with an exterior surface of a first section of the panel periphery of the first panel of the at least two other panels.

12. The panel of claim 11, wherein the panel periphery further comprises:

a first transition zone between the first and second sections of the panel periphery, the first transition zone connecting the first and second sections of the panel periphery, the first transition zone having a first varying cross-sectional exterior profile increasing from a cross-sectional exterior profile of the second section to a cross-sectional exterior profile of the first section; and a second transition zone between the second and third sections of the panel periphery, the second transition zone connecting the second and third sections of the panel periphery, the second transition zone having a second varying cross-sectional exterior profile increasing from a cross-sectional exterior profile of the third section to the cross-sectional exterior profile of the second section, wherein, when the at least one panel and the at least two other panels are connected, a first opening of the first section of the panel periphery of the other panel of the at least two other panels is positioned adjacent a first transition zone of the panel periphery of the first panel of the at least two other panels, and wherein, when the at least one panel and the at least two other panels are connected, the second section of the panel periphery of the first panel of the at least two other panels is positioned adjacent a second transition zone of the panel periphery of the at least one panel.

13. The panel of claim 12, wherein the panel periphery comprises a plurality of ribs, and wherein the first transition zone is positioned at an intersection of transversely-extending ribs.

14. The panel of claim 12, wherein the panel periphery comprises a rib, and wherein the second transition zone is positioned along a longitudinal length of the rib, away from a corner of the panel periphery.

15. The panel of claim 11, wherein the plurality of cells are uniformly sized.

16. The panel of claim 11, wherein the plurality of cells are rectangular.

17. The panel of claim 11, wherein the first section of the panel periphery of the panel comprises a plurality of ribs and the second section of the panel periphery of the panel comprises a plurality of ribs, wherein the pluralities of ribs of the first and second sections are substantially arcuately shaped and the first and second openings of the first and second sections are generally curvilinear.

18. A formliner for use in creating a pattern on curable material, the formliner comprising:

a cell; and a rib extending along the cell and forming at least a part of a boundary of the cell, the boundary comprising:

an overlapping section comprising a first cross-sectional profile, the overlapping section configured to face the curable material in use;

an overlapped section comprising a second cross-sectional profile, wherein the first cross-sectional profile is configured overlay onto the second cross-sectional profile by the first cross-sectional profile having an inner surface larger than an outer surface of the second cross-sectional profile; and a sub-overlapped section comprising a third cross-sectional profile, wherein the second cross-sectional profile is configured to overlay onto the third cross-sectional profile by the second cross-sectional having an inner surface larger than an outer surface of the third cross-sectional profile, wherein at least one formliner is configured to be connected with at least two other formliners by overlaying at least a portion of an overlapped section of a boundary of a first formliner of the at least two other formliners onto at least a portion of a sub-overlapped section of a boundary of the at least one formliner and by overlaying at least a portion of an overlapping section of a boundary of an other formliner of the at least two other formliners onto the portion of the overlapped section of the boundary of the first formliner of the at least two other formliners, and wherein, when the at least one formliner and the at least two other formliners are connected, the overlapping section of the boundary of the other formliner of the at least two other formliners and an overlapping section of the boundary of the first formliner of the at least two other formliners are substantially flush with each other.

19. The formliner of claim 18, wherein the boundary further comprises:

a first transition zone between the overlapping and overlapped sections of the boundary, the first transition zone connecting the overlapping and overlapped sections of the boundary, the first transition zone decreasing in a dimension from the first cross-sectional profile of the overlapping section to the second cross-sectional profile of the overlapped section; and a second transition zone between the overlapped and sub-overlapped sections of the boundary, the second transition zone connecting the overlapped and sub-overlapped sections of the boundary, the second transition zone decreasing in a dimension from the second cross-sectional profile of the overlapped section to the third cross-sectional profile of the sub-overlapped section, wherein, when the at least one formliner and the at least two other formliners are connected, the overlapping section of the boundary of the other formliner of the at least two other formliners is positioned adjacent a first transition zone of the boundary of the first formliner of the at least two other formliners, and wherein, when the at least one formliner and the at least two other formliners are connected, the overlapped section of the boundary of the first formliner of the at least two other formliners is positioned adjacent a second transition zone of the boundary of the at least one formliner.

20. The formliner of claim 19, wherein the boundary comprises a plurality of ribs, and wherein the first transition zone is positioned at an intersection of transversely-extending ribs.

21. The formliner of claim 19, wherein the second transition zone is positioned along a longitudinal length of the rib, away from a corner of the boundary.

* * * * *

UNITED STATES PATENT AND TRADEMARK OFFICE

CERTIFICATE OF CORRECTION

PATENT NO. : 8,992,203 B2
APPLICATION NO. : 14/137733
DATED : March 31, 2015
INVENTOR(S) : Edward Daniel Fitzgerald and Brian Eugene Sheehan It is certified that error appears in the above-identified patent and that said Letters Patent is hereby corrected as shown below:

In the specification

In column 23 at line 45, Change “al low” to --allow--.

In column 34 at line 60, Change “one-haft” to --one-half--.

Signed and Sealed this
First Day of December, 2015

Michelle K. Lee
*Director of the United States Patent and Trademark Office*